US012023586B2

(12) United States Patent
Yamamura et al.

(10) Patent No.: US 12,023,586 B2
(45) Date of Patent: Jul. 2, 2024

(54) STORAGE MEDIUM, GAME SYSTEM AND GAME CONTROLLING METHOD

(71) Applicant: NINTENDO CO., LTD., Kyoto (JP)

(72) Inventors: Tomohiro Yamamura, Kyoto (JP); Kodai Matsumoto, Kyoto (JP); Shinya Saito, Kyoto (JP); Hiroyuki Takahashi, Tokyo (JP); Shugo Takahashi, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 317 days.

(21) Appl. No.: 17/330,599

(22) Filed: May 26, 2021

(65) Prior Publication Data

US 2021/0370174 A1 Dec. 2, 2021

(30) Foreign Application Priority Data

Jun. 2, 2020 (JP) .................................. 2020-096175

(51) Int. Cl.
*A63F 13/56* (2014.01)
*A63F 13/44* (2014.01)
*A63F 13/45* (2014.01)
*A63F 13/573* (2014.01)
*A63F 13/812* (2014.01)

(52) U.S. Cl.
CPC .............. *A63F 13/56* (2014.09); *A63F 13/44* (2014.09); *A63F 13/45* (2014.09); *A63F 13/573* (2014.09); *A63F 13/812* (2014.09)

(58) Field of Classification Search
CPC .......... A63F 13/44; A63F 13/45; A63F 13/56; A63F 13/573; A63F 13/812
See application file for complete search history.

(56) References Cited

U.S. PATENT DOCUMENTS

| 6,626,756 B2 * | 9/2003 | Sugimoto | A63F 13/45 463/2 |
| 7,223,169 B2 * | 5/2007 | Imaeda | A63F 13/422 473/409 |

(Continued)

FOREIGN PATENT DOCUMENTS

JP 6293999 3/2018

*Primary Examiner* — William H McCulloch, Jr.
(74) *Attorney, Agent, or Firm* — Nixon & Vanderhye PC

(57) ABSTRACT

A non-limiting example game system includes a processor incorporated within a main body apparatus, and the processor simultaneously controls a player character and a competitive partner character to advance a golf game. The player character is moved, when hitting a ball, toward a next hitting position. During movement, the player character interferes with movement or hitting of the competitive partner character according to an operation of a player. Moreover, when the player character executes a special shot, a shape or a property of a game filed is changed so as to interfere with movement or hitting of the competitive partner character. On the other hand, the competitive partner character interferes with movement or hitting of the player character or another competitive partner character. A victory or defeat of a competition game A is determined based on the time and the number of strokes both required from execution of a tee shot up to a cup-in. That is, a game element is introduced between hitting processing and hitting processing, and the required time affects a victory or defeat of the game.

19 Claims, 35 Drawing Sheets

(56) References Cited

U.S. PATENT DOCUMENTS

| | | | |
|---|---|---|---|
| 7,270,601 B2* | 9/2007 | Takahashi | A63F 13/812 463/3 |
| 7,297,056 B2* | 11/2007 | Takahashi | A63F 13/537 463/3 |
| 7,582,010 B2* | 9/2009 | Takahashi | A63F 13/812 463/31 |
| 7,658,676 B2* | 2/2010 | Ohta | A63F 13/812 345/158 |
| 7,716,008 B2* | 5/2010 | Ohta | G06F 3/017 702/152 |
| 7,828,641 B2* | 11/2010 | Imaeda | A63F 13/573 463/31 |
| 8,000,924 B2* | 8/2011 | Sato | A63F 13/428 702/92 |
| 8,033,914 B2* | 10/2011 | Yoshikawa | A63F 13/26 463/31 |
| 8,805,558 B1* | 8/2014 | Daniel | A63F 13/46 473/169 |
| 9,421,458 B2* | 8/2016 | Izuno | A63F 13/57 |
| 9,463,381 B2* | 10/2016 | Miki | A63F 13/426 |
| 9,925,460 B2* | 3/2018 | Rabin | G06F 3/0346 |
| 2001/0008840 A1* | 7/2001 | Sugimoto | A63F 13/45 463/2 |
| 2003/0004000 A1* | 1/2003 | Suzuki | A63F 13/812 463/43 |
| 2003/0040349 A1* | 2/2003 | Imaeda | A63F 13/422 463/3 |
| 2004/0176165 A1* | 9/2004 | Takahashi | A63F 13/537 463/36 |
| 2004/0180709 A1* | 9/2004 | Takahashi | A63F 13/812 463/3 |
| 2004/0214623 A1* | 10/2004 | Takahashi | A63F 13/537 463/2 |
| 2006/0003825 A1* | 1/2006 | Iwasaki | A63F 13/49 463/2 |
| 2008/0119270 A1* | 5/2008 | Ohta | A63F 13/812 463/43 |
| 2012/0077557 A1* | 3/2012 | Miki | A63F 13/426 463/3 |
| 2021/0370174 A1* | 12/2021 | Yamamura | A63F 13/44 |
| 2022/0168643 A1* | 6/2022 | Yamamura | A63F 13/573 |

* cited by examiner

MOVEMENT SCREEN 550

HITTING OPERATION SCREEN 700

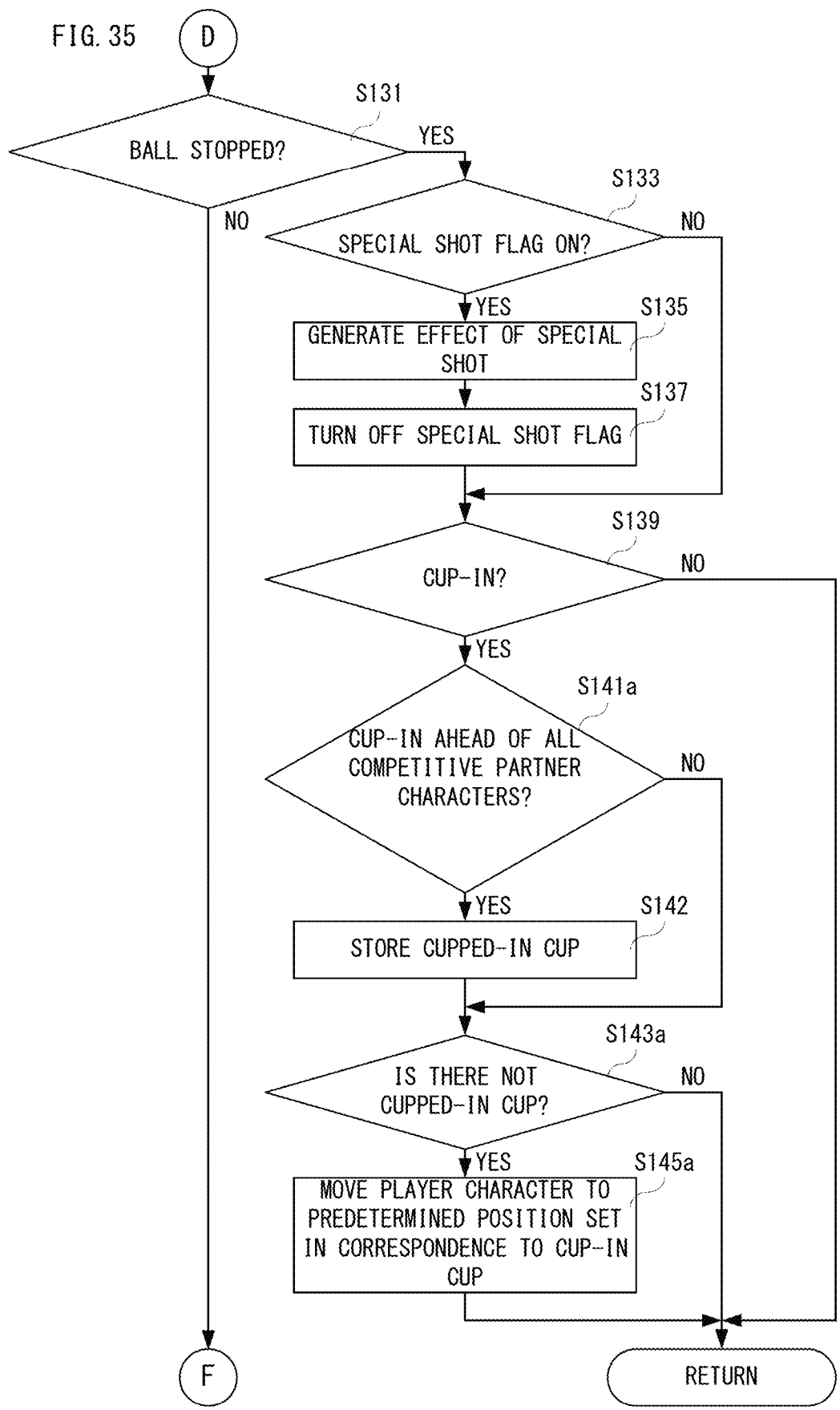

STORAGE MEDIUM, GAME SYSTEM AND GAME CONTROLLING METHOD

CROSS REFERENCE OF RELATED APPLICATION

This application claims priority to Japanese Patent Application No. 2020-96175 filed on Jun. 2, 2020, and the entire contents of which are incorporated herein by reference.

FIELD

This application describes a storage medium, a game system and a game controlling method, and more specifically, a storage medium, a game system and a game controlling method, in which a game element is introduced between hitting processing and hitting processing.

SUMMARY

It is a principal object of an embodiment(s) to provide a novel storage medium, game system and game controlling method.

Moreover, it is another object of the embodiment(s) to provide a storage medium, game system and game controlling method, capable of improving interest of game.

A first embodiment is a non-transitory computer-readable storage medium storing a game program executable by a computer provided with one or more processors, wherein the game program causes the one or more processors to execute: making a player character hit a virtual golf ball according to an operation by a player; making, after hitting of the golf ball, the player character move to an arrival point of the golf ball according to an operation by the player; making, in parallel with hitting of the golf ball and movement of the player character, each of one or more other characters hit and move according to an operation of each of one or more other players; and making game processing be executed so that length of time required from execution of a first shot up to a cup-in affects a victory or defeat of a golf game.

According to the first embodiment, a game element is introduced between hitting processing and hitting processing, so that the required time from the time that execution of the first shot up to a cup-in affects a victory or defeat of the golf game, whereby the interest of game can be improved.

A second embodiment is the storage medium according to the first embodiment, wherein the game program causes the one or more processors to execute setting moving speeds to the player character and the one or more other characters, respectively.

According to the second embodiment, the length of the required time from execution of the first shot up to a cup-in affects a victory or defeat of the golf game, and the moving speed is set for each character, and therefore, it is possible to select a character in consideration of the moving speed thereof.

A third embodiment is the storage medium according to the first embodiment, wherein the game program causes the one or more processors to execute changing the moving speed according to a shape or a property of a game field concerning on the golf game, and a changing manner of the moving speed may differ for each of the player character and the one or more other characters.

According to the third embodiment, it is possible to perform selection of the character also in consideration of the changing manner of the moving speed.

A fourth embodiment is the storage medium according to the first embodiment, wherein the game program causes the one or more processors to execute making number of virtual golf clubs to be used by each of the player character and the one or more other characters be settable, and lowering the moving speed as the number of the golf clubs to be used is increased.

According to the fourth embodiment, if the number of the golf clubs is increased, it is possible to execute the hitting according to various distance with comparatively ease, but the moving speed is decreased, and therefore, the number of the golf clubs can be set in consideration of balance between difficulty of a hitting operation and the moving speed.

A fifth embodiment is the storage medium according to the first embodiment, wherein the game program causes the one or more processors to execute making wearable article to be worn on the player character and the one or more other characters be selectable, and making a moving speed and movement performance differ according to the wearable article.

According to the fifth embodiment, since the moving speed or/and the movement performance is changed according to the wearable article to be worn, the wearable article can be selected according to a course or a stage.

A sixth embodiment is the storage medium according to the first embodiment, wherein the game program causes the one or more processors to execute displaying, according to an operation of the player, a character selection screen that the player character is selected from a plurality types of characters, the character selection screen displaying the plurality types of characters and a moving speed for each of the characters.

According to the sixth embodiment, since not only the character but also the moving speed of the character are displayed, the moving speed of the character can be easily known, and therefore, it is possible to select the character in consideration of the moving speed.

A seventh embodiment is the storage medium according to the first embodiment, wherein the game program causes the one or more processors to execute providing a plurality of virtual cups in a game field where a stage that is not divided per each of virtual holes is generated, and making the hitting execute a shot toward a desired cup among the plurality of virtual cups according to an operation of the player.

According to the seventh embodiment, it is possible to provide a new golf game that a cup into which the ball is put is strategically determined.

An eighth embodiment is the storage medium according to the seventh embodiment, where the game program causes the one or more processors to execute making a shot area for a first shot at a time of play start of the golf game coincide between the player character and the one or more other players, and making the hitting execute in a manner that the player character and the one or more other players simultaneously execute the first shot.

According to the eighth embodiment, since the player character and the one or more other players simultaneously execute the first shot at the same position, if targeted cups are arranged at the same or close to each other, interfere with movement or/and hitting easily occurs between the player character and the one or more other players. Therefore, it is possible to improve the interest of game. In addition, it should be noted that executing the first shot simultaneously means that a first hitting step can be performed in parallel, and includes not only that moments of impact are simultaneous but also that the starts of the hitting step are simultaneous and the starts of play from the shot area are simultaneous.

A ninth embodiment is the storage medium according to the eighth embodiment, wherein the game program causes the one or more processors to execute arranging the plurality of cups in the game field within a range of distance that the golf ball can reach with two strokes from either a shot position of the first shot or a shot position immediately after a cup-in excluding the cup having been cupped in.

According to the ninth embodiment, since the plurality of cups are arranged within the range of distance that the golf ball can reach with two strokes from either the shot position of the first shot or the shot position immediately after a cup-in, it is easy to see action or motion of other characters, and for example, it is easy to measure a position or timing to execute a special action described later.

A tenth embodiment is the storage medium according to the seventh embodiment, wherein the game program causes the one or more processors to execute determining a victory or defeat based on number of cups cupped-in by the player character or a team that the player character belongs ahead of the one or more other characters or a team that the one or more other character belong.

According to the tenth embodiment, since a victory or defeat is determined based on the number of cups cupped-in ahead of the one or more other character or the team that the one or more other character belong, the required time from the first shot to the cup-in affects a victory or defeat of the game. Therefore, it is possible to improve the interest of game.

An eleventh embodiment is the storage medium according to the seventh embodiment, wherein the game program causes the one or more processors to execute the hitting so that the player character executes a next shot, when cupping-in, from a shot position that is set according to the cupped-in cup.

According to the eleventh embodiment, since the shot position that is to be executed next is set, when a superior character having cupped-in ahead of all other characters executes the hitting, by placing an object that interferes with the hitting in the air to give a little task, it is possible to interfere with the hitting of the superior character. Therefore, it is possible to improve the interest of game.

A twelfth embodiment is the storage medium according to the first embodiment, wherein the game program causes the one or more processors to execute making the player character be able to execute a special action restricted with number of execution times or parameter, and making a shape or a property of the game field be changeable when executing the special action, and making moving speeds or shots of the player character and the one or more other characters be affected with the shape or the property of the game field.

According to the twelfth embodiment, it is possible to advance the game advantageously by changing the shape or the property of the game field.

A thirteenth embodiment is the storage medium according to the twelfth embodiment, wherein the game program causes the one or more processors to execute making the special action be executable at a time of the shot of the player character and at a time of movement of the player character, respectively, and setting performance of the golf ball for a next shot different from performance at normal time if the virtual golf ball used by the one or more other characters is included in an area determined based on a movement path of the player character, or in an area determined based on a trajectory or falling point or an arrival point of the golf ball that is hit by the player character.

According to the thirteenth embodiment, since the performance of the golf ball used by the one or more other characters is set different from the performance at the normal time by the special action of the player character, it is possible to interfere with the movement or hitting of the one or more other characters by the special action.

A fourteenth embodiment is the storage medium according to the twelfth embodiment, wherein the game program causes the one or more processors to execute making the special action be executable at a time of shot of the player character and a time of movement of the player character, respectively, and making the number of execution times or the parameter consumed by executing the special action be common.

According to the fourteenth embodiment, by making the number of execution times or the parameter be common at the time of shot and at the time of movement, it is possible to create a strategy of whether to execute a special action at the time of shot or at the time of movement.

A fifteenth embodiment is the storage medium according to the twelfth embodiment, wherein the game program causes the one or more processors to execute making the special action be an action that a predetermined technique is issued while moving at a higher speed than that of normal movement, and making the player character to continue moving at the higher speed than that of the normal movement according to an operation of the player at a time of movement of the player character while consuming the number of execution times or the parameter when the operation is continued after execution of the special action.

A sixteenth embodiment is the storage medium according to the twelfth embodiment, where the game program causes the one or more processors to execute making the game field include the air in the virtual space, and changing, according to execution of the special action, the shape or the property of a portion in the air in the virtual space.

According to the sixteenth embodiment, since the shape or the property of a portion in the air is changed, it is possible to affect movement of the character or/and the ball moving in the air.

A seventeenth embodiment is the storage medium according to the first embodiment, wherein the game program causes the one or more processors to execute arranging one or more items in the game field, and giving an advantageous or disadvantageous effect to the player character or the one or more other characters when the player character and the one or more other characters acquire an item at the time of movement, or use the item after acquiring the item.

According to the seventeenth embodiment, it is possible to make the progress of the game advantageous or disadvantageous by acquiring the item or using the item after acquiring the same.

An eighteenth embodiment is the storage medium according to the first embodiment, wherein the game program causes the one or more processors to execute arranging a hittable object that is different from the golf ball in the game field, and giving an advantageous or disadvantageous effect to the player character and the one or more other characters when the player character and the one or more other characters hit the hittable object.

According to the eighteenth embodiment, by arranging the hittable object and hitting the same, it is possible to interfere with the movement or hitting of the one or more other characters at a distance, for example.

A nineteenth embodiment is a game system comprises one or more processors and is executable a golf game, wherein the one or more processors to execute: making a player character hit a virtual golf ball according to an operation by a player; making, after hitting of the golf ball, the player character move to an arrival point of the golf ball according to an operation by the player; making, in parallel with hitting of the golf ball and movement of the player character, each of one or more other characters hit and move according to an operation of each of one or more other players; and making game processing be executed so that length of time required from execution of a first shot up to a cup-in affects a victory or defeat of a golf game.

A twentieth embodiment is a game controlling method in a game system executable a golf game, comprising: making a player character hit a virtual golf ball according to an operation by a player; making, after hitting of the golf ball, the player character move to an arrival point of the golf ball according to an operation by the player; making, in parallel with hitting of the golf ball and movement of the player character, each of one or more other characters hit and move according to an operation of each of one or more other players; and making game processing be executed so that length of time required from execution of a first shot up to a cup-in affects a victory or defeat of a golf game.

In also the nineteenth and twentieth embodiments, the interest of game can be improved like the first embodiment.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 35 is a flowchart showing the other part of the non-limiting example character processing in the competition game B.

DETAILED DESCRIPTION OF NON-LIMITING EXAMPLE EMBODIMENTS

A non-limiting example game system according to an exemplary embodiment will be described in the following.

The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
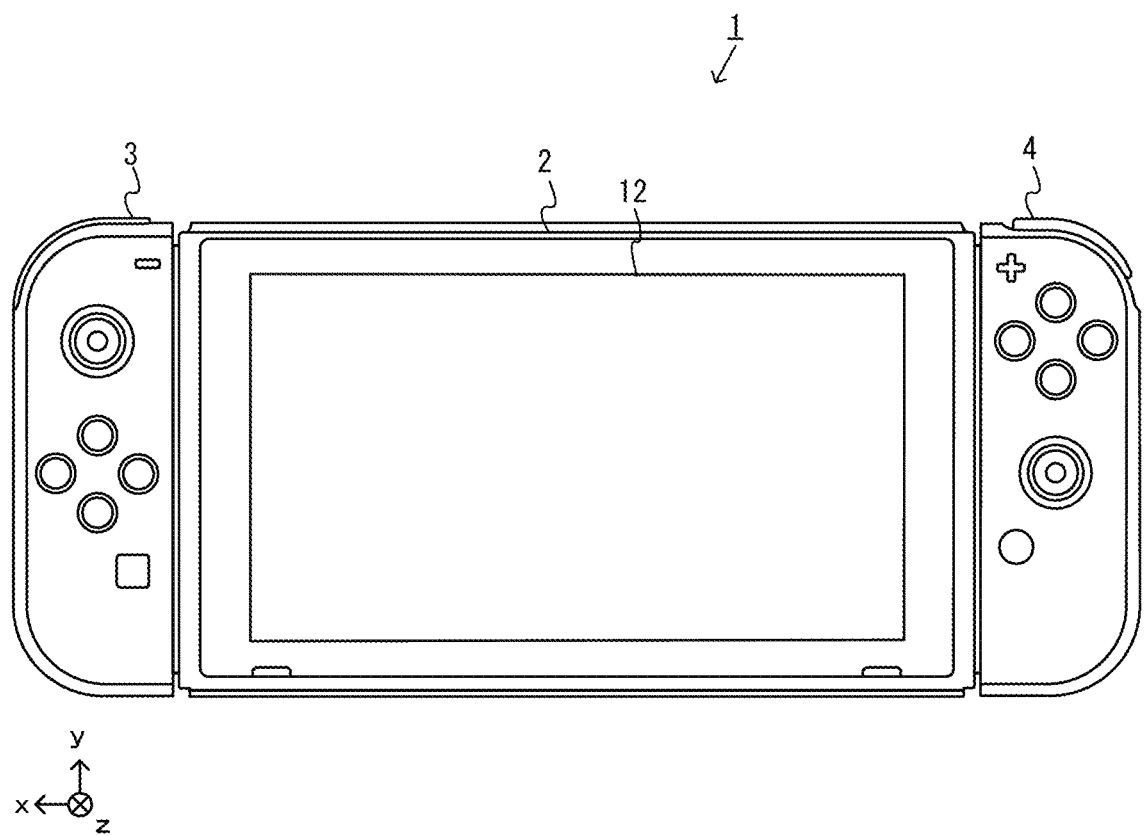
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
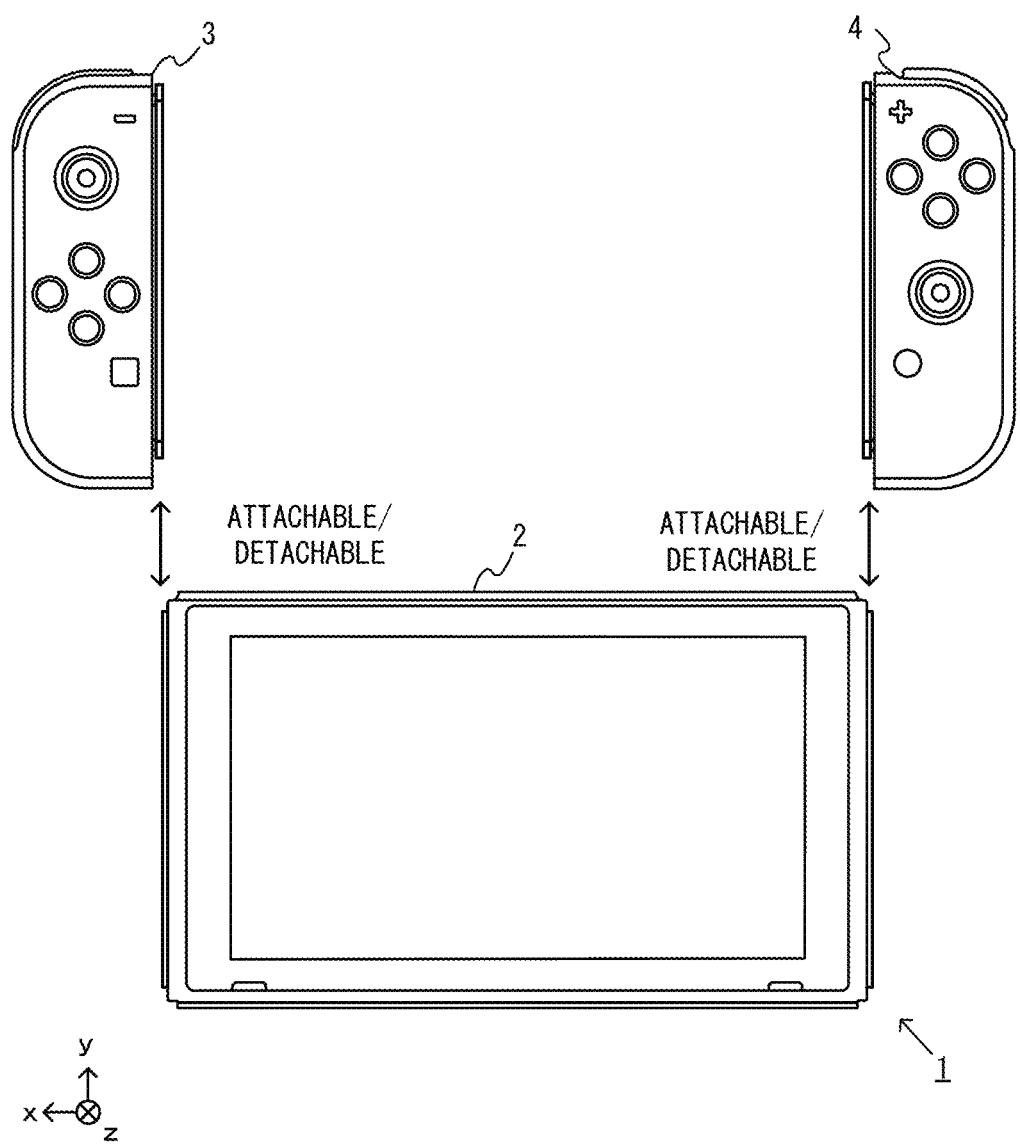
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
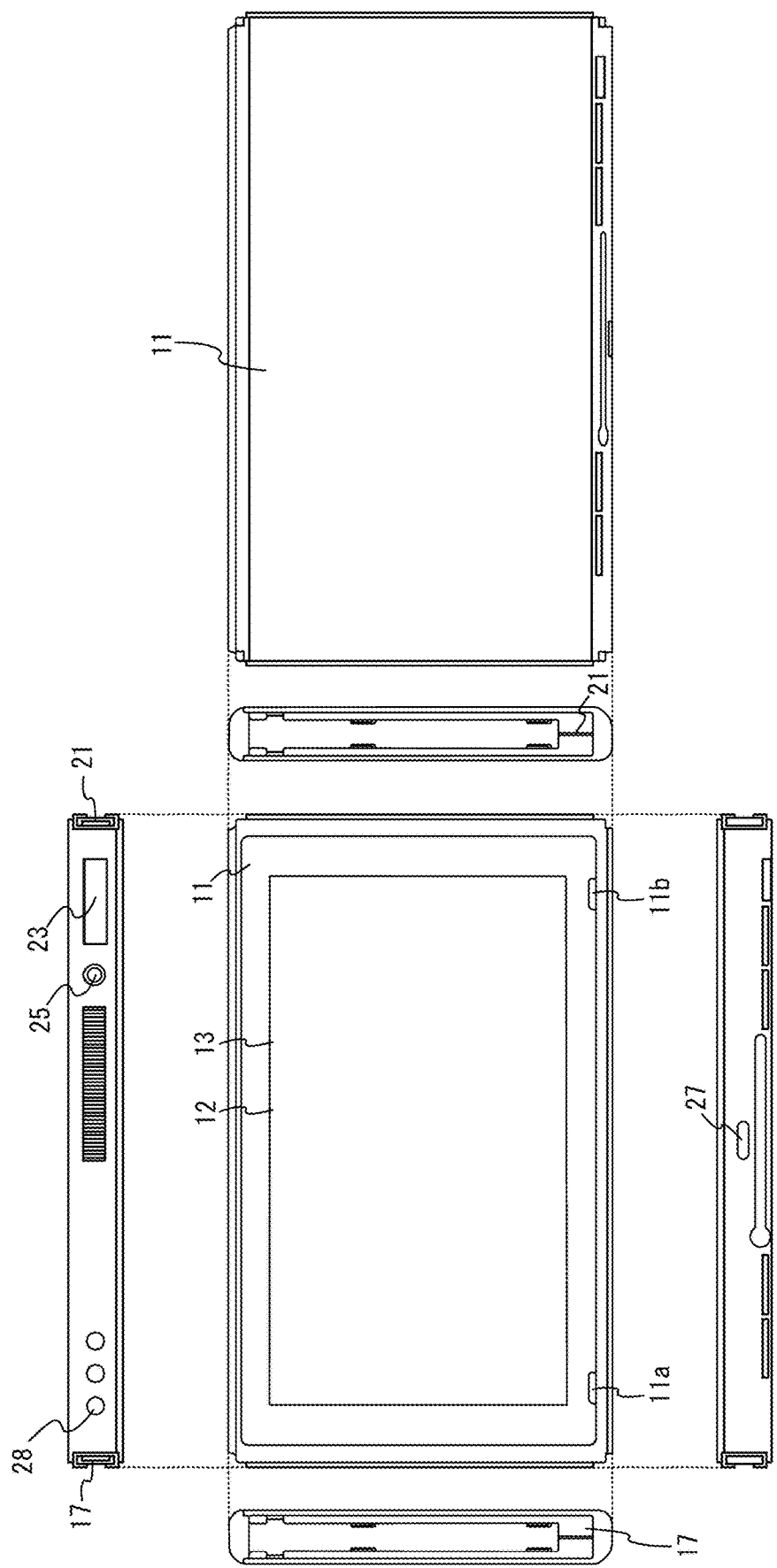
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display.

Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are emitted through the speaker holes 11*a* and 11*b*.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
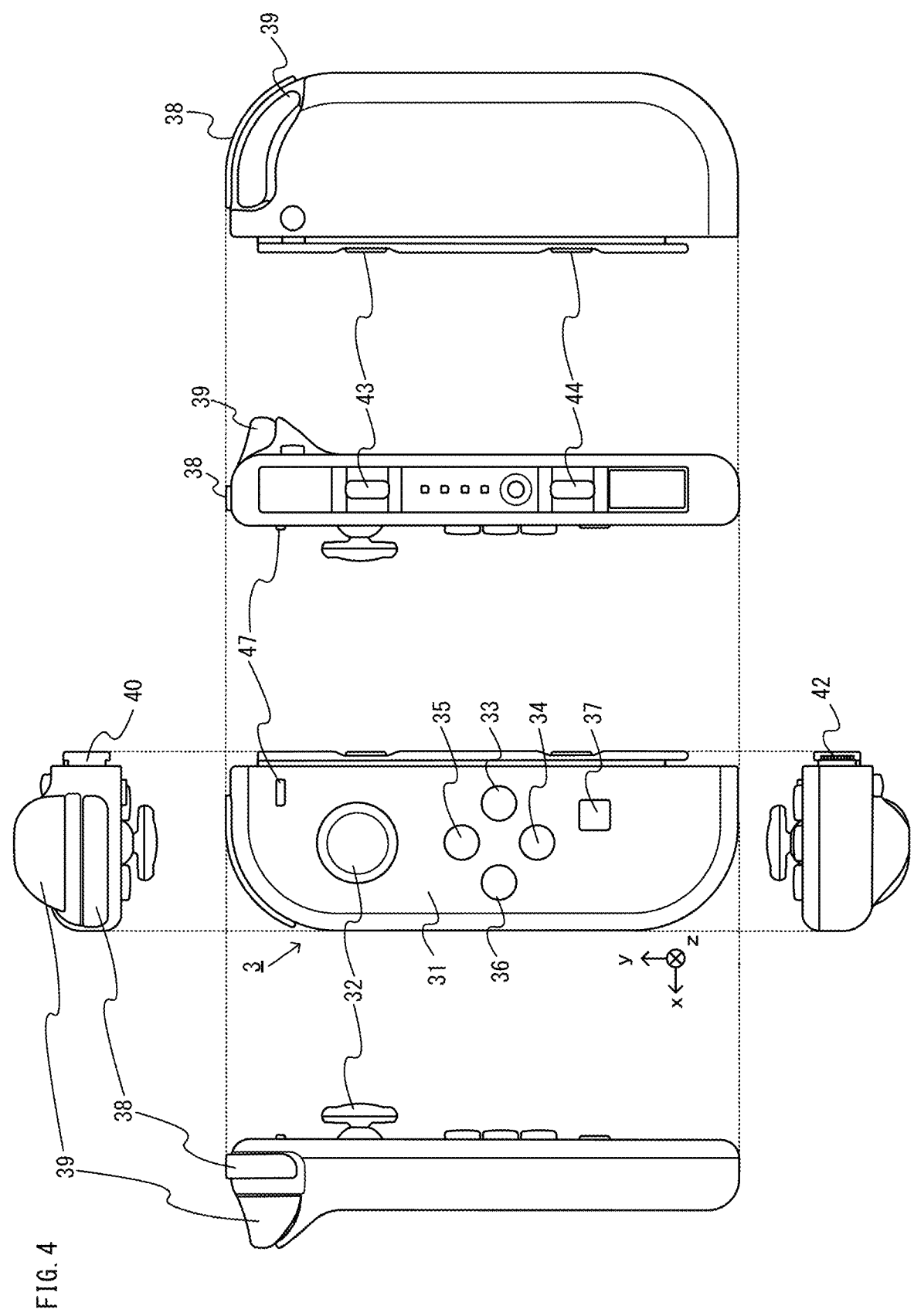
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
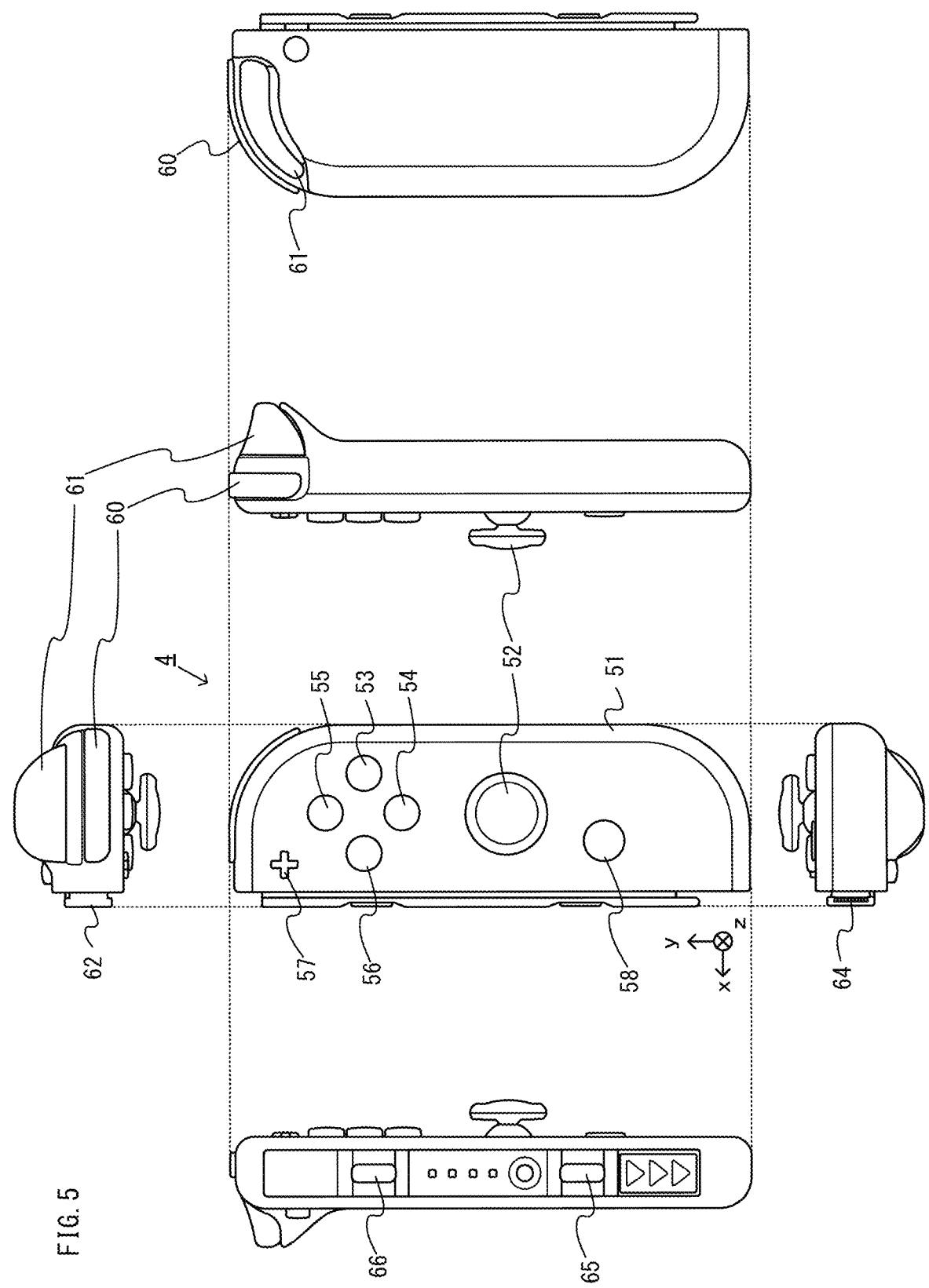
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
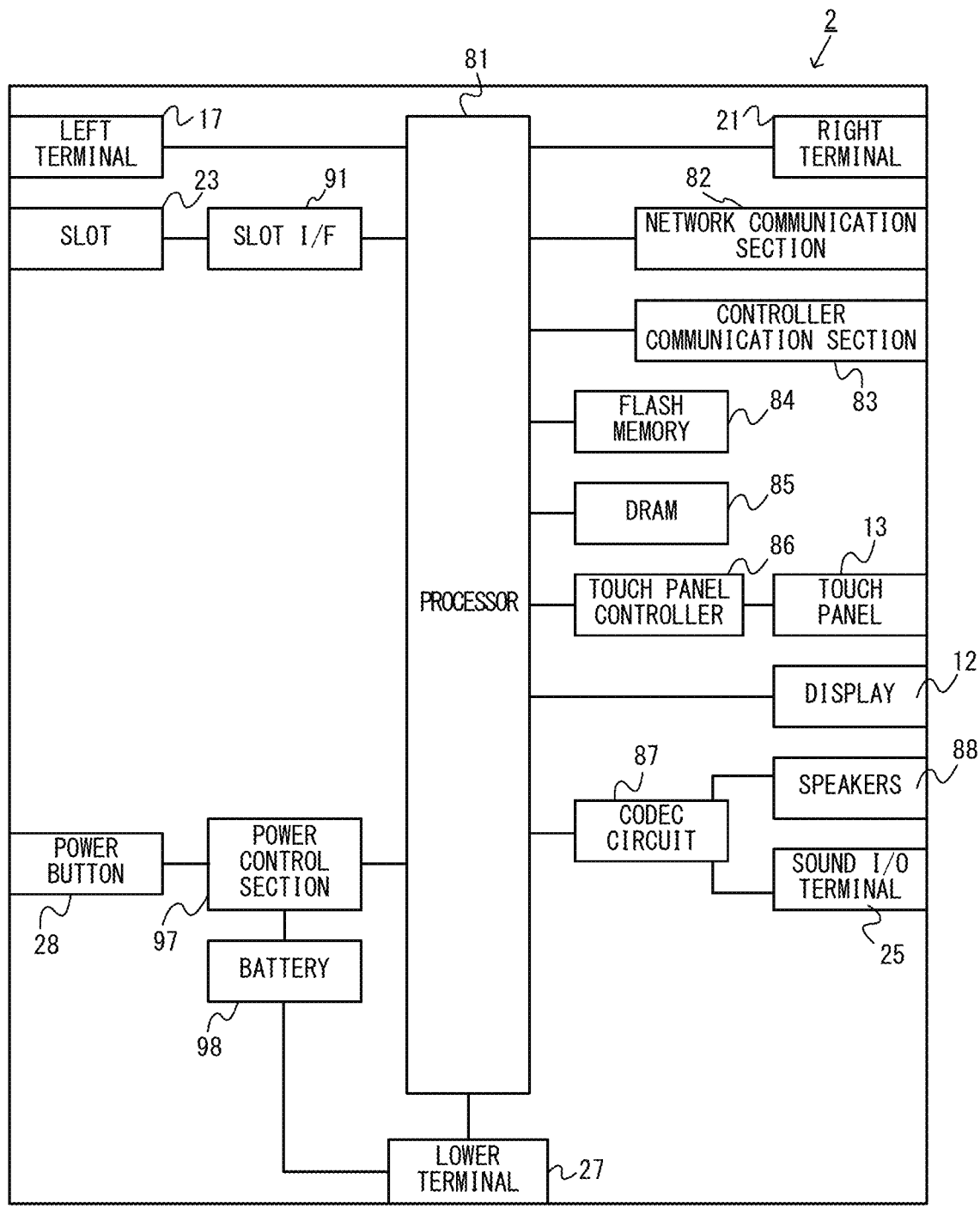
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
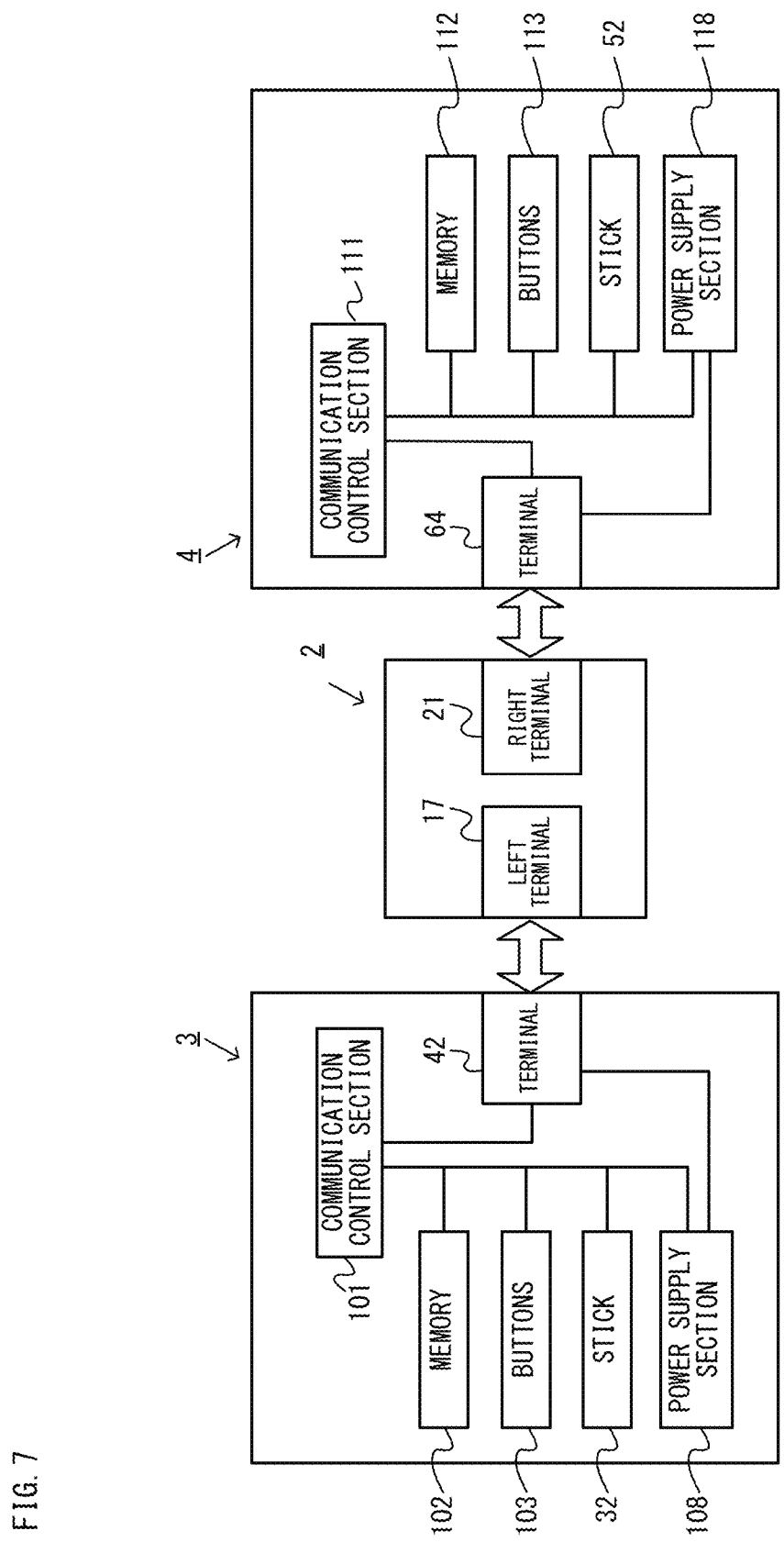
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every first predetermined period of time. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Figure 8:
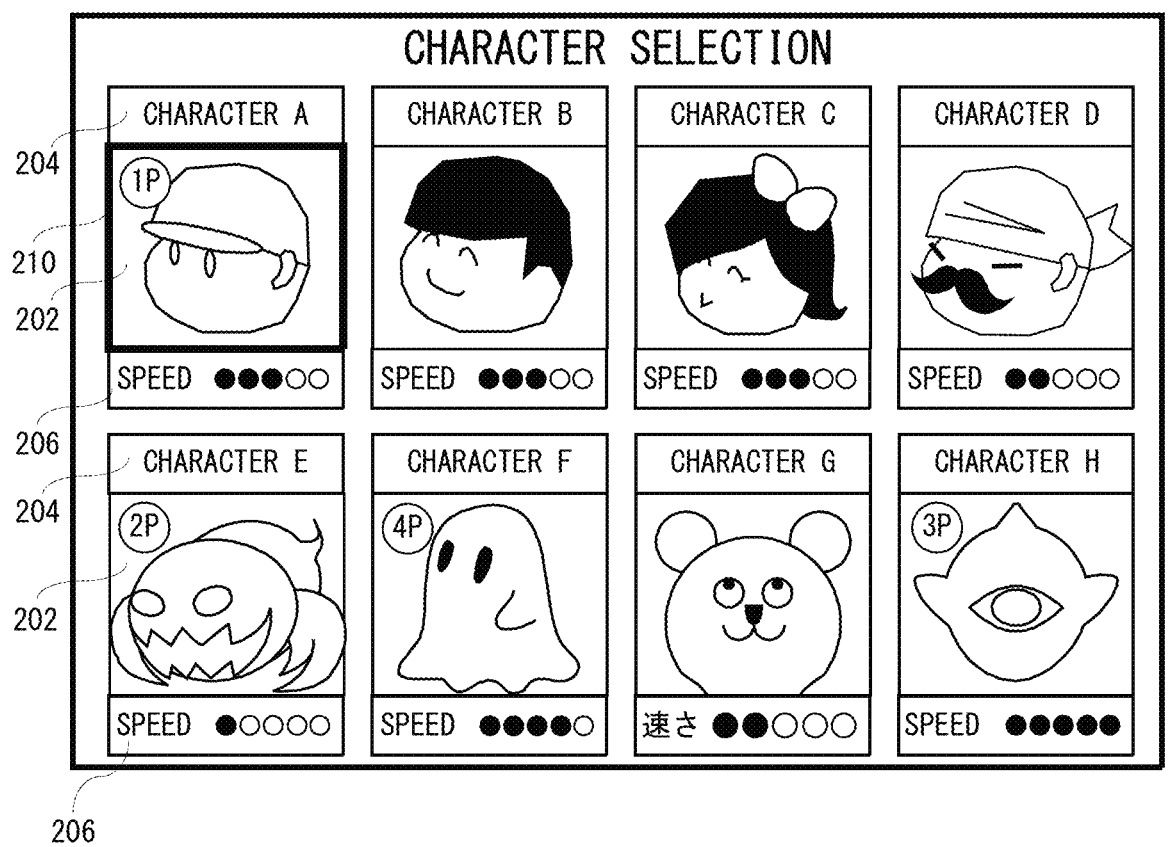
FIG. 8 is a view showing a non-limiting example character selection screen.

Next, with reference to FIG. 8-FIG. 18, an outline of game processing concerning on a virtual golf game executed on the game system 1 according to this embodiment will be described. In this embodiment, two types of golf games (hereinafter, may be referred to as "competition game A" and "competition game B", respectively) will be described. However, when it is not necessary to especially distinguish the competition game A and the competition game B from each other, simply referred to as a competition game. FIG. 8 is a view showing a non-limiting example character selection screen 200 that is an example of a game image. In this embodiment, in a case where an application of a golf game is executed, when a type of competition game to play is selected and a golf course or stage to play is further selected, the character selection screen 200 will be displayed on a display device (for example, the display 12).

In this embodiment, a competition game, that is, a golf game, means a game that each character hits a virtual golf ball to aim at a specific target such as a virtual cup, or competes for a flight distance. More specifically, in the competition game A, the characters or players go around, in order, a plurality of holes provided in a virtual golf course, and a victory or defeat of the competition game A is determined based on the number of strokes and a time (hereinafter, referred to as a "required time") required from a tee-shot (i.e., a first shot) up to a cup-in for each hole. Moreover, in the competition game B, the characters or players aim at a plurality cups provided on a virtual stage in an order that the characters or players desire, and a victory or defeat is determined based on the number of cups that are cupped-in ahead of other character(s) or player(s). That is, it is possible to provide the competition game B that is a new golf game in which a cup that a golf ball is to be cupped-in is determined by a strategy.

In this embodiment, in the competition game A and the competition game B, a player character interferes with movement or hitting by a competitive partner character (corresponding to "other character"), or the player character is interfered, by the competitive partner character, with movement or hitting thereof. However, in this embodiment, movement of each of the player character and the competitive partner character means movement to a next hitting position, that is, an arrival position of the golf ball after hitting the golf ball, and movement to a teeing area of a next hole or a predetermined place (or a predetermined position) different from the teeing area when hitting the golf ball after a cup-in of the golf ball is not included.

In this specification, a hole on a green that the golf ball is to be put in is referred to as a "cup", and a district or area to play from the teeing area to the green (that is, a range in which the character is movable) is referred to as a "hole". Moreover, in this specification, a "cup-in" means that the golf ball goes into the cup.

The main body apparatus 2 functions also as an image processing apparatus, and generates and outputs (displays) display image data corresponding to various kinds of screens such as a game image. The processor 81 arranges various types of objects and characters in a three-dimensional virtual space, and generates a certain sight or scene. An image that a scene that is imaged by a virtual camera (i.e., an image viewed from a viewpoint) is displayed on the display 12 as the game image.

FIG. 8 shows an example of the character selection screen 200. The character selection screen 200 is displayed on the display 12 in order to select a character that a player uses, i.e., a player character, and a competitive partner character. Hereinafter, when it is not necessary to especially distinguish the player character and the competitive partner character from each other, and when the character appearing in the golf game of this embodiment is to be described, it will be simply referred to as a "character". The selection screen 200 displays images 202 of a plurality of characters, and a name of the character is indicated in a display area 204 above each of the images 202, and a moving speed of the character is indicated in a display area 206 below each of the images 202.

The image 202 is an image concerning on a face or whole body of the character. The name of the character is identification information of the character. The moving speed means a basic moving speed (hereinafter, referred to as a "basic speed") in case of moving to a next hitting position, i.e., an arrival point of the golf ball after hitting the golf ball in the competition game. In this embodiment, the basic speed is set in five (5) steps, and the larger the number of black circular symbols, the higher the basic speed. However, a value of the basic speed within the virtual space is determined in advance in accordance with the number of the black circular symbols. Moreover, in this embodiment, the characters are classified into characters movable on the ground and characters movable in the air. However, moving on the ground includes rolling and sliding in addition to walking and running on the ground in the virtual space. Moreover, in this embodiment, the ground may include a place that a pond or river is frozen.

In addition, although detailed description is omitted, as an example, when a size of the character is large, the basic speed is set low, and when the size of the character is small, the basic speed is set high. Moreover, in a case where the size of the character is large, the basic speed is set low, but when dashing oneself against the competitive partner character, it is possible to thrust away the character having a small size. Furthermore, the characters moving in the air are unaffected or less susceptible to both terrain such as hazards and direct interference by the characters moving on the ground; however, the basic speed is set low and is affected with wind and rain, obstacles in the air and interference from competitive partner characters moving in the air. The obstacles in the air also include a golf ball hit by other characters.

Moreover, although the basic speed is a constant speed in this embodiment, it does not need to be limited to this. In other examples, the basic speed may be an initial speed, acceleration or average speed in a case where the character moves.

The player moves a cursor 210 to select the image 202 of a desired character by tilting the analog stick 32, and further depresses the A button 53, whereby a character to use, i.e., the player character can be determined. In addition, when another player is a human being, he/she can select and determine a character in the same manner by using another controller capable of performing communication with the main body apparatus 2. However, when the human players are two persons, by removing the left controller 3 and the right controller 4 from the main body apparatus 2, one player may use the left controller 3 and the other player may use the right controller 4. In this case, the left controller 3 and the right controller 4 are held sideways, respectively, and the analog sticks 32 and 52 are operated with the left hand thumbs and the button 53-56 is operated with the right hand thumbs. In this case, since arrangement of the buttons 53-56 changes, functions assigned to the buttons 53-56 according to that change are changed.

In addition, in other embodiments, only the moving speed of the character corresponding to the image 202 of the character selected by the cursor 210 may be displayed in the character selection screen 200, or only the moving speed of the character that is selected by the cursor 210 and determined or provisionally determined by depressing the A button 53 may be displayed.

In the following, for simplicity, this embodiment will be described on a case where the game system 1 that the left controller 3 and the right controller 4 is attached to the main body apparatus 2 is used, and the human player is one (1) and a plurality of other players are computer players (in this embodiment, the processor 81). The computer player other than the human player determines, according to a predetermined rule (for example, at random), the competitive partner characters different from the character that the human player determines.

In the selection screen 200, the identification information of the player is indicated left above the image 202 of the character that the player determines. In this embodiment, letters of "1P", "2P", "3P" and "4P" are indicated within circular symbols. "1P" means a first player, "2P" means a second player, "3P" means a third player and "4P" means a fourth player.

When the characters that respective players use are determined, the number of golf clubs, types (or counts) of the golf clubs and wearable article, which are used by the character, are determined. That is, equipment for the character is determined.

Figure 9:
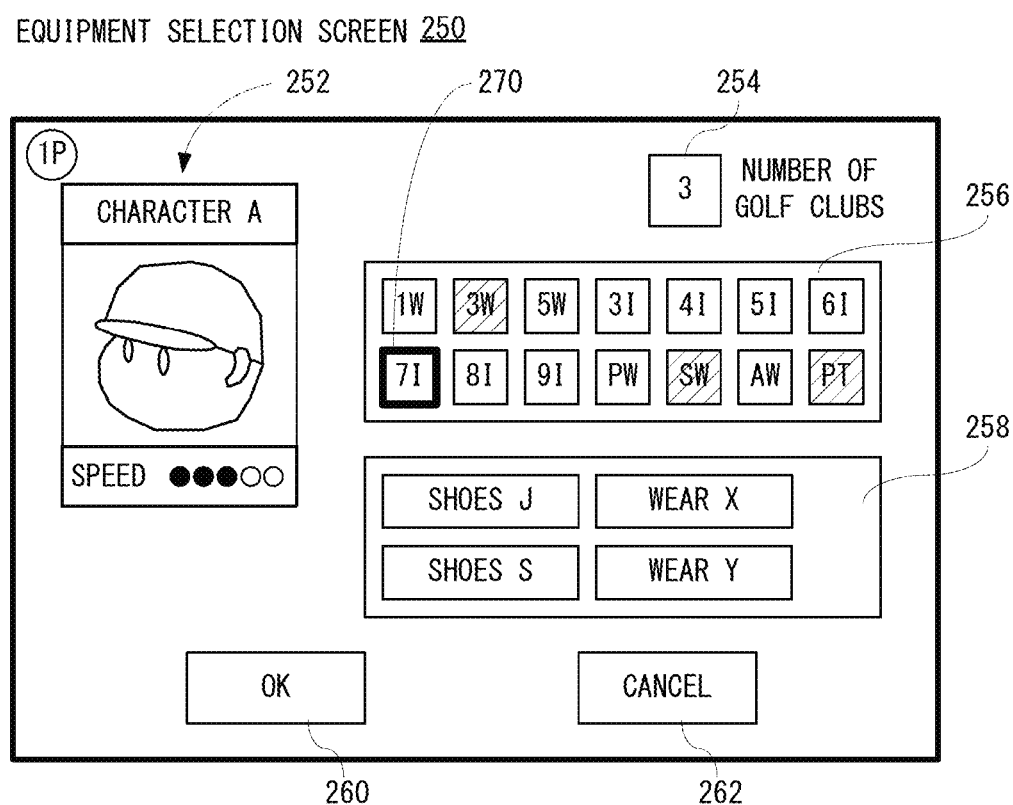
FIG. 9 is a view showing a non-limiting example equipment selection screen.

FIG. 9 shows a non-limiting example equipment selection screen 250. As shown in FIG. 9, the equipment selection screen 250 includes a character image 252 in an upper left portion, and is provided with display areas 254, 256 and 258 in a right side of the character image 252. Moreover, an OK button 260 and a cancel button 262 are formed in a lower portion of the equipment selection screen 250.

The character image 252 is an image concerning on the character selected in the character selection screen 200, and the name of the character, the face image and the basic speed for movement are indicated. Moreover, the identification information of the player is indicated in an upper left portion of the character image 252.

The display area 254 is an area for displaying the number of golf clubs to be used, and the same number as the number of types of golf clubs selected by the player is displayed. The number of golf clubs is incremented by one (1) at every time that the type of golf club is selected, and decremented by one (1) at every time that the selection is canceled. Although detailed description is omitted, a lower limit of the number of golf clubs is one (1) and an upper limit of the number of golf clubs is seven (7). However, the lower limit or/and upper limit of the number of golf clubs is changeable suitably. Moreover, although the golf clubs are selected and determined one by one type, the number and types of the golf clubs may be set at once with a set of a plurality of golf clubs (for example, three (3), five (5) or seven (7)).

The display area 256 is an area for displaying the type of golf club to be used, and button images with character strings each indicating a type are displayed side by side. In FIG. 9, as for the golf club selected to use, the background of the button image indicating the type is shaded by slant lines. The human player can select the type of the golf club with moving a cursor 270 by tilting the analog stick 32, and determine to use the golf club designated by the cursor 270 by operating the A button 53. However, it is also possible to cancel the use thereof by operating the A button 53 in a state where the determined golf club is designated with the cursor 270.

The display area 258 displays a button image concerning on the wearable article that the player character possesses. In an example shown in FIG. 9, a button image of the shoes J, a button image of the shoes S, a button image of the wear X and a button image of the wear Y are provided. The human player can select the button image of the wearable article with moving the cursor 270 by tilting the analog stick 32, and determine to wear, by depressing the A button 53, the wearable article corresponding to the button image designated by the cursor 270. However, it is also possible to cancel the wearable article by operating the A button 53 in a state where the determined wearable article is designated with the cursor 270.

In addition, when the player (or character) possesses no wearable article, the display area 258 is a blank.

The OK button 260 is a button for settling the equipment. The cancel button 262 is a button for interrupting selection of the equipment and returning to character selection.

In this embodiment, the basic speed is changed according to the number of golf clubs. The larger the number of golf clubs, the lower the basic speed.

Moreover, in this embodiment, the basic speed of the character or/and moving performance (or ability) is changed by wearing the wearable article. For example, when the shoes J are worn, a jumping force of the character is increased. That is, even if there are an obstacle such as a relatively tall rock or wall and an obstacle such as a relatively wide river, a pond or a sand place, the character can jump over them. However, depending on a type of character, the jumping force may be reduced by wearing the shoes J. The same applies when wearing other wearable article.

Moreover, when the shoes S are worn, even if moving in the sand place, the moving speed of the character is not decreased. However, depending on a type of character, the basic speed may be reduced by wearing the shoes S.

Furthermore, when the wear X is worn, even in a case where the character is moved in water such as a river or a pond, the moving speed of the character is not decreased, or the moving speed is made higher. Moreover, when the wear Y is worn, flight time duration when the character jumps is lengthened. That is, even if there is an obstacle such as a relatively wide river, a pond or a sand place, the character can jump over them.

Therefore, for example, the player can select the wearable article according to a golf course or stage to play. That is, the player can select the wearable article that he/she thinks that the player character is easy to move.

Moreover, the player can select a player character in the above-described character selection screen 200 also in consideration a manner of change of the basic speed for each character.

Although illustration is omitted, the basic speed may be calculated and display of the image indicative of the basic speed in the character image 252 may be changed when the number of golf clubs is changed or the wearable article is changed. Alternately, a changing amount of the basic speed according to the number of golf clubs and the wearable article may be displayed.

In addition, although the wearable article is selected and determined prior to a start of the competition game in this embodiment, the wearable article may be selected and determined in the middle of the competition game.

In FIG. 9, when operating the OK button 260, the competition game (here, the competition game A) is started, and an image (background image) of a area of a beginning hole of the selected golf course and a portion of the golf course viewed therefrom is displayed on the display 12. For example, the beginning hole of the golf courses is generated in a game space or game field, and a position and orientation of the virtual camera are set so that the camera is directed to a direction that the player character hits the ball from a predetermined position behind the teeing area. As an example, a hitting operation screen 300 as shown in FIG. 10 is displayed on the display 12.

Figure 10:
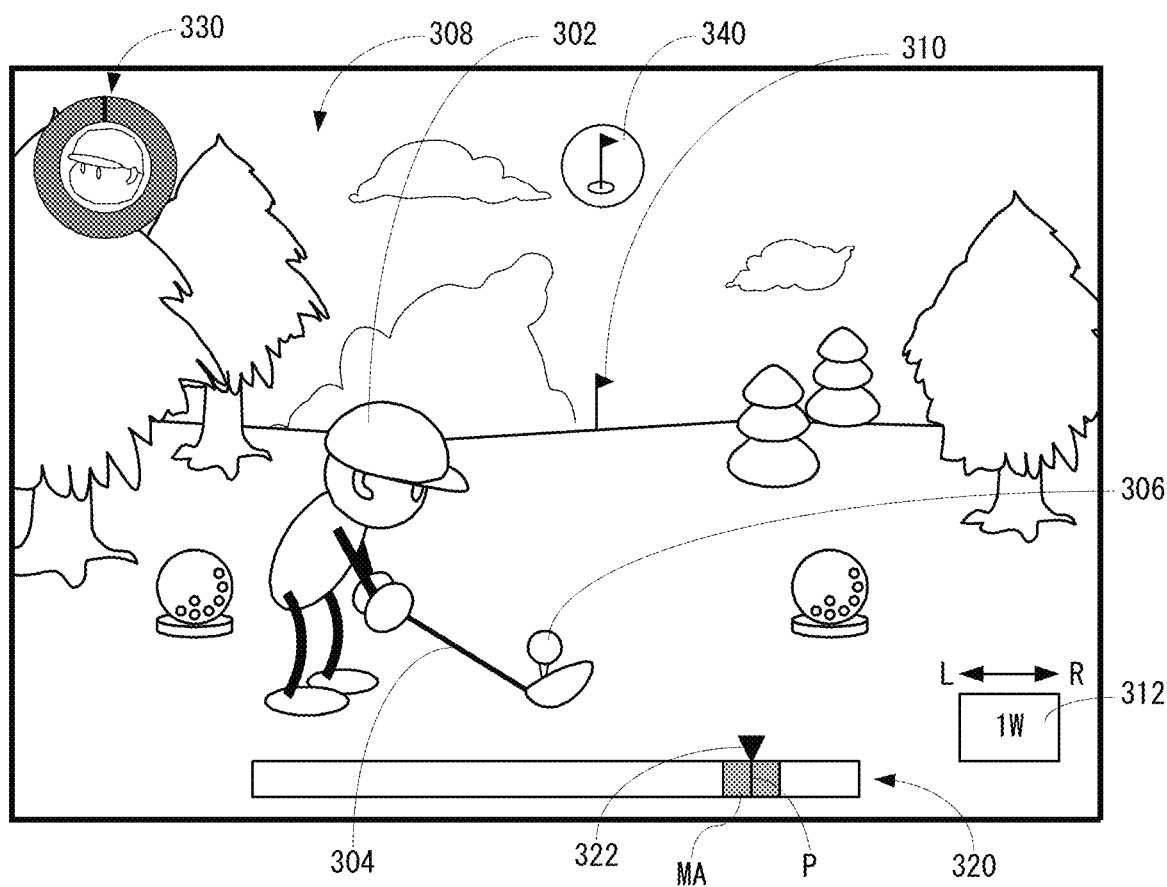
FIG. 10 is a view showing a non-limiting example hitting operation screen.

As shown in FIG. 10, the player character 302 is displayed in the hitting operation screen 300, and the player character 302 grasps a virtual golf club (hereinafter, simply referred to as a "club") 304. As can be seen also in FIG. 10, the player character 302 is displayed in an addressing state, and a virtual golf ball (hereinafter, simply referred to as "ball") 306 that is teed-up is placed at a predetermined position. As described above, the background image 308 is displayed in the hitting operation screen 300. In an example shown in FIG. 10, as the background image 308, virtual objects such as the teeing area, left and right tee markers, fairways, trees, sky and clouds are displayed. Moreover, in FIG. 10, a virtual pin 310 is displayed at approximately center of the hitting operation screen 300.

Moreover, a display area 312 for displaying the type of club 304 used by the player character 302 for hitting is provided in a lower right corner portion of the hitting operation screen 300. If the type of club 304 is changed, an image of the club 304 is changed to an image corresponding to a club 304 that is changed. At this time, the type of club 304 displayed in the display area 312 is also changed. In this embodiment, it is possible to change the type of club 304 by depressing the L button 38 or the R button 60. If the L button 38 is depressed, the type of club is changed to a club 304 longer than the current club 304, and the type of club is changed to a club 304 shorter than the current club 304 if the R button 60 is depressed. However, the club to be used can be selected out of the clubs 304 having being determined to use in the equipment selection screen 250.

Furthermore, a power gauge 320 for determining a force for hitting the ball (i.e., a hitting power) is displayed in a lower portion of the hitting operation screen 300. An area MA (in this embodiment, referred to as a "meet area") for determining a position hitting the ball 306 is formed in a portion of the power gauge 320, and the center of the meet area MA is set as a position P of hitting the ball squarely. An inverted triangle index image 322 is displayed at the position P above the power gauge 320. The index image 322 moves leftward at a constant speed if the player directs a start of hitting operation, and if moving a left end, the index image 322 moves rightward. While the index image is moving, the player gives directions for determining the hitting power and directions for determining the hitting position.

The hitting power is expressed by 0-100 percent (%), and in case of 100 percents, a flight distance of the ball is set as a maximum flight distance of the club 304 to be used. Moreover, when the hitting power is less than 100 percent, the flight distance of the ball 306 is set to a value obtained by multiplying the maximum flight distance by the ratio indicated by the hitting power.

A position of hitting is a position that a face of the club 304 hits the ball 306, and as the position deviates from the position P, a position that the face of the club 304 hits the ball 306 deviates from the center of the ball 306. Therefore, an amount of a side spin of the ball 306 to be hit is determined according to an amount of deviation of a position of the ball 306 to be hit by the face from the center of the ball 306. Therefore, a trajectory of the ball 306 that is moved becomes a draw, hook, fade or slice.

In addition, if a hitting position outside the meet area MA is designated, a miss shot or a missed swing will occur.

For example, directions to start the hitting operation, to determine the hitting power and to determine the hitting position all can be issued by operating the A button 53. That is, for the hitting operation, the A button 53 is depressed three (3) times. The hitting operation is started in response to first depression, and the index image 322 starts to move leftward. The hitting power is determined in response to second depression, and if the index image 322 reaches the left end of the power gauge 320, the same turns back and moves rightward. The hitting position is determined in response to third depression. Although illustration is omitted, the hitting operation including putting is the same for the second and subsequent strokes. Moreover, if the player character 302 is moved to the arrival position of the ball 306, that is, if a distance up to the ball 306 becomes less than a first predetermined distance (for example, 50 cm in the virtual space), the player character 302 will be in a state of the address, and a next hitting operation becomes executable.

In addition, the hitting operation is an example and does not need to be limited. In other embodiments, the hitting position may be determined automatically.

In the competition game A, the player character 302 and all the competitive partner characters start tee shots simultaneously in the teeing area of the same hole. In the competition game A, a tee shot corresponds to the "first shot". That is, the player character 302 and all the competitive partner characters execute the first shot simultaneously.

After hitting the ball 306, the player character 302 is moved in the hole according to an operation of the player. In this embodiment, after hitting the ball 306, the player character 302 is prepared to run in a direction of a movement destination of the ball 306 (for example, a direction that the ball 306 flies out, or a landing point or an arrival position that is determined by calculation). When the player tilts the analog stick 32, the player character 302 is moved in a tilted direction. However, the player character 302 is moved at the basic speed during normal movement except for special movement or simple high-speed movement described later. Therefore, the player character 302 can be moved toward the position for next hitting, dash oneself against the competitive partner character, or acquire the item fallen in the hole. In this embodiment, as the items, an item increasing the residual quantity of a special parameter described later, there are an item making the moving speed be a high speed for a predetermined period of time, an item making the moving speed be a low speed for a predetermined period of time, an item interfering with movement of the competitive partner character and an item capable of preventing from interference by the competitive partner character. However, as the item interfering with movement of the competitive partner character, a plurality types of items are provided.

In addition, the hitting including a tee shot and movement of the competitive partner characters are controlled according to operations of respective players. However, as described above, the player of the competitive partner character is another human player or a computer player.

Moreover, performing the first shots simultaneously means that the first hitting operations (or hitting processing) can be performed in parallel with each other, and not only the moments of impact (that is, the moments of hitting the ball 306) are simultaneous, but also the starts of the hitting operations are simultaneous and the starts of play from the teeing area are also simultaneous. The same is true for making the first shots simultaneously in the competition game B.

Moreover, a parameter gauge 330 is displayed in an upper left corner portion of the hitting operation screen 300. Moreover, an index image 340 is displayed in an upper center of the hitting operation screen 300. The parameter gauge 330 determines whether the player character 302 can execute a special technique (corresponding to "special action"), and displays a residual quantity of the parameter for restricting the number of executable times (hereinafter, referred to as a "special parameter"). In this embodiment, the parameter gauge 330 is a ring-shaped figure, and an inside thereof, a face image of the player character 302 that the residual quantity of the special parameter is to be indicated by the parameter gauge 330 is displayed. Moreover, the index image 340 is an image for designating a direction of the pin 310, and in particular, when the pin 310 cannot be seen in the hitting operation screen 300, it serves as an index of a direction that the ball 306 is to be hit or a direction that the player character 302 is to be moved.

A value of the special parameter is 100 (one-hundred) at the maximum, and if the special technique is executed, a first predetermined quantity (for example, 20 (twenty)) is subtracted or consumed, and if the special technique is not executed, a second predetermined quantity (for example, 1/60) is added at every second predetermined period of time (for example, 1 (one) frame). However, a frame is a unit time for screen update, and is 1/60 seconds in this embodiment. That is, the second predetermined quantity is 1 (one) in 1 (one) second. Therefore, if a frame is 1/30 seconds or 1/120 seconds, the second predetermined quantity is set as 1/30 or 1/120.

In this embodiment, the special technique includes a technique to be directed at the time of hitting operation (hereinafter, referred to as a "special shot") and a technique to be directed at the time of moving operation (hereinafter, referred to as a "special movement"). Therefore, the special parameter is consumed in both of case of executing the special shot is executed and case of executing the special movement. Thus, since the special parameter is shared by the special shot and the special movement, a strategic characteristic as to whether to execute the special technique at the time of shot or at the time of movement occurs.

The special shot can be executed if a predetermined button (for example, the X button 55) is depressed between first-time depression of the A button 53 and third-time depression of the A button 53 during the hitting operation. However, when the residual quantity of the special parameter is less than the first predetermined quantity, directions of the special shot are disregarded and thus the special shot cannot be executed.

In this embodiment, if the special shot is executed, a predetermined effect appears when the ball 306 that is hit by the player character 302 lands or stops. For example, a shock wave is generated radially centering on the landed or stopped position. Then, the competitive partner character or/and the ball of the competitive partner character existing in a predetermined range centering on the landed or stopped position (for example, within a circle or hemisphere with a radius of 10 (ten) meters in virtual space) is blown away. A direction that the competitive partner character or/and the ball of the competitive partner character is blown away is a direction that the shock wave is generated. Therefore, when the competitive partner character or/and the ball of the competitive partner character exists on or near the green, for example, depending on the position that the ball 306 of the player character lands or stops, the competitive partner character or/and the ball of the competitive partner character is moved away from or closer to a cup. That is, when the special shot is executed, there occurs a case where the play of the competitive partner character is interfered or a case where the play of the competitive partner character is assisted.

Figure 11:
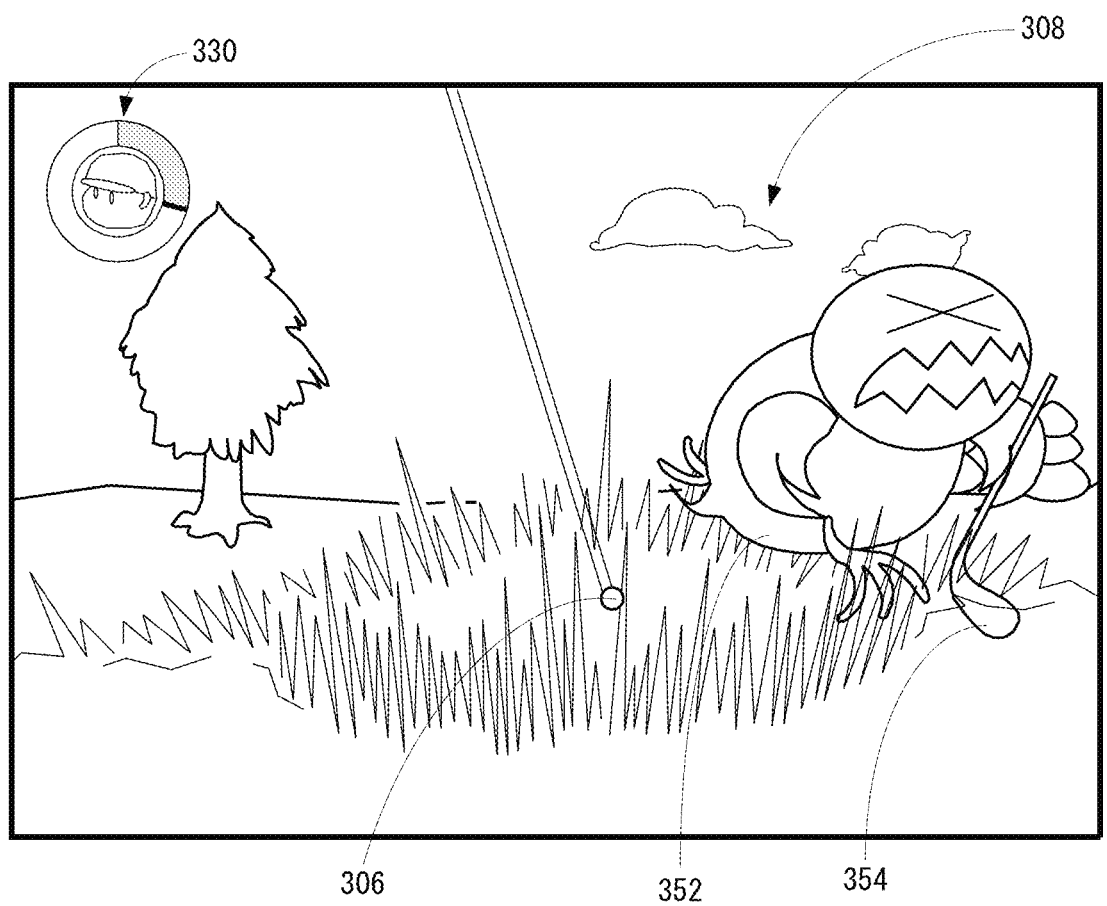
FIG. 11 is a view showing a non-limiting example shock screen.

FIG. 11 shows a non-limiting example shock screen 350. The shock screen 350 of FIG. 11 shows a manner that the player of the player character 302 directs the special shot in the hitting operation, the ball 306 that is hit by the player character 302 lands, and the competitive partner character 352 is blown away by the shock wave.

In addition, although illustration is omitted, if a plurality of the competitive partner characters 352 exist in the predetermined range that the shock wave affects, the plurality of the competitive partner characters 352 are blown away by the shock wave, and in this case, the parameter gauges 330 of each of the plurality of competitive partner characters 352 are displayed side by side (or vertically) in the upper left of the screen.

Moreover, in other examples, the terrain of a landing point is changed. Specifically, a hole or hollow of a predetermined size is formed centering on the landing point of the ball 306 that is hit by the special shot, an object of a virtual rock is placed at the landing point, or the ground of a predetermined range centering on the landing point is changed from a plane to a slope (for example, an uphill slope or/and a downhill slope), whereby it is possible to move the competitive partner character 352 or/and the ball 356 used by the competitive partner character 352, to lower the moving speed of the competitive partner character 352, or to make difficult for the competitive partner character 352 to hit the ball 356. However, depending on the character, there is a case where the moving speed is not changed or inversely made higher. For example, when the plane ground is changed to an uphill slope, the moving speed of the character that is moved on the ground is lowered, but the moving speed of the character that is moved in the air is not changed. For example, when lowering the moving speed, the basic speed is set a first predetermined multiple (magnification is smaller than 1 (one)). Moreover, in a case where the competitive partner character 352 can be moved by sliding on a downhill slope, if the ground under movement is changed to a downhill slope, the moving speed is made higher. For example, when making the moving speed higher, the basic speed is set a second predetermined multiple (magnification is larger than 1 (one)).

In addition, although the player causes the player character 302 to execute the special shot for a purpose of interfering with the movement of the competitive partner character 352 basically, as described above, in some cases, this results in assisting the movement of the competitive partner character 352. Moreover, when the player causes the player character 302 to execute the special shot, the movement of player character 302 himself/herself may be interfered.

Figure 12:
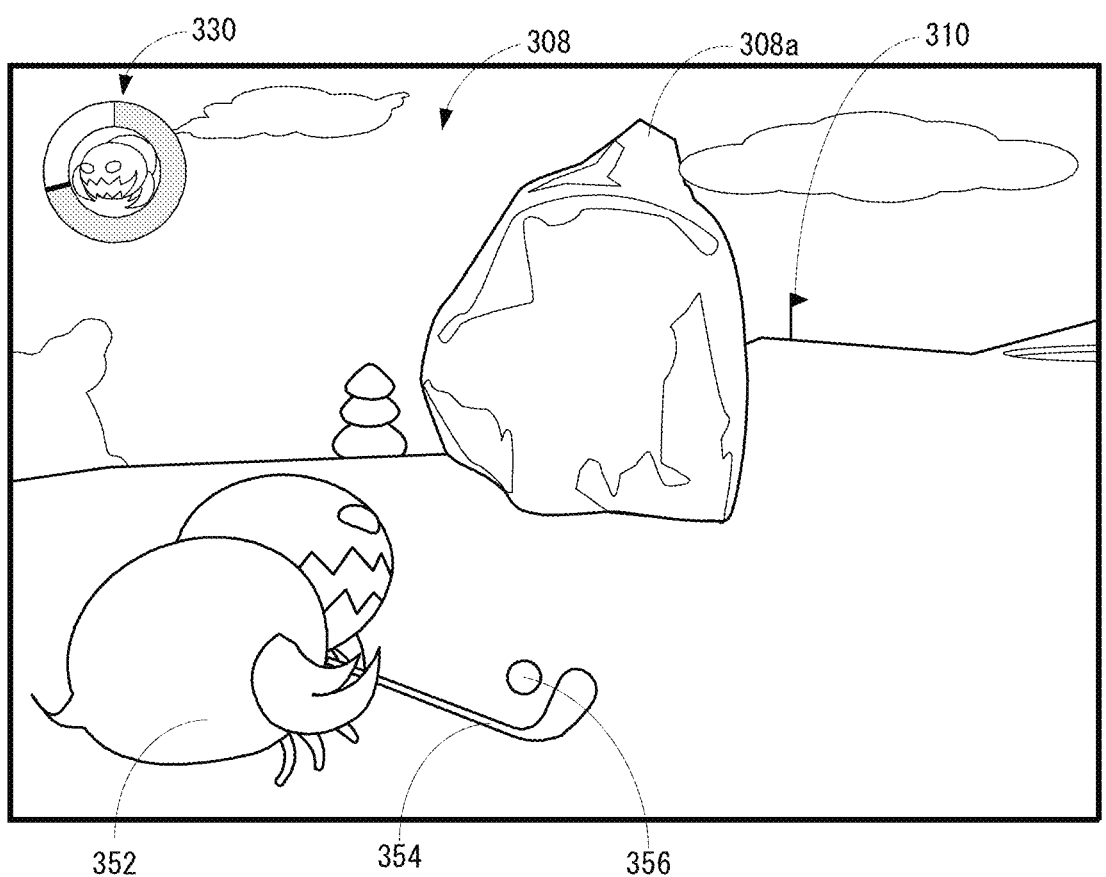
FIG. 12 is a view showing a non-limiting example field deformation screen.

FIG. 12 shows a non-limiting example field deformation screen 400 when the terrain is deformed. In the field deformation screen 400 shown in FIG. 12, a large rock object 308a appears in front of the competitive partner character 352 on the fairway. Therefore, the competitive partner character 352 cannot hit the ball 356 toward the pin 310 straightly. That is, it is difficult for the competitive partner character 352 to hit the ball 356.

However, the deformation of the terrain does not need to be limited to the ground, and a shape in the air may be deformed. For example, in a predetermined range centering on the landing point of the ball 306 that is hit by the special shot or on any point in the trajectory of the ball 306, a virtual black hole may be formed in the air, or a virtual object that imitates a wall, a balloon and an airship may appear. In this case, movement of the competitive partner character 352 that is moved in the air is interfered, the competitive partner character 352 cannot hit the ball 356 toward the pin 310 straightly, or the ball 356 that is hit by the competitive partner character 352 is sucked into the virtual black hole or collides with the virtual object.

Figure 13:
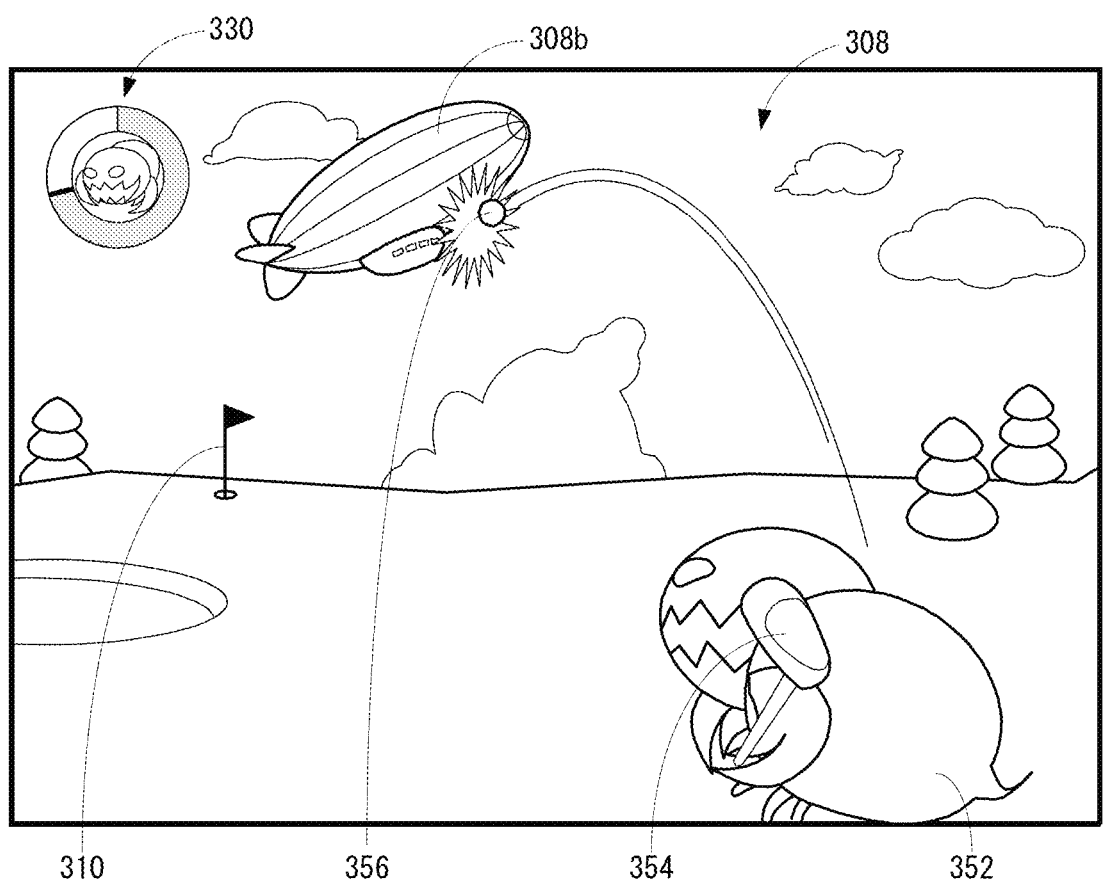
FIG. 13 is a view showing another non-limiting example field deformation screen.

FIG. 13 shows another non-limiting example field deformation screen 450 in a case where a shape in the air is changed. In the field deformation screen 450 shown in FIG. 13, an object 308b imitating an airship appears in front of the competitive partner character 352 in the air above a certain hole. That is, a shape in the air is change from a mere sky to a sky containing the object 308b. Moreover, the ball 356 that is hit by the competitive partner character 352 collides with the object 308b and rebounds. Therefore, as for the competitive partner character 352, the number of strokes is increased and the required time from a tee shot up to a cup-in is lengthened.

In addition, when the object 308b imitating an airship appears prior to hitting the ball 356 by the competitive partner character 352, it may be difficult for another player using the competitive partner character 352 to hit the ball 356.

Thus, the game field includes not only on the ground but also in the air, and it is possible to deform the shape on the ground or/and in the air by the special shot.

Moreover, the property of on the ground or/and in the air may be changed. Specifically, in a predetermined range centering on the landing point of the ball 306 that is hit as the special shot by the player character 302, the property of a ground or a water surface is changed. Examples of changes of the ground properties include a change of a fairway to a rough or bunker or pond, and a change of a shallow rough to a deep rough. Moreover, a lie may be simply changed. For example, in the bunker, the ball 356 resting on the sand becomes a so-called fried egg. Moreover, examples of changes of the property of the water surface include a change the water surface of pond or river to ice, and a change pond or river to a sand place.

Furthermore, a shape or a property of the ball 356 may be changed. Specifically, in a case where the competitive partner character 352 or the ball 356 used by the competitive partner character 352 exists in a predetermined range centering on the landing point of the ball 306 that is hit as the special shot by the player character 302, when the competitive partner character 352 hits the ball 356 next, the ball 356 is changed from a spherical shape to an ellipsoidal shape or a polyhedral shape, or the weight of the ball 356 or the gravity applied to the ball 356 is increased. This makes it possible to prevent the ball 356 from flying or rolling as intended by another player.

Figure 14:
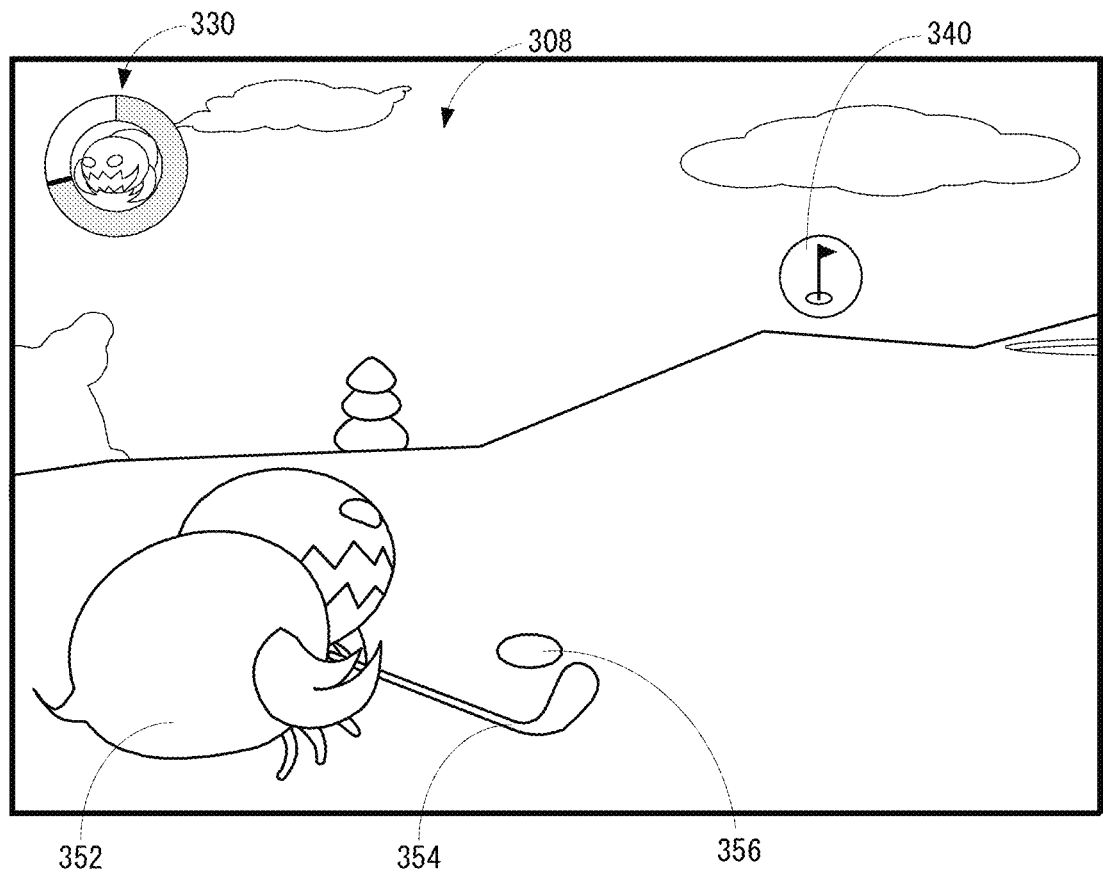
FIG. 14 is a view showing a non-limiting example ball deformation screen.

FIG. 14 shows a non-limiting example ball deformation screen 500 in a case where a shape of the ball 356 is changed. In the ball deformation screen 500 shown in FIG. 14, the shape of the ball 356 that the competitive partner character 352 uses is deformed from a spherical shape to an ellipsoidal spherical shape. Therefore, when the competitive partner character 352 hits the ball 356, the ball 356 is flied in a direction unintended by another player, or bounced in a direction unintended by another player. Therefore, as for the competitive partner character 352, the number of strokes-is increased and the required time from a tee shot up to a cup-in is lengthened.

Moreover, although an influence (or effect) is set to affect a predetermined range centering on the landing point of the ball 306 by the special shot in this embodiment, it does not need to be limited to this. The competitive partner character or the ball 356 used by the competitive partner character may be affected by the ball 306 that is hit as the special shot.

Thus, the effect produced by the special shot is various, and usable special shot is set for each character. However, the usable special shot may be arbitrarily set by the player.

Moreover, the special movement is executed by depressing a predetermined button (for example, the X button 55) during the time that the player character 302 is moved, after hitting the ball 306, to a position that the ball 306 is to be hit next, i.e., the arrival position of the ball 306. However, when the residual quantity of the special parameter is less than the first predetermined quantity, directions of the special movement are disregarded and thus the special movement cannot be executed.

In this embodiment, if the special movement is executed, the player character 302 is made to execute a predetermined attack and to be moved at a high speed for a third predetermined period of time (for example, few or several seconds). The predetermined attack is set for each character, and includes dashing oneself against the competitive partner character 352 to thrust away, or giving a shock to the competitive partner character 352 to temporarily stop the movement thereof. An attack that gives a shock to the competitive partner character 352 includes spraying water or fire, giving an electric shock, punching or kicking and trampling. However, the predetermined attack may be arbitrarily set by the player.

Although the above description explains a case where the player character 302 executes the special shot or the special movement, there is a case where the competitive partner character 352 can execute a special shot and special movement. In such a case, the player character 302 receives an effect by the special shot and an attack in the special movement. That is, the player character 302 is interfered from moving or hitting by the competitive partner character 352.

Figure 15:
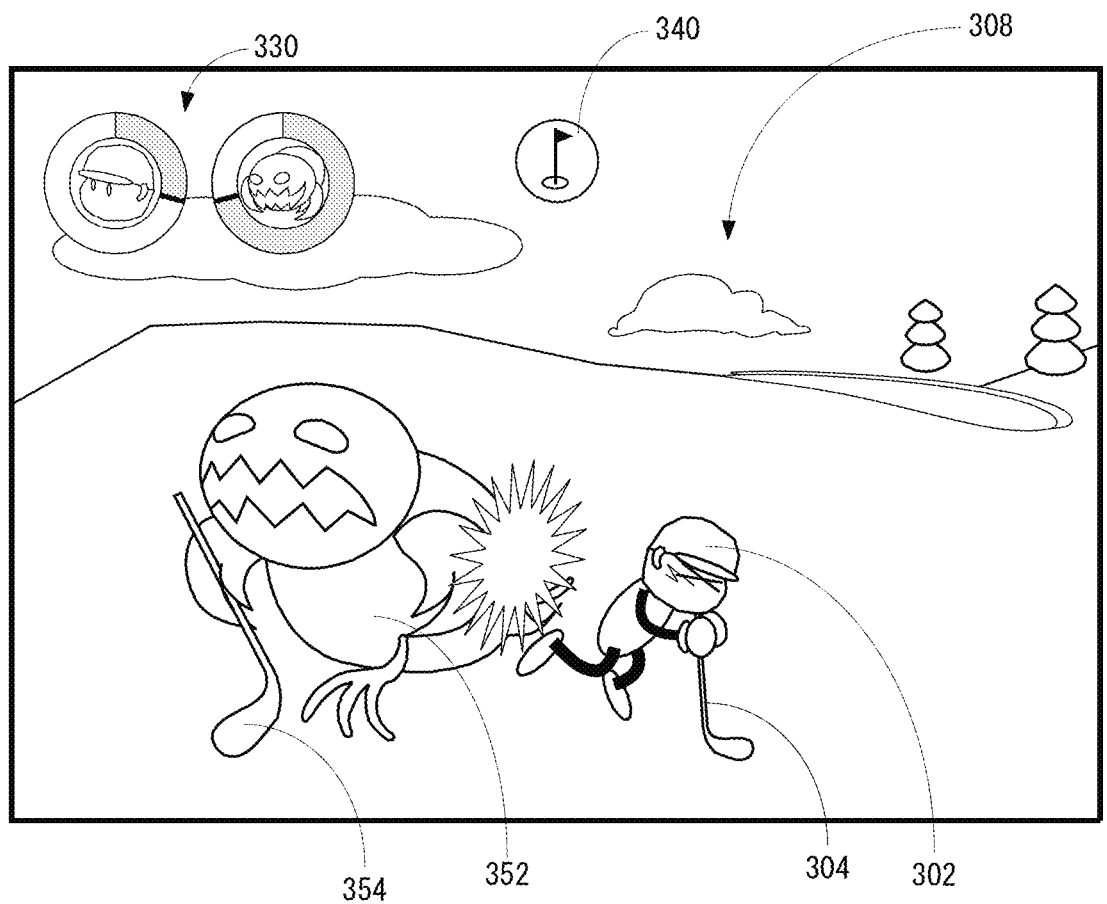
FIG. 15 is a view showing a non-limiting example movement screen.

FIG. 15 shows a non-limiting example movement screen 550. The movement screen 550 of FIG. 15 shows a manner that the competitive partner character 352 is directed to execute the special movement so as to dash oneself against the player character 302, whereby the player character 302 is thrust away. In this movement screen 550, since the player character 302 and the competitive partner characters 352 are displayed, the parameter gauges 330 for respective characters are displayed side by side at the upper left of the screen.

In addition, although illustration is omitted, when another competitive partner character 352 exists near the player character 302, it may be rammed and thrusted away, similar to the player character 302.

Moreover, although the special parameter consumed when the special shot and the special movement are executed are both set to the first predetermined quantity in this embodiment, this is an example, and quantities of the special parameter consumed by the special shot and the special movement may be different from each other. Moreover, the first predetermined quantity may be changed dependent on the types of the character, the special shot and the special movement.

Moreover, in this embodiment, by consuming the special parameter, the player character 302 can be moved at a high speed (high speed movement) without using items or the like. In this embodiment, if a predetermined button (for example, the B button 54) is depressed during movement of the player character 302 to the arrival position of the ball 306, the moving speed is made higher for a fourth predetermined period of time (few or several seconds, for example) with consuming the special parameter by a third predetermined quantity (10 (ten), for example).

However, if a third predetermined period of time elapses from the start of the special movement and the operation of the special movement is continued even after the special movement is ended, the player character 302 is moved at a high speed, and a value of the special parameter is subtracted by the third predetermined quantity every fourth predetermined period of time (few or several seconds, in this embodiment).

In addition, as described above, also in a case where the player character 302 is moved at the basic speed, the special parameter is increased by the second predetermined quantity every second predetermined period of time. However, the special parameter is not increased exceeding the maximum value.

Figure 16:
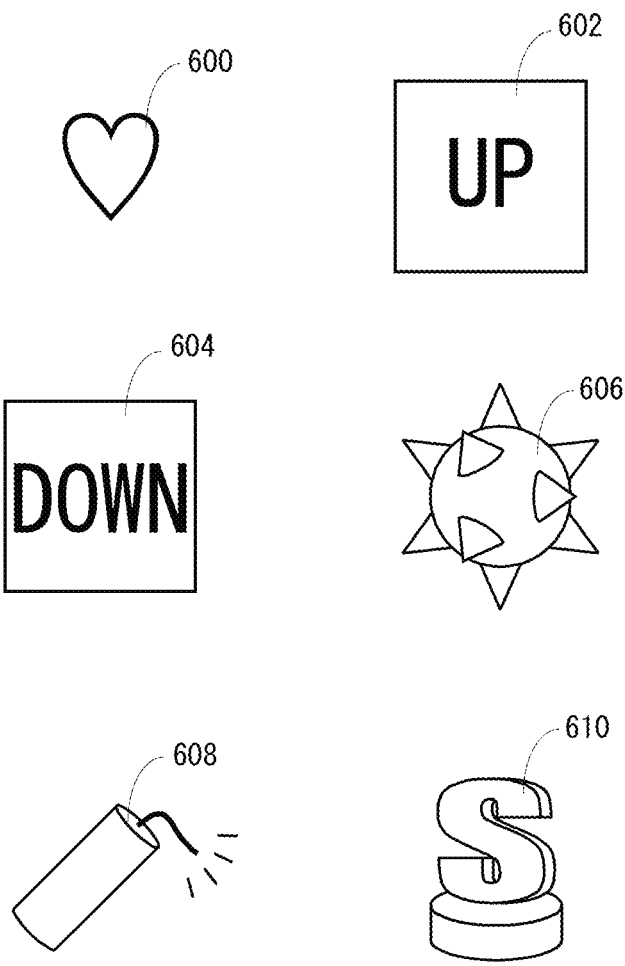
FIG. 16 is a view showing non-limiting example items arranged in a game field.

FIG. 16 shows examples of the items arranged in a course. As described above, five (5) items 600, 602, 604, 606, 608 and 610 are shown in this embodiment. If acquiring the item 600, the residual quantity of the special parameter is increased by a predetermined quantity or up to the maximum value. If acquiring the item 602, the moving speed is made higher for a predetermined period of time. If acquiring the item 604, the moving speed is made lower for a predetermined period of time. If being hit, the item 606 is moved in a direction to the head or top competitive partner character 352 and collides with it, thereby to stop the movement and the action of that character 352 for a predetermined period of time. If being hit, the item 608 is flied in a hit direction by a second predetermined distance (for example, several meters to several tens of meters in the virtual space), falls and explodes. As a result, the movement and action of the competitive partner character 352 affected by bombing is stopped for a predetermined period of time. If acquiring the item 610, it becomes a state not receiving the interference by the competitive partner character for a predetermined period of time.

In addition, as for items 600, 602, 604 and 610, the effect is immediately generated by acquiring the item, but the effect may be generated when the player directs to use the item. Whether the player directs to use it may be set for each item.

Moreover, although the items 606 and 608 (corresponding to a "shot-able object") are designed to be hit, an affect thereof may be generated when the player directs to use the item 606 or 608 while acquiring it. In this case, it is not necessary to hit the items 606 and 608.

Furthermore, although the objects concerning on the items 600, 602, 604, 606, 608 and 610 arranged in the game field are shown here, the items 606 or/and 608 may be constituted with non-player characters. In this case, the player character 302 and the competitive partner characters 352 can generate the above-described predetermined effects by hitting the non-player character that moves on the game field.

The competition game A is a game with contents similar to a speed golf, and in this competition game A, the required time and the number of strokes from a tee shot up to a cup-in are recorded for each hole, and a player with the least amounts of time and strokes concerning on all holes wins the competition game A. For example, a score may be calculated based on a predetermined formula from the required time and the number of strokes, and a player with a lower or higher score may win, or the required time may be converted into the number of strokes based on a predetermined formula, and a player with smaller total number of strokes may win. In addition, a victory or defeat is determined for each hole, and a final victory or defeat may be determined based on the number of wins for all the holes. Therefore, as described above, the player increases, by interfering with the play of the competitive partner character 352, the time and the number of strokes which are required for the play of the competitive partner character 352. For this reason, a player having the knowledge of golf does not necessarily become advantageous, in a scene considering a landing point for a better target or selecting a club. That is, it is possible to improve the interest of golf game. The same applies to the competition game B described later.

Next, the competition game B will be described. A hitting operation, a movement operation, an operation of the special shot and an operation of the special movement in the competition game B are the same as those of the competition game A, and therefore, duplicate description will be omitted.

Figure 17:
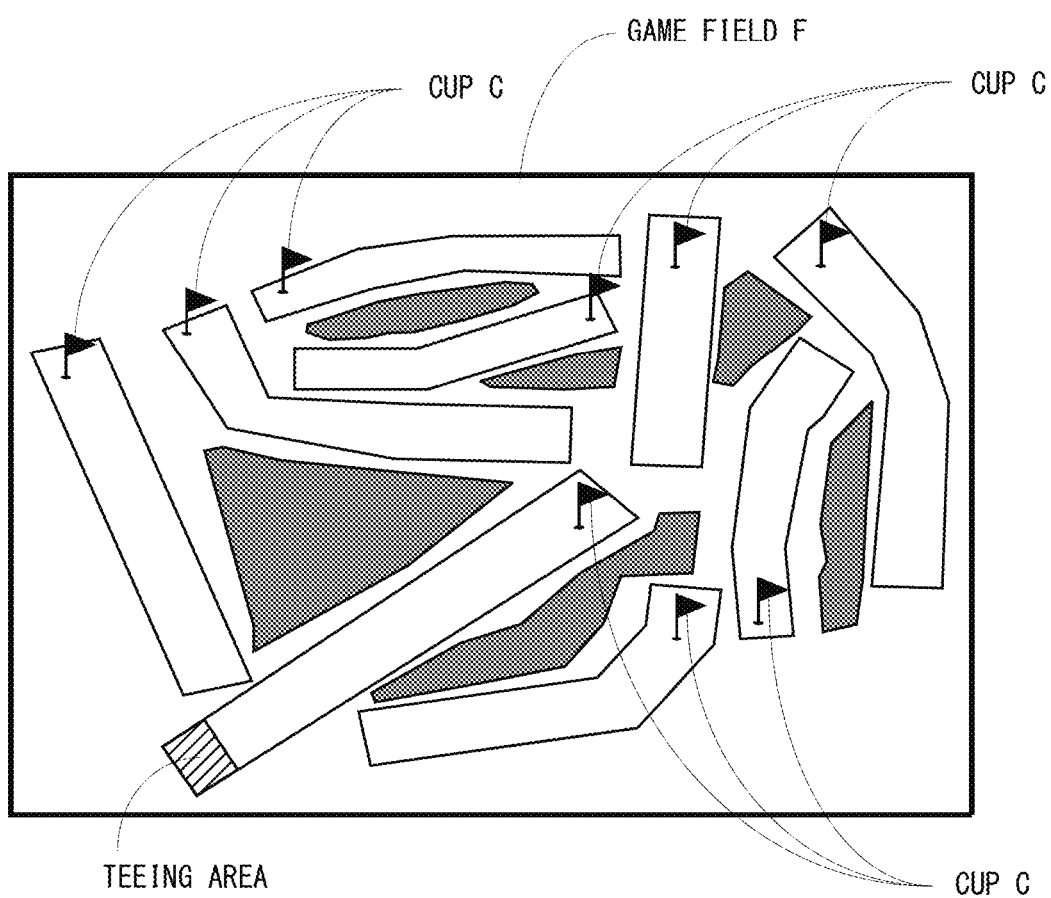
FIG. 17 is a view showing a non-limiting example game field of a competition game B.

As shown in FIG. 17, in the competition game B, a plurality (in FIG. 17, nine (9)) of cups C are formed in a stage generated in a game field F. Each of the cups C is provided on a virtual green. Although an area similar to a hole is formed in the game field F, a hole itself is not provided. In the competition game B, each character is moveable in the game field F.

In addition, in FIG. 17, the game field F is indicated as a two-dimensional rectangle viewing a three-dimensional virtual space from the above.

In FIG. 17, each of a plurality of areas that are surrounded by solid lines so as to include each of the cups (excluding a rectangular outer frame indicating a range of the game field F) is an area that a lawn is cut short like the fairway, and an outside thereof is an area that a lawn is slightly lengthened like the shallow rough. Moreover, areas smeared away black are deep roughs, ponds, valley bottoms or trees. That is, the area smeared away black is an area that it is difficult for the player character 302 and all the competitive partner characters 352 to move, depending on ways for movement (in this embodiment, moving on the ground or moving in the air). However, each of the plurality of areas enclosed with a solid line may be provided with not only the fairway but also virtual hazards such as a bunker, a pond, a creek, etc.

The competition game B is a domination game or a game of grabbing a place, and a player who uses a character with the larger number of cups C that are cupped-in ahead of all other characters wins in this competition game B. A victory or defeat of the competition game B is determined at the time that balls 306 and 356 are cupped-in into all the cups C. In this competition game B, a single teeing area is provided, and the player character 302 and all the competitive partner characters 352 start to play simultaneously from this teeing area. That is, tee shots (corresponding to a "first shot") are executed simultaneously.

In addition, it may be made that the player can freely select a position where the tee shot is to be executed in the teeing area. Moreover, it may be also made that all the characters execute tee shots at the same position in the teeing area. The same applies to a predetermined area 702 described later.

However, which cup C to aim for can be determined by the player. That is, a cup C desired to cup-in the balls 306 and 356 can be determined according to the strategy of a player. Therefore, since there occur no interference between the player character 302 and the competitive partner characters 352 if the cups C are arranged apart from each other in the game field F, in this embodiment, the plurality of cups C are located comparatively closer to each other.

Moreover, since the teeing area is provided only in a place that a tee shot is executed at the time of a play start and no hole is provided in the competition game B as described above, in case of a cup-in, the player character 302 and the competitive partner characters 352 are moved to a predetermined position in a predetermined area provided near the green, and execute the hitting in the predetermined position after the cup-in.

That is, in the competition game B, a tee shot in the teeing area and the hitting executed in the predetermined position in the predetermined area provided near the green correspond to the "hitting of first shot".

Figure 18:
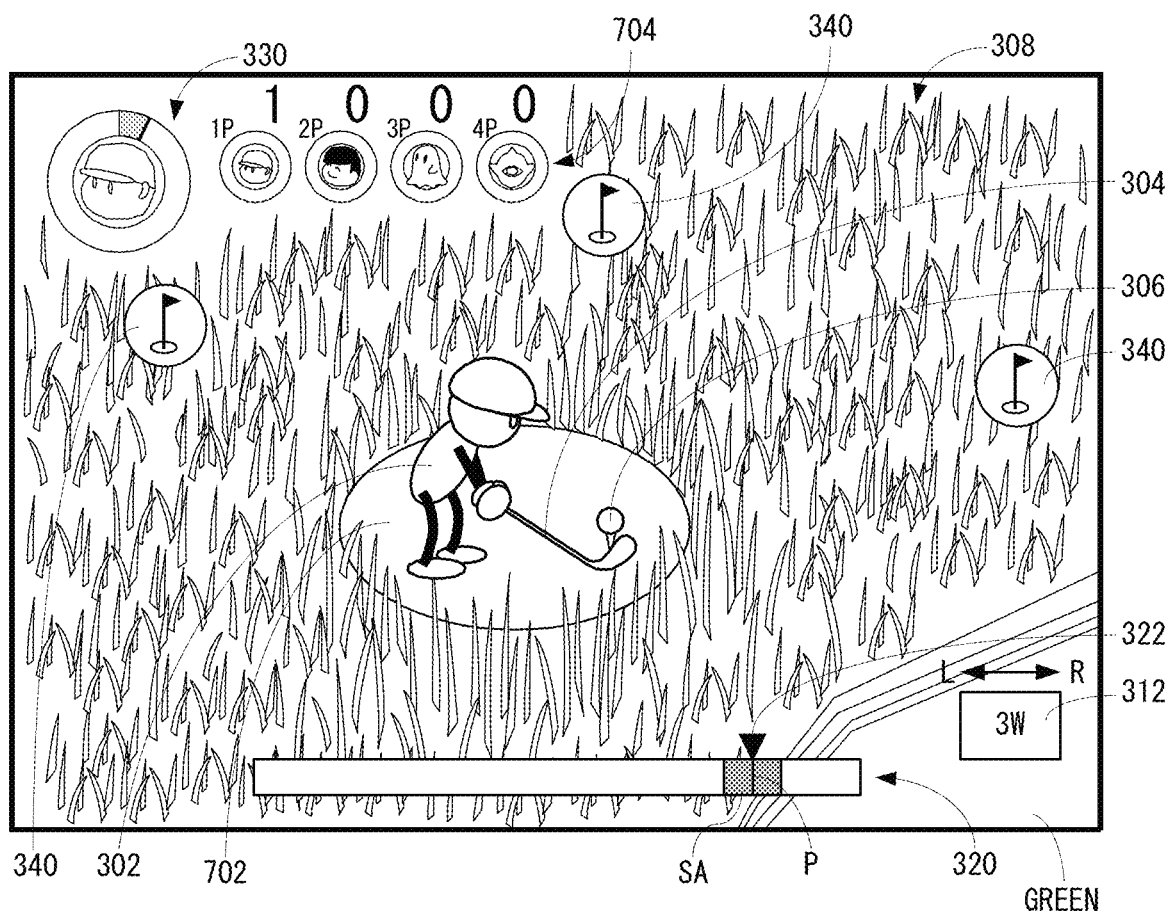
FIG. 18 is a view showing a non-limiting example hitting operation screen of the competition game B.

FIG. 18 shows a non-limiting example hitting operation screen 700 immediately after a cup-in. In the hitting operation screen 700, a predetermined area 702 for next hitting the ball 306 is provided near the green that the ball 306 is cupped-in immediately before. In an example shown in FIG. 18, the predetermined area 702 is an area that a lawn is cut short in a circular shape in a part of shallow rough in the game field F.

The predetermined area 702 is formed in a plurality of places in the game field F, and each of the areas 702 is provided in the predetermined place near each of the cups C (green). In this embodiment, each of the predetermined area 702 is arranged within a range that a distance from at least one of the cups C excluding the cup C that the balls 306 and 356 are cupped-in can be reached, irrespective of the type of the character, within two (2) strokes in total of one shot by a club with a longest flight distance (for example, driver) and one shot by a club of the type other than a putter (PT). Therefore, since each of the characters has likely to be dense comparatively, the player can easily see an action or motion of the competitive partner character 352 existing in front of the player character 302, for example, and can easily measure a position or timing of executing the special shot or special movement.

Moreover, in this embodiment, if making the ball 306 cup-in, the player character 302 is automatically moved, with running, to the predetermined position in the predetermined area 702 provided corresponding to the green formed with the cup C that the ball 306 is cupped-in. However, the player character 302 may be moved to the predetermined position in the predetermined area 702 so as to warp, or it may be moved to the predetermined position in the predetermined area 702 according to an operation of the player.

However, it does not need to be limited to forming the predetermined area 702, and when the balls 306 and 356 are cupped-in, the player character 302 and each of the competitive partner characters 352 may be made to execute next hitting in predetermined positions that are set corresponding to the cup C on the green.

In addition, in any cases, the balls 306 and 356 are automatically teed up to the next hitting position.

Thus, since the next hitting is executed from the predetermined position in the predetermined area 702 that is set according to the cup C having been cupped-in or from the predetermined position on the green, when a superior character having cupped-in ahead of all other characters executes the hitting, for example, by arranging in the air an object that interferes with the hitting, it is possible to give a little task and interfere with the hitting of the superior character.

Moreover, in the hitting operation screen 700 shown in FIG. 18, when hitting the ball 306 from the predetermined position within the predetermined area 702, it is possible to aim any one of a plurality of (here, three (3)) pins 310, and therefore, a plurality of (three (3)) index images 340 are displayed in order to indicate directions of the pins 310, respectively.

Although illustration is omitted, when the plurality of index images 340 are displayed, colors or/and sizes of the index images 340 may be changed according to distances to the pins 310.

Furthermore, in the hitting operation screen 700 shown in FIG. 18, a face image 704 for each of the player character 302 and the three (3) competitive partner characters 352 are displayed on a right side of the parameter gauge 330, and numerals are shown above thereof. These numerals indicate the numbers of the cups C having cupped-in ahead of other characters. Therefore, the player can know a current situation by looking at the numerals. In an example shown in FIG. 18, the number of cups C that the first player, i.e., the player character 302 cups-in ahead of other characters is 1 (one), and the numbers of cups C that the second player, the third player and the fourth character, i.e., the three (3) competitive partner characters 352 cup-in ahead of other characters are 0 (zero), respectively.

Figure 19:
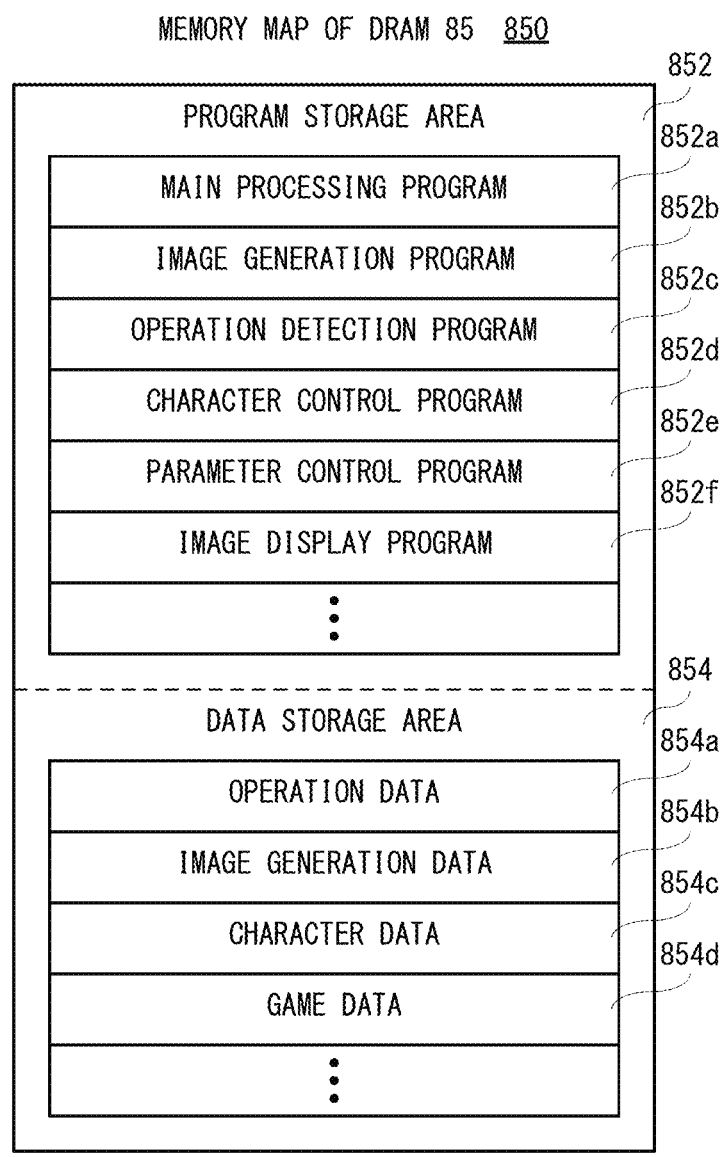
FIG. 19 is an illustration view showing a non-limiting example memory map of a DRAM of a main body apparatus shown in FIG. 6.

FIG. 19 is an illustration view showing a non-limiting example memory map 850 of the RAM 85 of shown in FIG. 6. As shown in FIG. 19, the DRAM 85 includes a program storage area 852 and a data storage area 854. The program storage area 852 is stored with a game application program (i.e., a game program of golf game). As shown in FIG. 19, the game program includes a main processing program 852a, an image generation program 852b, an operation detection program 852c, a character control program 852d, a parameter control program 852e, an image display program 852f, etc. However, a function of displaying images such as a game image is a function that the main body apparatus 2 is provided with. Therefore, the image display program 852f is not included in the game program.

Although detailed description is omitted, at a proper timing after a power of the main body apparatus 2 is turned on, a part or all of each of the programs 852a-852f is read from the flash memory 84 or/and a storage medium attached to the slot 23 to be stored in the DRAM 85. However, a part or all of each of the programs 852a-852f may be acquired from other computers capable of performing communication with the main body apparatus 2.

The main processing program 852a is a program for executing overall game processing of a virtual game of this embodiment. The image generation program 852b is a program for generating, using image generation data 854b described later, display image data corresponding to various kinds of images such as a game image. The operation detection program 852c is a program for acquiring (receiving) the operation data 854a from the left controller 3 or/and the right controller 4 and the operation data 854a from a further controller so as to store these data in the data storage area 854 in an identifiable manner Here, the further controller is a controller equivalent to the left controller 3 or the right controller 4, or a controller equivalent to a controller that the left controller 3 and the right controller 4 are combined with each other.

The character control program 852d is a program for controlling an action or motion of the player character 202 based on an operation of the player, and controlling an action or motion of the non-player character including the character of the competitive partner character regardless of an operation of the player. The parameter control program 852e is a program for increasing or decreasing (i.e., controlling), for each character, a numerical value of the special parameter between the maximum value (in this embodiment, 100 (one-hundred)) and the minimum value (in this embodiment, 0 (zero)).

The image display program 852f is a program for outputting to a display device the display image data generated according to the image generation program 852b. Therefore, the images corresponding to the display image data are displayed on the display device such as the display 12, i.e., the selection screen 200, the selection screen 250, the hitting operation screen 300, the shock screen 350, the field deformation screen 400, the field deformation screen 450, the ball deformation screen 500, the movement screen 550, the hitting operation screen 700, etc.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with operation data 854a, image generation data 854b, character data 854c and game data 854d.

The operation data 854a is operation data received from the left controller 3 and the right controller 4 and operation data received from a further controller(s). In this embodiment, when the main body apparatus 2 receives the operation data from the left controller 3, the right controller 4 and two or more controllers among the further controllers, the main body apparatus 2 stores the operation data 854a classified into the left controller 3, the right controller 4 and the further controller(s), respectively.

In addition, when a plurality of human players play a golf game, controllers used by the players are associated with the plurality of players or plurality of player characters, respectively, and therefore, the operation data 854a is stored in the data storage area 854 in a manner that the player or player character is identifiable.

Moreover, as for the competitive partner character 352 operated by the computer (processor 81), as an example, the operation data 854a that is generated by the computer (processor 81) is stored in the data storage area 854.

The image generation data 854b is data required for generating the display image data, such as polygon data and texture data. The character data 854c is data concerning on the characters that plays the competition game A or the competition game B of this embodiment (see FIG. 17). The character data 854c will be described in detail later. The game data 854d is data concerning on a middle or result of the golf game (competition game A or B) of this embodiment.

Although illustration is omitted, the data storage area 854 is stored with other data, and provided with other flags and other timers (counters).

Figure 20:
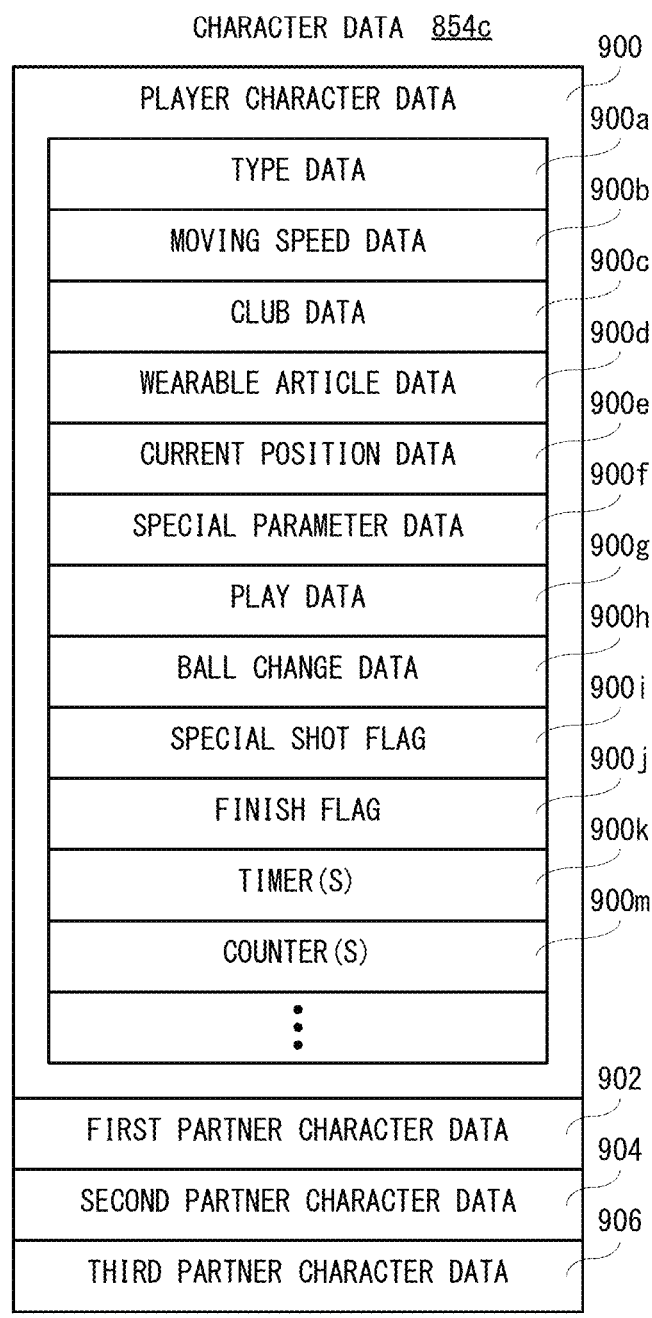
FIG. 20 is a view showing non-limiting example specific contents of character data shown in FIG. 19.

FIG. 20 is a view showing non-limiting example specific contents of the character data 854c shown in FIG. 19. As shown in FIG. 20, the character data 854c is data concerning on the player character 302 and the plurality of competitive partner characters 352 that play the competition game A or the competition game B, and includes player character data 900, first competitive partner character data 902, second competitive partner character data 904 and third competitive partner character data 906.

In addition, since the contents of each of the first competitive partner character data 902, the second competitive partner character data 904 and the third competitive partner character data 906 are the same or similar to the player character data 900, only the player character data 900 is described, and illustration and description concerning on other characters data are omitted here.

As shown in FIG. 20, the player character data 900 includes type data 900a, basic speed data 900b, club data 900c, wearable article data 900d, current position data 900e, special parameter data 900f, play data 900g, ball change data 900h, a special shot flag 900i, a finish flag 900j, a timer 900k, a counter 900m, etc.

The type data 900a is data of a type of the player character 302, and is data concerning on identification information identifying the character selected in the character selection screen 200. The basic speed data 900b is data concerning on the basic speed of the player character 302, and the basic speed is set in advance corresponding to the character, and is changed according to the number of the clubs to be used and the wearable article.

The club data 900c is data indicating the types of the clubs that the player character 302 uses, and it is possible to know the number of clubs according to the types of the clubs that the player character 302 uses. The wearable article data 900d is data indicating wearable article possessed by the player character 302 (or player) in the golf game, and identification information is added to the wearable article having been determined to wear so as to indicate that.

The current position data 900e is coordinates data of a current position (in this embodiment, three-dimensional position) of the player character 302 on the game field provided in the virtual space. The special parameter data 900f is data of a numerical value of the special parameter of the player character 302. The play data 900g is data concerning on the player character 302 in case of playing the competition game A or the competition game B. In case of the competition game A, as the play data 900g, data of the time and the number of the strokes that are required from a tee shot up to a cup-in are stored for each hole. In case of the competition game B, as the play data 900g, identification information of the cup(s) C having been cupped-in by the player character 302 ahead of all the competitive partner characters 352 among the cups C having been cupped-in by the player character 302 is stored.

The ball change data 900h is data whether the shape of the ball 306 is to be changed or whether the property of the ball 306 is to be changed. However, the ball change data 900h is stored as the player character data 900 in the data storage area 854 in a case where the competitive partner character 352 executes the special shot that changes the shape or the property of the ball, and the player character 302 or/and the ball 306 used by the player character 302 exists within the predetermined range centering on the landing point of the ball 356 that is hit by the special shot.

The special shot flag 900i is a flag for determining whether the special shot is executed. When the special shot is executed, the special shot flag 900i is turned on, and when the special shot is not executed, the special shot flag 900i is turned off.

The finish flag 900j is a flag for determining whether the play is finished up to a final hole in the competition game A. When the play is finished up to the final hole in the competition game A, the finish flag 900j is turned on, and when the play is not finished up to the final hole, the finish flag 900j is turned off.

The timer 900k is a counter for counting, in the competition game A, the time required until the player character 302 implements a cup-in after executing a tee shot, for each hole.

The counter 900m is a counter for counting, in the competition game A, the number of strokes required until the player character 302 implements a cup-in after executing a tee shot, for each hole.

In addition, in case of the competition game B, since a condition of a game finish is that the balls 306 and 356 are cupped-in into all the cups C and it is not necessary to determine whether the game is finished for each character, and therefore, the finish flag 900j is not needed. Moreover, since the competition game B is not a game that competes the time and the number of strokes required from a tee shot up to a cup-in for each hole, the timer 900k and the counter 900m are unnecessary. Therefore, when the competition game B is to be executed, the finish flag 900j, the timer 900k, and the counter 900m are not included in the player character data 900. However, if the time required up to a cup-in from a tee shot or a shot immediately after a cup-in is short, possibility of executing a cup-in ahead of all the competitive partner characters 352 becomes high. That is, the length of the required time may affect a victory or defeat of the competition game B.

First partner character data 902 is data concerning on a first competitive partner character 352, and second partner character data 904 is data concerning on a second competitive partner character 352. Third partner character data 906 is data concerning on a third competitive partner character 352.

In addition, when the number of the competitive partner characters 352 is four (4) or more, partner character data is further stored. However, when the number of the competitive partner characters 352 is three (3) or less, the third partner character data 906, or the second partner character data 904 and the third partner character data 906 are not stored.

Figure 21:
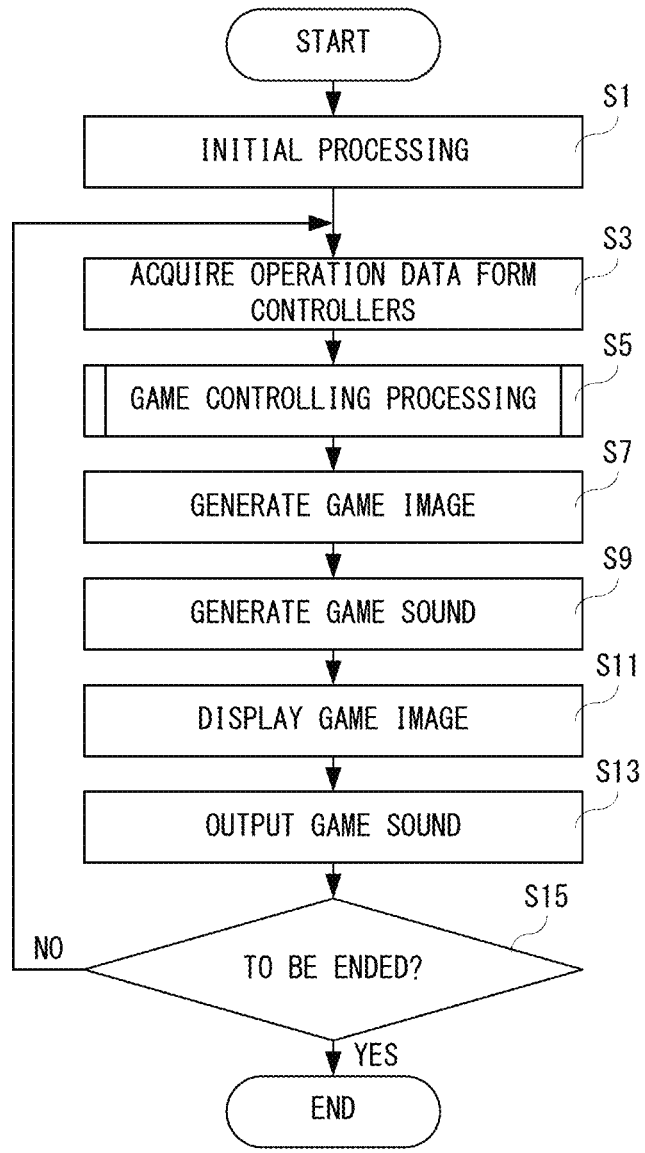
FIG. 21 is a flowchart showing non-limiting example of overall game processing of a processor of the main body apparatus shown in FIG. 6.
Figure 33:
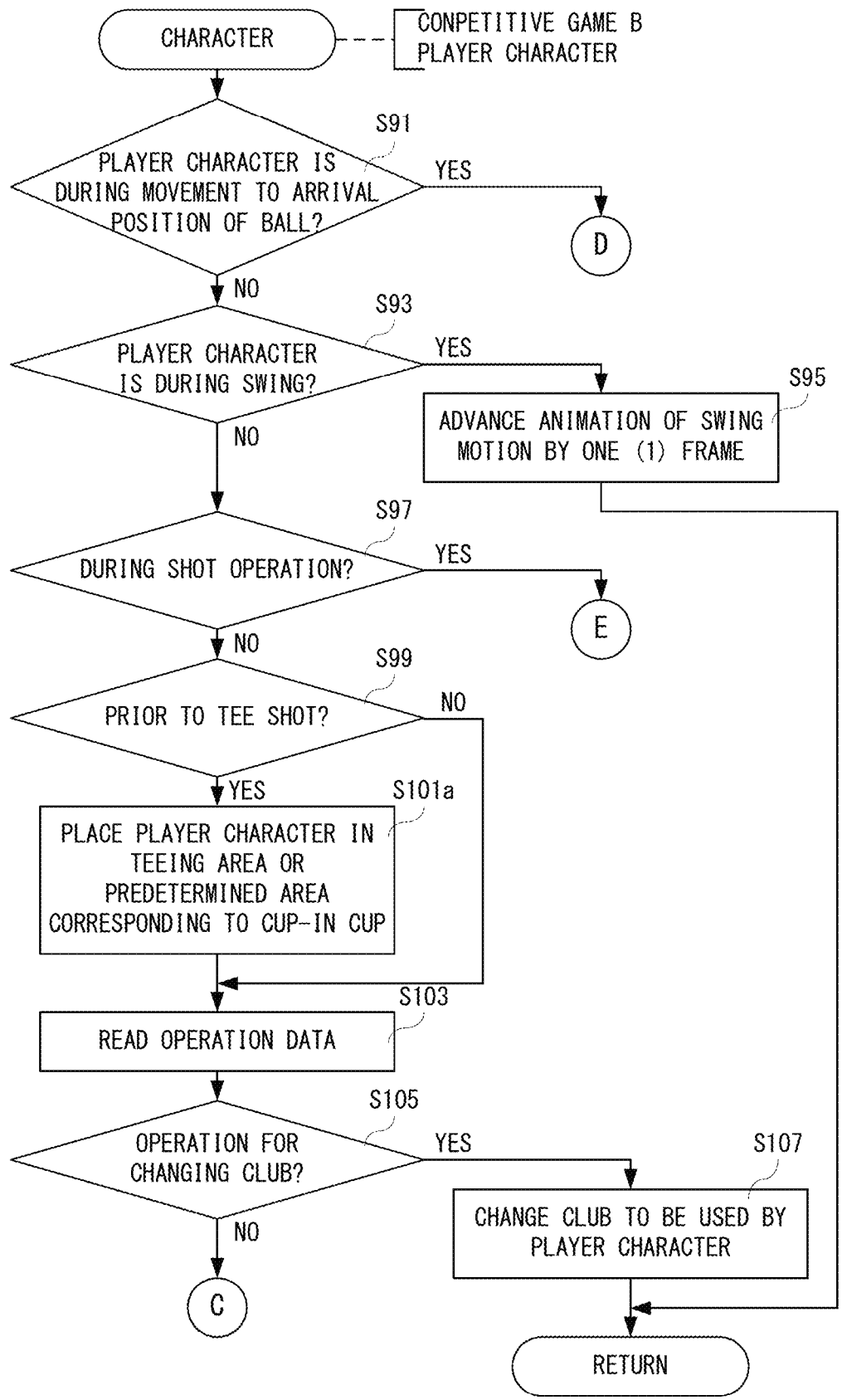
FIG. 33 is a flowchart showing a part of non-limiting example character processing in the competition game B.
Figure 34:
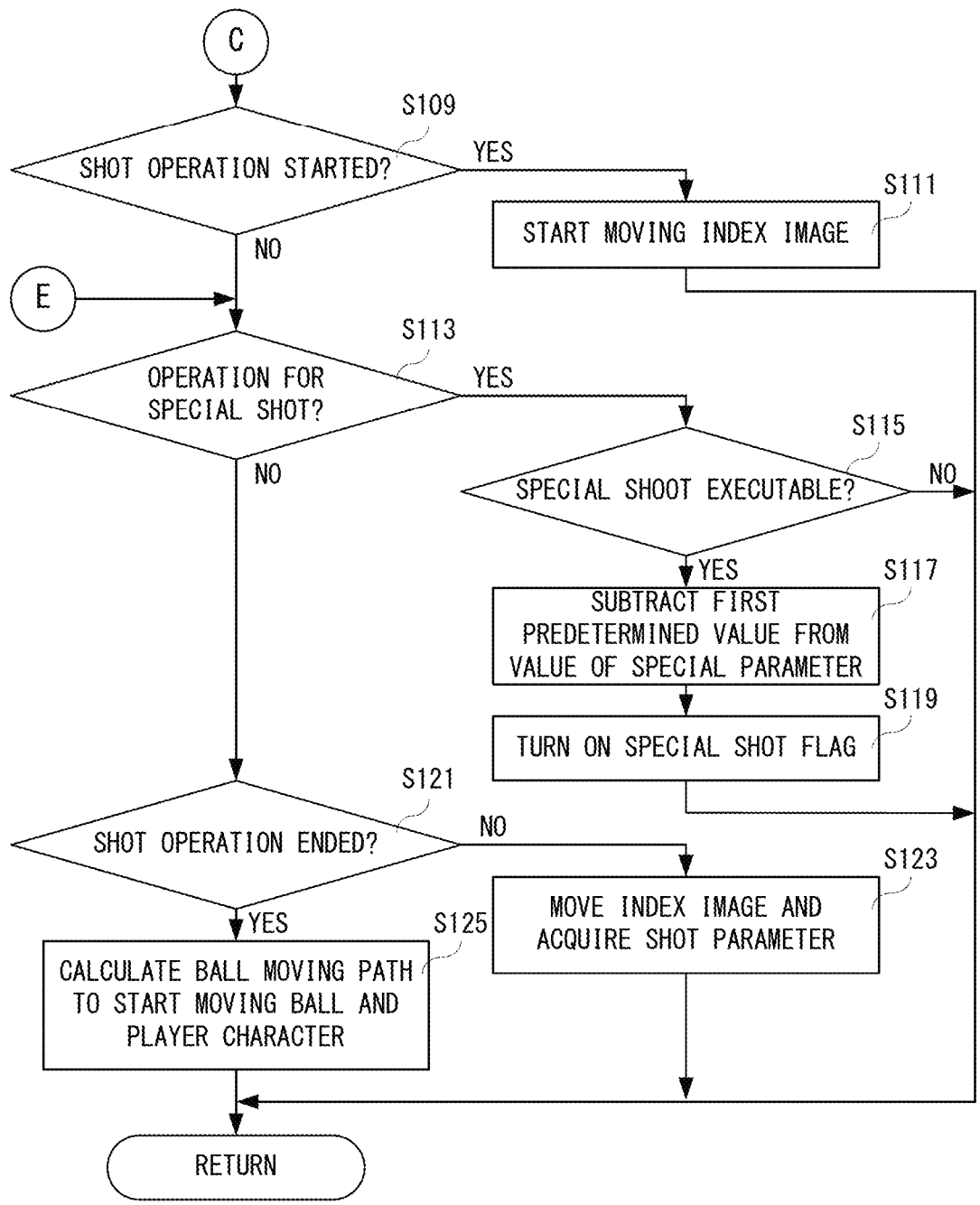
FIG. 34 is a flowchart showing another part of the non-limiting example character processing in the competition game B.

FIG. 21 is a flowchart showing non-limiting example processing of the game program (i.e., "overall game processing") by the processor 81 (or computer) of the main body apparatus 2. FIG. 22-FIG. 32 are flowcharts showing non-limiting example game controlling processing concerning on the competition game A by the processor 81 (or computer) of the main body apparatus 2. Furthermore, FIG. 33-FIG. 35 are flowcharts showing a part of non-limiting example game controlling processing concerning on the competition game B by the processor 81 (or computer) of the main body apparatus 2. In the following, although the overall game processing, the game controlling processing concerning on the competition game A and the game controlling processing concerning on the competition game B will be described using FIG. 21-FIG. 35, duplicate description concerning on the steps that execute the same or similar processing will be omitted.

However, processing of respective steps of the flowcharts shown in FIG. 21-FIG. 35 are mere examples, and if the same or similar results are obtainable, an order of the respective steps may be exchanged. Moreover, in this embodiment, it will be described that the processor 81 executes the processing of respective steps of the flowcharts shown in FIG. 21-FIG. 35 basically; however, some steps may be executed by a processor(s) or/and a dedicated circuit(s) other than the processor 81.

When a power of the main body apparatus 2 is turned on, prior to execution of the overall game processing, the processor 81 executes a boot program stored in a boot ROM not shown, whereby respective units including the DRAM 85, etc. are initialized. The main body apparatus 2 starts the overall game processing when the execution of the game program of this embodiment is directed by the user.

As shown in FIG. 21, when the overall game processing is started, the processor 81 executes initial setting in a step S1. In this embodiment, a game selection screen for selecting the competition game A or the competition game B is displayed and the competition game A or the competition game B to be played is determined according to a selection operation.

In a subsequent step S3, operation data 854a sent from the left controller 3 or/and the right controller 4 is acquired, and in a step S5, game processing concerning on the competition game A or the competition game B described later is executed. However, in the step S3, the acquired operation data 854a is stored in the data storage area 854.

In a next step S7, a game image is generated. Here, the processor 81 generates, based on a result of the game controlling processing in the step S5, game image data corresponding to the game images, i.e., the selection screen 200, the selection screen 250, the hitting operation screen 300, the shock screen 350, the field deformation screen 400, the field deformation screen 450, the ball deformation screen 500, the movement screen 550, the hitting operation screen 700, etc. Moreover, in a step S9, a game sound is generated. Here, the processor 81 generates sound data corresponding to the game sound according to the result of the game controlling processing in the step S5.

Subsequently, the game image is displayed in a step S11. Here, the processor 81 outputs the game image data generated in the step S7 to the display 12. Moreover, in a step S13, the game sound is output. Here, the processor 81 outputs the game sound data generated in the step S9 to the speaker 88 through the codec circuit 87.

Then, in a step S15, it is determined whether the game is to be ended. Determination in the step S15 is executed according to whether the player directs to end the game, for example.

If "NO" is determined in the step S15, that is, if the game is not to be ended, the process returns to the step S3. On the other hand, if "YES" is determined in the step S15, that is, if the game is to be ended, the overall game processing is terminated.

Figure 22:
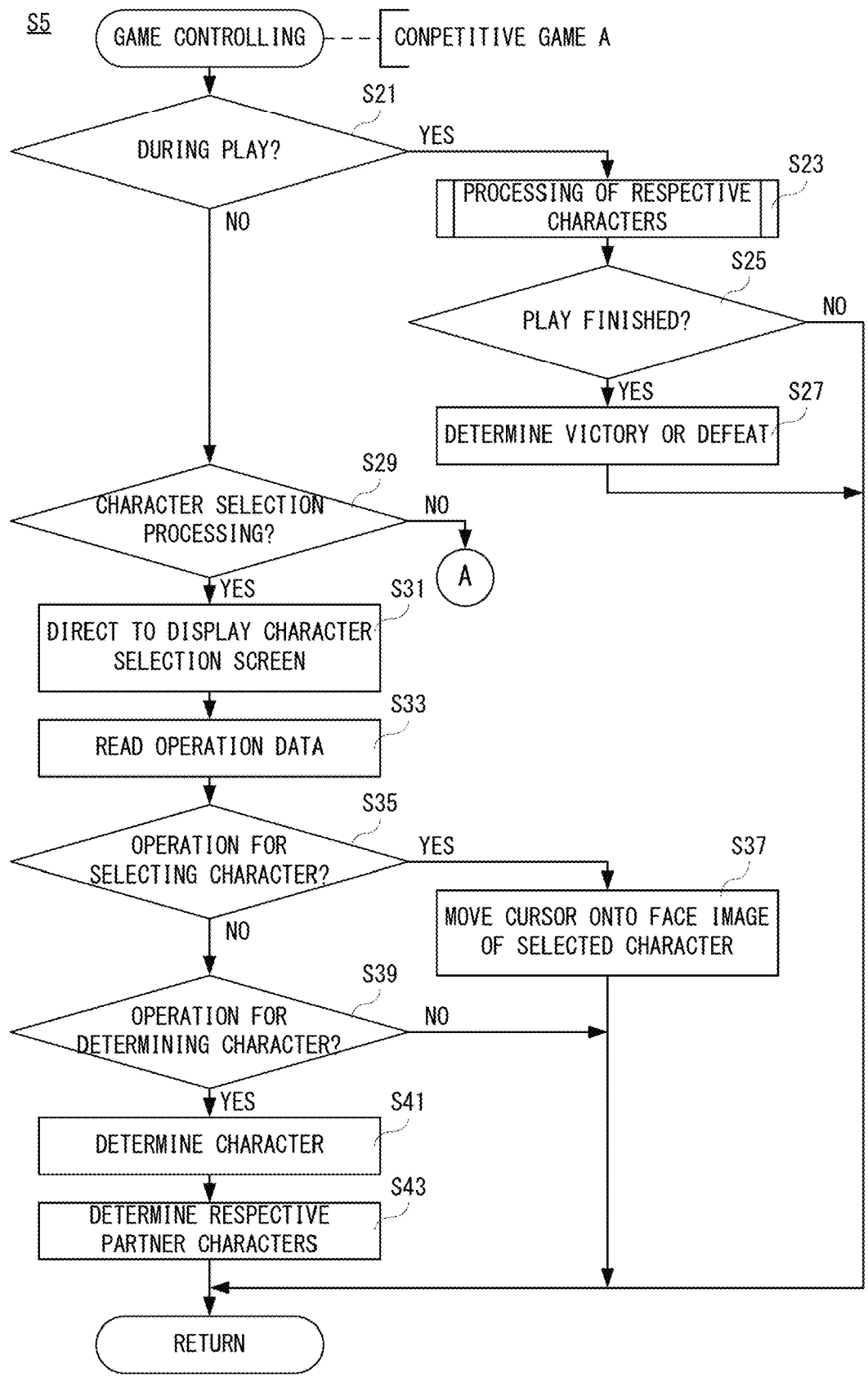
FIG. 22 is a flowchart showing a first part of non-limiting example game controlling processing of the processor of the main body apparatus shown in FIG. 6 concerning on a competition game A.

As shown in FIG. 22, if the game controlling processing is started concerning on the competition game A shown in the step S5, the processor 81 determines, in a step S21, whether it is during play of the competition game A.

If "YES" is determined in the step S21, that is, if it is during the play of the competition game A, in a step S23, processing of each character (see FIG. 25-FIG. 32) described later is executed, and it is determined, in a step S25, whether the play is to be ended. Here, the processor 81 determines whether the finish flag 900j of the player character 302 and the finish flags of all the competitive partner characters 352 are turned on.

If "NO" is determined in the step S25, that is, if the play is not to be finished, the game controlling processing is finished and the process returns to the whole game processing shown in FIG. 22. Therefore, in the whole game processing, generation etc. of the game image concerning on a result that the processing of the respective characters are executed. On the other hand, if "YES" is determined in the step S25, that is, if the play is to be finished, a victory or defeat is determined in a step S27, and the process returns to the whole game processing. Therefore, in the whole game processing, generation etc. of the game image notifying a victory or defeat (for example, ranking) are executed. Moreover, as described above, in the competition game A, the character (or the player) who has a lesser total number of strokes from a tee shot up to a cup-in for all the holes and a lesser total time required from a tee shot up to a cup-in for all the holes wins the game.

Moreover, if "NO" is determined in the step S21, that is, if the competition game A is not during play, it is determined, in a step S29, whether it is character selection processing. If "NO" is determined in the step S29, that is, if it is not the character selection processing, the process proceeds to a step S45 shown in FIG. 23. On the other hand, if "YES" is determined in the step S29, that is, if it is the character selection processing, it is directed to display (or update) of the character selection screen 200 as shown in FIG. 8 in a step S31, and the operation data 854a is read in a step S33. Here, the processor 81 reads the operation data 854a concerning on the player character 302 stored in the DRAM 85. Hereinafter, the same applies to case of reading the operation data 854a.

In a subsequent step S35, it is determined whether it is an operation for character selection. That is, the processor 81 determines whether the operation data 854a concerning on the player character 302 indicates a tilt of the analog stick 32. If "YES" is determined in the step S35, that is, if it is an operation for character selection, the cursor 210 is moved to the face image (icon) 202 of the selected character in a step S37, and the process returns to the whole game processing. Therefore, in the whole game processing, generation etc. of the game image that the cursor 210 is moved to the image 202 of the selected character are executed.

On the other hand, if "NO" is determined in the step S35, that is, if it is not an operation for character selection, it is determined, in a step S39, whether it is an operation for determining a character. That is, the processor 81 determines whether the operation data 854a concerning on the player character 302 indicates depression of the A button 53. If "NO" is determined in the step S39, that is, if it is not an operation for determining a character, it is determined that the operation data 854a is not detected, and the process returns to the whole game processing.

On the other hand, if "YES" is determined in the step S39, that is, if it is an operation for determining a character, the player character 302 is determined in a step 41, and characters of respective competitive partner characters 352 are determined in a step S43, and then, the process returns to the whole game processing. By executing processing of the steps S41 and S43, the types (900a) and movement speeds (900c) of the player character 302 and the competitive partner characters 352 are determined among the character data 854c.

In addition, although illustration is omitted, each of the competitive partner characters 352 is selected and determined based on the operation data 854a of another player, or an operation of the computer (processor 81).

Figure 23:
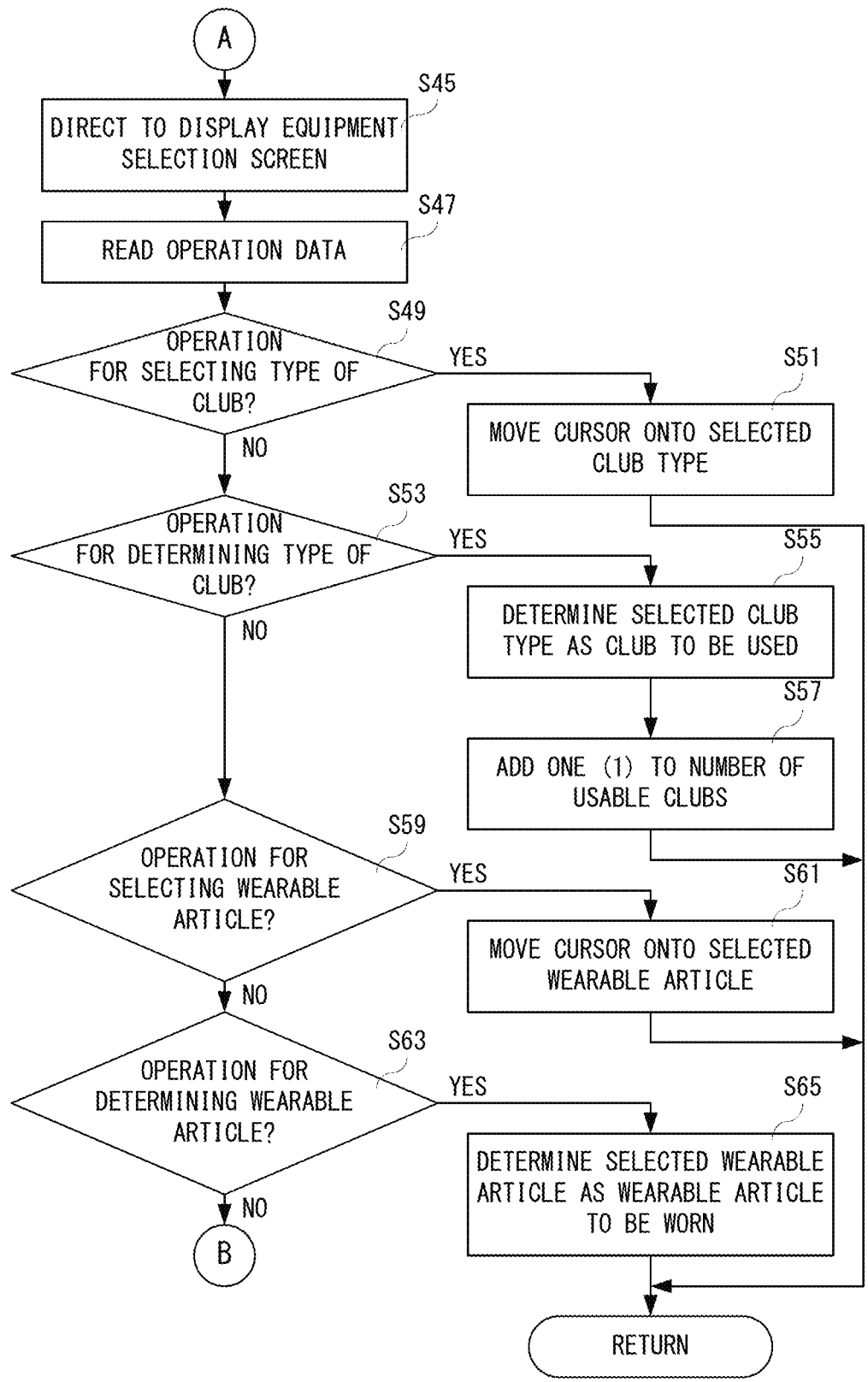
FIG. 23 is a flowchart showing a second part of the non-limiting example game controlling processing of the processor of the main body apparatus shown in FIG. 6 concerning on the competition game A, following FIG. 22.
Figure 24:
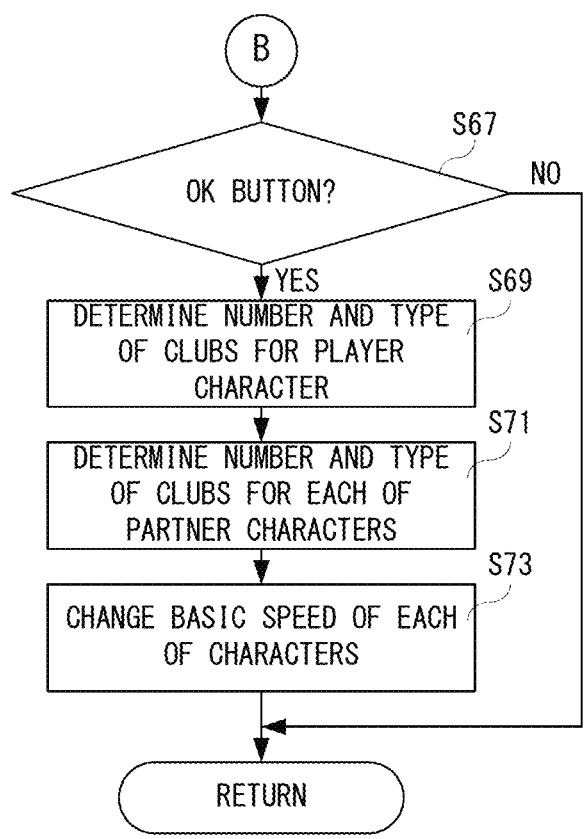
FIG. 24 is a flowchart showing a third part of the non-limiting example game controlling processing of the processor of the main body apparatus shown in FIG. 6 concerning on the competition game A, following FIG. 23.

Moreover, if it is not the character selection processing, as described above, "NO" is determined in the step S29, and in the step S45 shown in FIG. 23, it is directed to display (or update) the equipment selection screen 250 as shown in FIG. 9, and the operation data is detected in a step S47.

In a subsequent step S49, it is determined whether it is an operation for selecting a type of club. That is, the processor 81 determines whether the operation data 854a concerning on the player character 302 indicates a tilt of the analog stick 32. The same or similar determination is performed in a step S59 describe later.

If "YES" is determined in the step S49, that is, if it is an operation for selecting a type of club, the cursor 270 is moved to the type of selected club in a step S51, and the process returns to the whole game processing. On the other hand, if "NO" is determined in the step S49, that is, if it is not an operation for selecting a type of club, it is determined, in a step S53, whether it is determination operation of a type of club. That is, the processor 81 determines whether the operation data 854a concerning on the player character 302 indicates depression of the analog stick 32. The same or similar determination is performed in a step S63 describe later.

If "YES" is determined in the step S53, that is, if it is an operation for determining a type of club, in a step S55, the selected type of club is set as a type of club to be used, and one (1) is added to the number of clubs in a step S57, and the process returns to the whole game processing. On the other hand, if "NO" is determined in the step S55, that is, if it is not an operation for determining a type of club, it is determined, in a step S59, whether it is an operation for selecting wearable article.

In addition, although illustration is omitted, in a case where the analog stick 32 is depressed in a state where the type of club having been selected is designated by the cursor 270, selection of the type of club concerned is canceled.

If "YES" is determined in the step S59, that is, if it is an operation for selecting wearable article, the cursor 270 is moved onto the selected wearable article, and the process returns to the whole game processing. On the other hand, if "NO" is determined in the step S59, that is, if it is not an operation for selecting wearable article, it is determined, in a step S63, whether it is an operation for determining wearable article.

If "YES" is determined in the step S63, that is, if it is an operation for determining wearable article, in a step S65, the selected wearable article is determined as wearable article to be worn, and the process returns to the whole game processing. On the other hand, if "NO" is determined in the step S63, that is, if it is not an operation for determining wearable article, it is determined, in a step S67 shown in FIG. 24, whether the OK button 260 is depressed. Here, the processor 81 determines whether the operation data 854a indicates depression of the analog stick 32 in a state where the cursor 270 designates the OK button 260.

If "NO" is determined in the step S67, that is, if the OK button 260 is not depressed, the process returns to the whole game processing. Although illustration is omitted, in case of "NO" in the step S67, processing that the cursor 270 is moved between the buttons of the type of club, the buttons of wearable article, and the OK button 260 is executed according to a tilt of the analog stick 32.

On the other hand, if "YES" is determined in the step S67, that is, if the OK button 260 is depressed, the number and types of the clubs used by the player character 302 are determined in a step S69, the number and type of the clubs used by each of the competitive partner characters 352 is determined in a step S71, and the basic speeds of the respective characters, i.e., the player character 302 and the competitive partner characters 352 are changed in a step S73, and the process returns to the whole game processing. By processing of steps S69-S73, the basic speed data 900*b* and the club data 900*c* of the player character data 900 are set (updated), and the basic speed data and the club data of character data (902, 904, 906) of each of the competitive partner characters 352 are set (or updated). However, as described above, there is an occasion that the basic speed is not changed depending on the number of the clubs to be used.

In addition, although illustration is omitted, the number and the types of clubs of the competitive partner character 352 that is controlled according to an operation of a further player are selected and determined by the further player (in this embodiment, the computer (processor 81)).

Moreover, although illustration is omitted, as described above, when the cancel button 262 is depressed, setting of the equipment is canceled to return to character selection (i.e., the character selection screen 200).

Furthermore, although illustration is omitted, if the player character 302 and all the competitive partner characters 352 are determined and the equipment of the player character 302 and all the competitive partner characters 352 are determined, in the competition game A, a selection screen of a golf course is displayed, thereby to select and determine a golf course to play.

In addition, in the competition game B described later, if the player character 302 and all the competitive partner characters 352 are determined and the equipment of the player character 302 and all the competitive partner characters 352 are determined, a selection screen of a stage is displayed, thereby to select and determine a stage to play.

FIG. 25-FIG. 32 show character processing concerning on the player character 302 among processing of the respective characters in the above-described step S23 in FIG. 22. Although the character processing of the player character 302 is described in the following, in parallel with this, the same or similar processing for each of the competitive partner character 352 is executed. However, in this embodiment, operating each competitive partner character 352 is the computer (processor 81). That is, the competitive partner character 352 is controlled according to operation data that is input by the computer (processor 81). Here, duplicate illustration and description concerning on the processing of the competitive partner character 352 is omitted.

Figure 25:
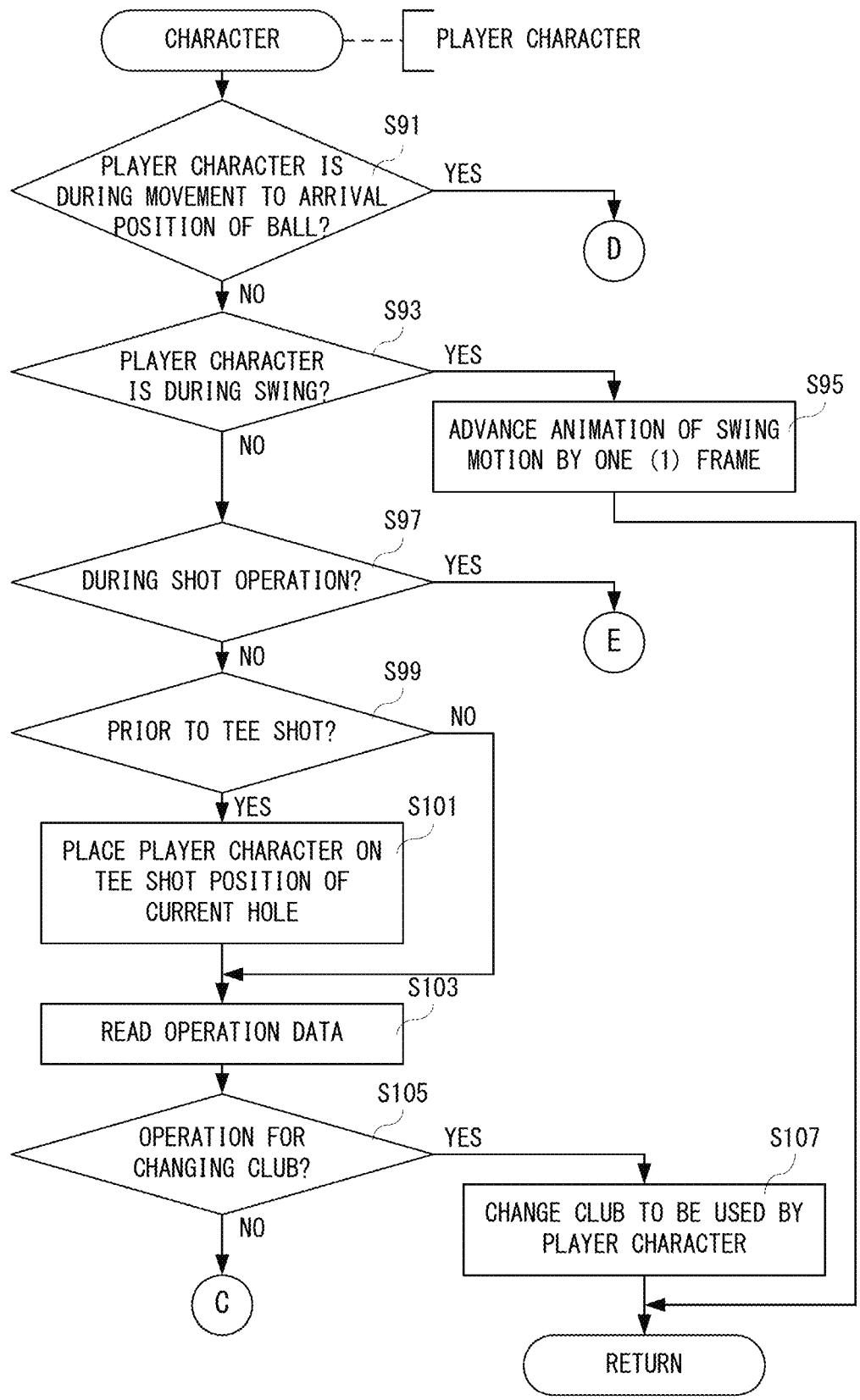
FIG. 25 is a flowchart showing a first part of non-limiting example character processing shown in FIG. 22.

As shown in FIG. 25, if the character processing of the player character 302 is started it is determined, in a step S91, whether the player character 302 is during movement to the arrival position of the ball 306. However, it is not necessary to actually move the player character 302, the player character 302 may be temporally stopped between the hitting operation and the hitting operation, that is, by the time that the ball 306 is hit next after the hitting the ball 306 previously.

Figure 27:
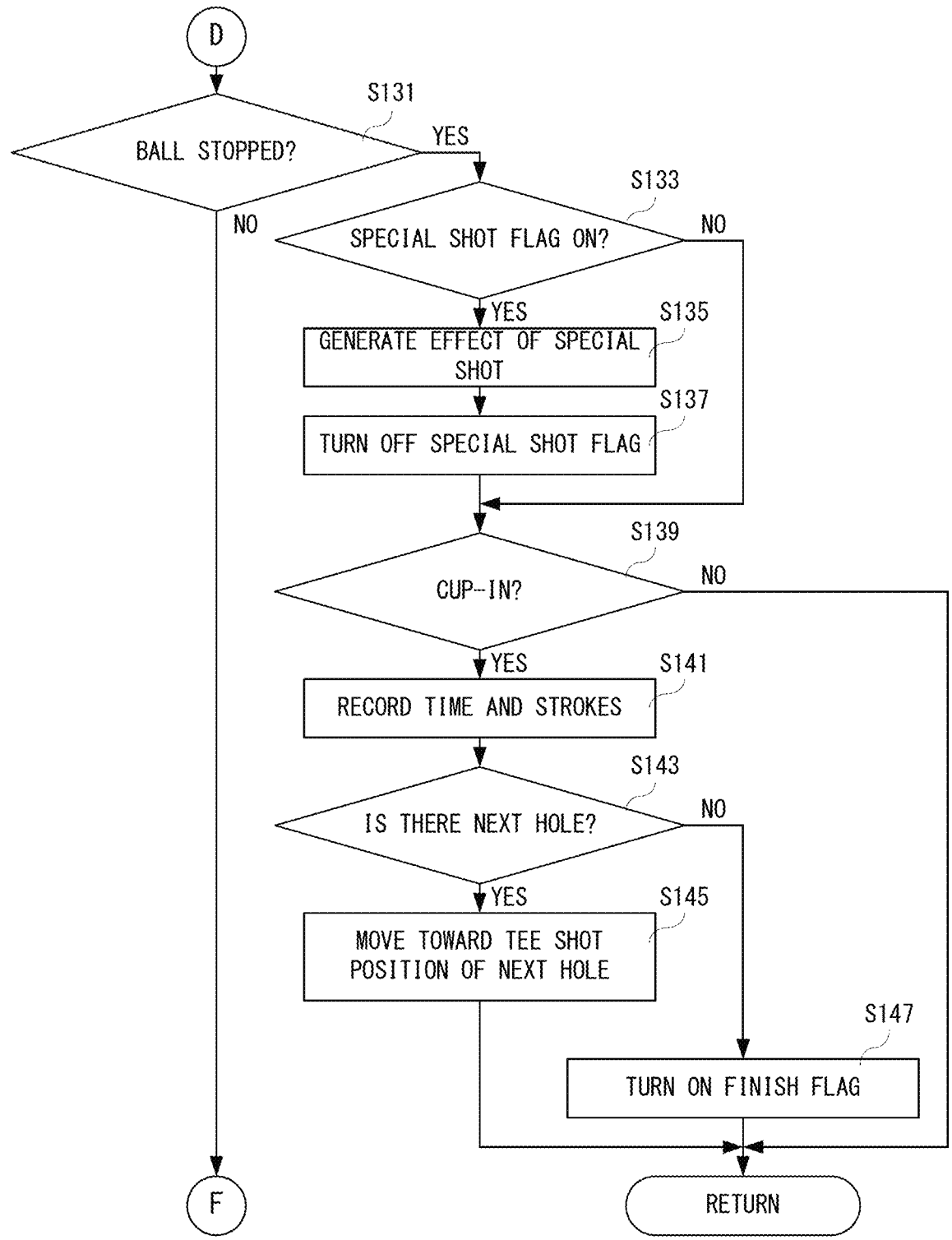
FIG. 27 is a flowchart showing a third part of the non-limiting example character processing shown in FIG. 22, following FIG. 25.

If "YES" is determined in the step S91, that is, if the player character 302 is during movement to the arrival position of the ball 306, the process proceeds to a step S131 in FIG. 27. On the other hand, if "NO" is determined in the step S91, that is, if the player character 302 is not under movement to the arrival position of the ball 306, it is determined, in a step S93, whether the player character 302 is during swing.

If "YES" is determined in the step S93, that is, the player character 302 is during swing, in a step S95, an animation of a swing action of the player character 302 is advanced by one (1) frame, and the process returns to the game controlling processing. On the other hand, if "NO" is determined in the step S93, that is, if the player character 302 is not during swing, it is determined, in a step S97, whether it is during a shot operation.

Figure 26:
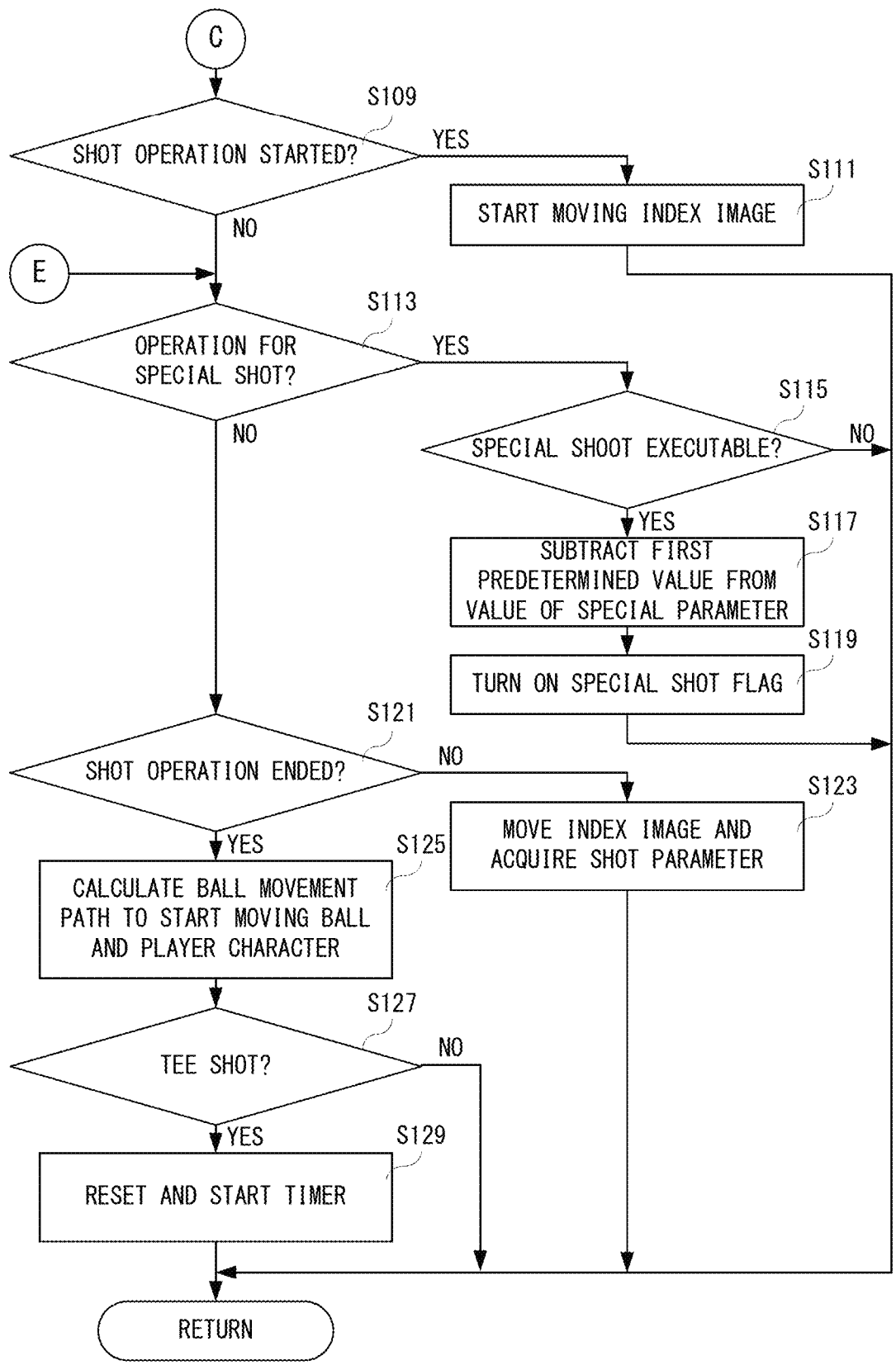
FIG. 26 is a flowchart showing a second part of the non-limiting example character processing shown in FIG. 22, following FIG. 25.

If "YES" is determined in the step S97, that is, if it is during a shot operation, the process proceeds to a step S113 shown in FIG. 26. On the other hand, if "NO" is determined in the step S97, that is, if not during a shot operation, it is determined, in a step S99, whether it is prior to a tee shot. If "NO" is determined in the step S99, that is, if it is not prior to a tee shot, the process proceeds to a step S103. On the other hand, if "YES" is determined in the step S99, that is, if it is prior to a tee shot, the player character 302 is located in the tee shot position of the current hole in a step S101, and the process proceeds to a step S103. Moreover, in the step S101, when the ball change data 900*h* is included in the player character data 900, the shape or the property of the ball 306 is changed according to the ball change data 900*h*. Although detailed description is omitted, the ball 306 that is changed in the shape or the property is returned to the shape or the property in origin if the ball 306 is stopped to be moved (i.e., reaches the arrival position) after being hit. The same applies to a case where the shape or the property of the ball 306 is changed in a step S161 described later. However, when the player character 302 is already located on the tee shot position, processing of the step S101 is skipped.

In the step S103, the operation data 854*a* concerning on the player character 302 is read, and it is determined, in a step S105, whether it is an operation for changing a club. That is, the processor 81 determines whether the operation data 854*a* concerning on the player character 302 indicates depression of the L button 38 or the R button 60. If "YES" is determined in the step S105, that is, if it is an operation for changing a club, the club used by the player character 302 is changed according to an operation by the player in a step S107, and the process returns to the game controlling processing.

On the other hand, if "NO" is determined in the step S105, that is, if it is not an operation for changing a club, it is determined, in a step S109, whether it is a start of a shot operation. That is, the processor 81 determines whether the operation data 854*a* concerning on the player character 302 indicates depression of the A button 53 in a state prior to the shot operation is started.

If "YES" is determined in the step S109, that is, if it is a start of a shot operation, movement of the index image 322 is started in a step S111, and the process returns to the game controlling processing. On the other hand, if "NO" is determined in the step S109, that is, if it is not a start of a shot operation, it is determined, in a step S113, whether there is an operation for the special shot. That is, the processor 81 determines, during the shot operation, whether the operation data 854*a* concerning on the player character 302 indicates depression of the X button 55.

If "NO" is determined in the step S113, that is, if there is no operation of the special shot, the process proceeds to a step S121. On the other hand, if "YES" is determined in the step S113, that is, if there is an operation of the special shot, it is determined, in a step S115, whether the special shot is executable. Here, the processor 81 determines whether a value of the special parameter is more than the first predetermined quantity with reference to the special parameter data 900f of the player character 302.

If "NO" is determined in the step S115, that is, if the special shot is not executable, the process returns to the game controlling processing. In this case, a message or sound indicating that the special shot is not executable may be output. On the other hand, if "YES" is determined in the step S115, that is, if the special shot is executable, the value of the special parameter is subtracted by the first predetermined quantity in the step S117, and the special shot flag 900i is turned on in a step S119, and the process returns to the game controlling processing.

Moreover, in a step S121, it is determined whether it is an end of the shot operation. Here, the processor 81 determines whether the operation data 854a concerning on the player character 302 indicates depression of the A button 53 after the shot power is determined. If "NO" is determined in the step S121, that is, if it is not an end of the shot operation, the index image is moved and a shot parameter is acquired in a step S123, and the process returns to the game controlling processing. However, in the step S123, the processor 81 acquires the shot power as the shot parameter when the A button 53 is depressed after the start of shot. Therefore, when the A button 53 is not depressed after the start of shot, only movement of the index image is executed in the step S123. Moreover, a moving direction of the index image is opposite before and after the shot power is determined.

On the other hand, if "YES" is determined in the step S121, that is, if it is an end of the shot operation, in a step S125, a movement path of the ball 306 is calculated based on the shot parameter, and movement of the ball 306 according to the calculated movement path is started and movement of the player character 302 is started. Although illustration is omitted, at this time, a count value of the counter 900m is incremented by 1 (one). Moreover, in the step S125, the player character 302 is prepared to run toward the calculated arrival position of the ball 306. Moreover, although detailed description is omitted, when the shape or the property of the ball 306 is changed, the movement path according to the changed shape or property is calculated. However, when the shape or the property of the ball 306 is changed, the ball 306 may be moved according to a movement path set in advance, respectively.

In a next step S127, it is determined whether this shot is a tee shot. If "NO" is determined in the step S127, that is, if this shot is not a tee shot, the process returns to the game controlling processing. On the other hand, if "YES" is determined in the step S127, that is, if this shot is a tee shot, the timer 900k for the player character 302 is reset and started in a step 129, and the process returns to the game controlling processing.

As shown in FIG. 25, if the player character 302 is moving to the arrival position of the ball 306, "YES" is determined in the step S91, it is determined, in the step S131 shown in FIG. 27, whether the ball 306 is stopped. If "YES" is determined in the step S131, that is, if the ball 306 is stopped, it is determined, in a step S133, whether the special shot flag 900i concerning on the player character 302 is turned on.

If "NO" is determined in the step S133, that is, if the special shot flag 900i is turned off, the process proceeds to a step S139. On the other hand, if "YES" is determined in the step S133, that is, if the special shot flag 900i is turned on, the effect of the special shot is generated in a step S135, and the special shot flag 900i is turned off in a step S137, and the process proceeds to a step S139. For example, in the step S135, a shock wave is generated radially in a predetermined range centering on the position of the ball 306. As described above, the effect of the special shot is set in advance for each character, and the effect that is set in advance is generated. The same applies to a step 153 described later.

In the step S139, it is determined whether the ball 306 is cupped-in. If "NO" is determined in the step S139, that is, if the ball 306 is not cupped-in, the process returns to the game controlling processing. On the other hand, if "YES" is determined in the step S139, that is, if the ball 306 is cupped-in, the required time and the number of strokes are recorded in a step S141. Here, the processor 81 acquires the required time indicated by the timer 900k and acquires a count value of the number of strokes up to the cup-in from the counter 900m, thereby to store as the play data 900g associated with the played hole.

In a subsequent step S143, it is determined whether there is any next hole. If "YES" is determined in the step S143, that is, if there is a next hole, the player character 302 is moved to a tee shot position of the next hole in a step S145, and the process returns of to the game controlling processing. At this time, the ball 306 is also moved. If "NO" is determined in the step S143, that is, if there is no next hole, the finish flag 900j is turned on in a step S147, and the process returns to the game controlling processing.

Figure 28:
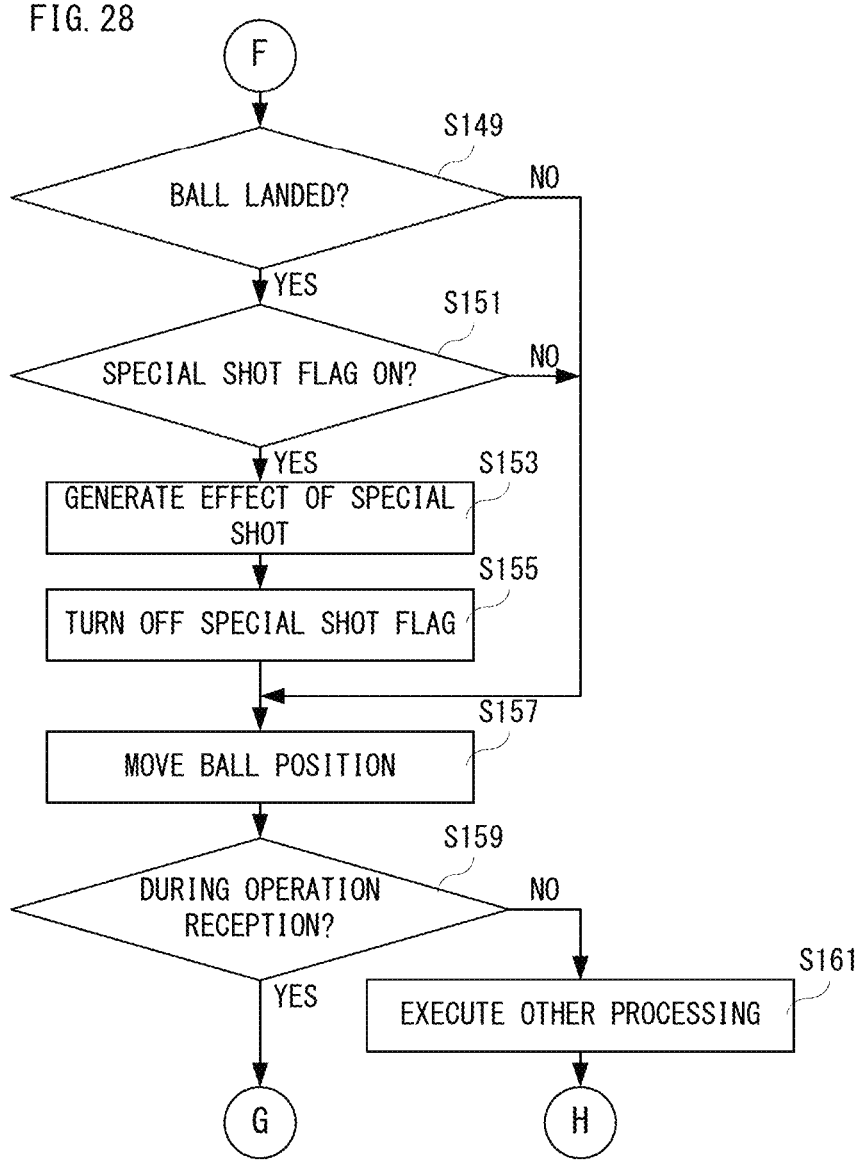
FIG. 28 is a flowchart showing a fourth part of the non-limiting example character processing shown in FIG. 22, following FIG. 27.

Moreover, if "NO" is determined in the step S131, that is, if the ball 306 is not stopped, it is determined, in a step S149 shown in FIG. 28, whether the ball 306 is landed. If "NO" is determined in the step S149, that is, if the ball 306 is not landed, the process proceeds to a step S157. On the other hand, if "YES" is determined in the step S149, that is, if the ball 306 is landed, it is determined, in a step S151, whether the special shot flag 900i concerning on the player character 302 is turned on.

If "NO" is determined in the step S151, that is, if the special shot flag 900i concerning on the player character 302 is turned off, the process proceeds to the step S157. On the other hand, if "YES" is determined in the step S151, that is, if the special shot flag 900i concerning on the player character 302 is turned on, the effect thereof is generated in the step S153, the special shot flag 900i concerning on the player character 302 is turned off in a step S155, and the process proceeds to the step S157.

In the step S157, the position of the ball 306 is moved by 1 (one) frame along the movement path. Although illustration is omitted, when the ball 306 collides with the object arranged on the ground or in the air, a movement path after the collision is re-calculated, and thereafter, the ball 306 is moved along the re-calculated movement path.

Subsequently, in a step S159, it is determined whether it is during reception of an operation. Here, the processor 81 determines that it is not during reception of an operation at the time that the player character 302 approaches the stopped ball 306 within the first predetermined distance, and is shifted to an address state for hitting the ball 306 next, or that the player character 302 is affected by the special shot of the competitive partner character 352, or that the player character 302 is affected by the special movement of the competitive partner character 352, or that the player character 302 is affected by the item used by competitive partner character 352 (in this example, items 600, 602, 604, 606, 608 or 610; the same applies hereinafter).

Figure 29:
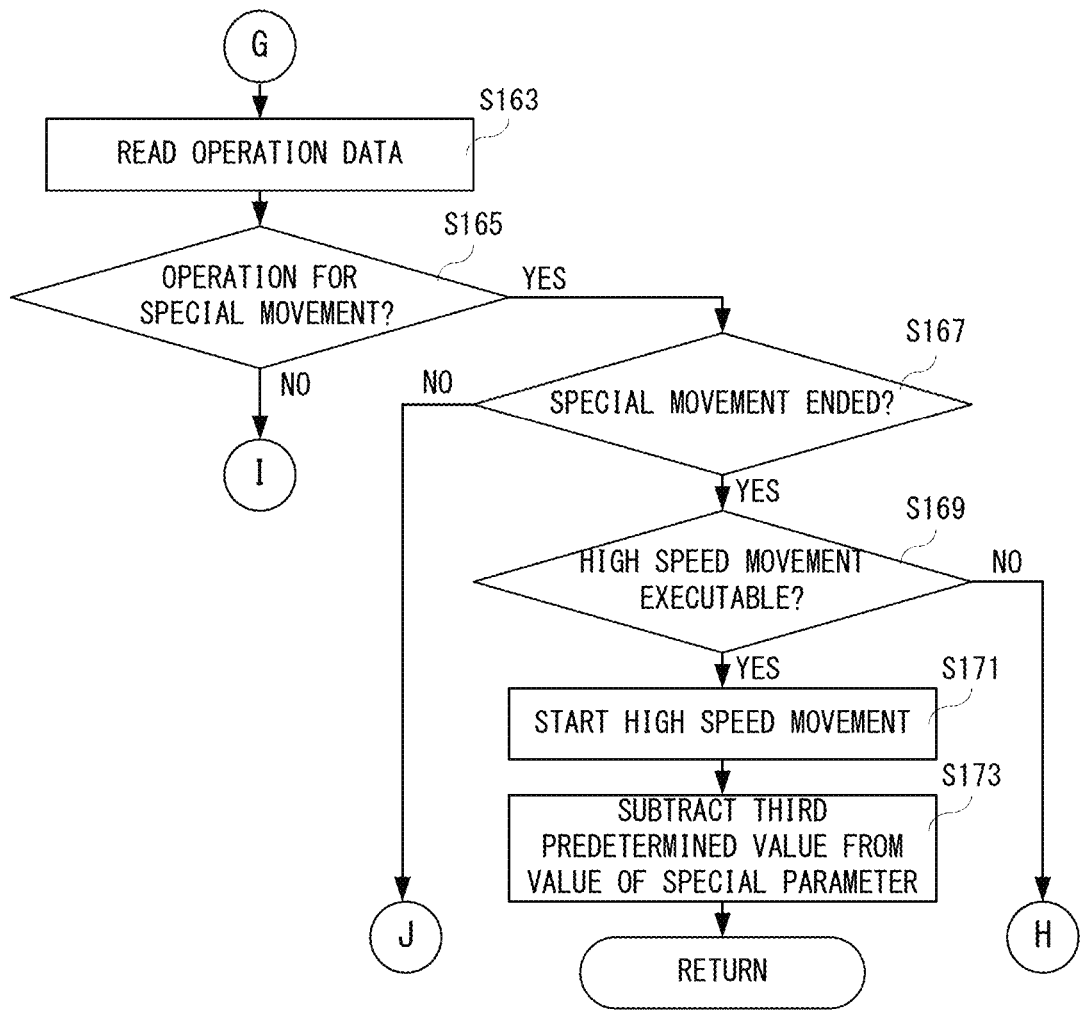
FIG. 29 is a flowchart showing a fifth part of the non-limiting example character processing shown in FIG. 22, following FIG. 28.

If "YES" is determined in the step S159, that is, if it is during reception of an operation, the process proceeds to a step S163 shown in FIG. 29. On the other hand, if "NO" is determined in the step S159, that is, if it is not during reception of an operation, other processing is executed in the step S161, and the process proceeds to a step S177. In the step S161, the processor 81 determines whether the current position of the player character 302 is within the first predetermined distance from the current position of the stopped ball 306. When the current position of the player character 302 is within the first predetermined distance from the current position of the stopped ball 306, the process is shifted to a hitting operation. At this time, when the ball change data 900*h* is included in the player character data 900, the shape or the property of the ball 306 is changed according to the ball change data 900*h*.

Moreover, in the step S161, the processor 81 determines whether the player character 302 or/and the ball 306 of the player character 302 is affected by the effect generated when the special shot is executed by the competitive partner character. That is, it is determined whether the player character 302 or/and the ball 306 of the player character 302 exist within the predetermined range centering on the landing point of the ball of other player. When affected by the special shot of the competitive partner character 352, processing in case of being affected by the special shot of the competitive partner character 352 is started. However, if it is during execution of processing in case of being affected by the special shot of the competitive partner character 352, processing in case of being affected by the special shot is advanced by 1 (one) frame.

Furthermore, in the step S161, the processor 81 determines whether there is any influence of the special movement of the competitive partner character 352 when not being affected by the special shot of the competitive partner character 352. Here, the processor 81 determines whether the competitive partner character 352 executes the special movement to deliver a predetermined attack on the player character 302. When there is an influence of the special movement of the competitive partner character 352, processing in case of being affected by the special movement of the competitive partner character 352 is started. However, if it is during execution of processing in case of being affected by the special movement of the competitive partner character 352, processing in case of being affected by the special movement is advanced by 1 (one) frame in the step S161.

Furthermore, in the step S161, the processor 81 determines whether there is any influence of the item used by the competitive partner character 352 in case of not being affected by the special movement of the competitive partner character 352. In this embodiment, the processor 81 determines whether there is any influence of an effect by the item 606 or 608 when the competitive partner character 352 hits (or uses) the item 606 or 608. When there is an influence of the item 606 or 608 used by the competitive partner character 352, processing in case of being affected by the item 606 or 608 used by the competitive partner character 352 is started. However, if it is during execution of processing in case of being affected by the item 606 or 608 used by the competitive partner character 352, processing in case of being affected by the item 606 or 608 used by the competitive partner character 352 is advanced by 1 (one) frame.

As shown in FIG. 29, in the step S163, the operation data 854*a* concerning on the player character 302 is read. In a next step S165, it is determined whether it is an operation for the special movement. Here, the processor 81 determines whether the operation data 854*a* concerning on the player character 302 indicates depression of the B button 54. If "NO" is determined in the step S165, that is, if it is not an operation for the special movement, the process proceeds to a step S187 shown in FIG. 31. On the other hand, if "YES" is determined in the step S165, that is, if it is an operation for the special movement, it is determined, in a step 167, whether the special movement is ended. Here, the processor 81 determines whether the third predetermined period of time elapses after the player character 302 starts the special movement.

Figure 30:
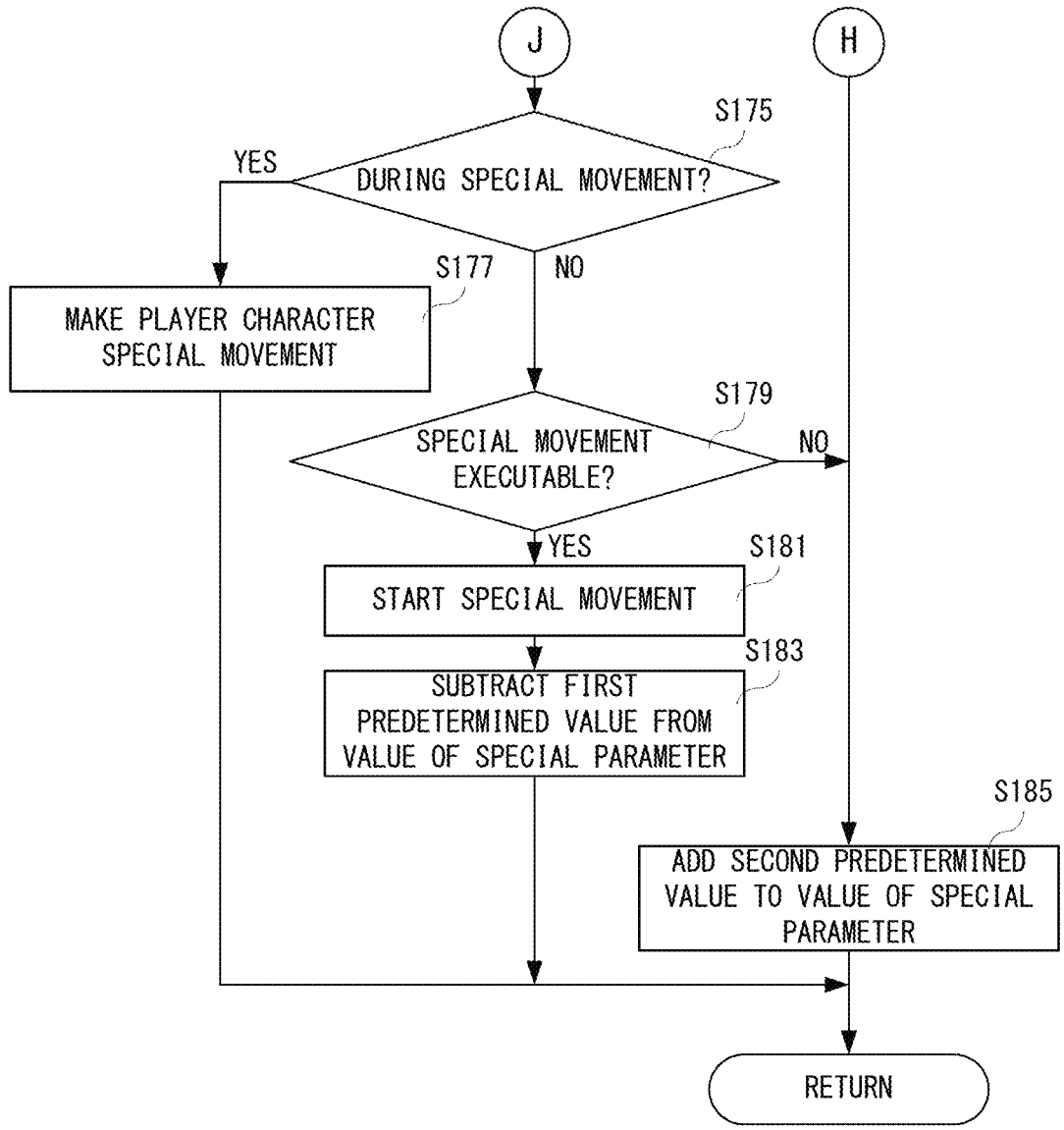
FIG. 30 is a flowchart showing a sixth part of the non-limiting example character processing shown in FIG. 22, following FIG. 29.
Figure 31:
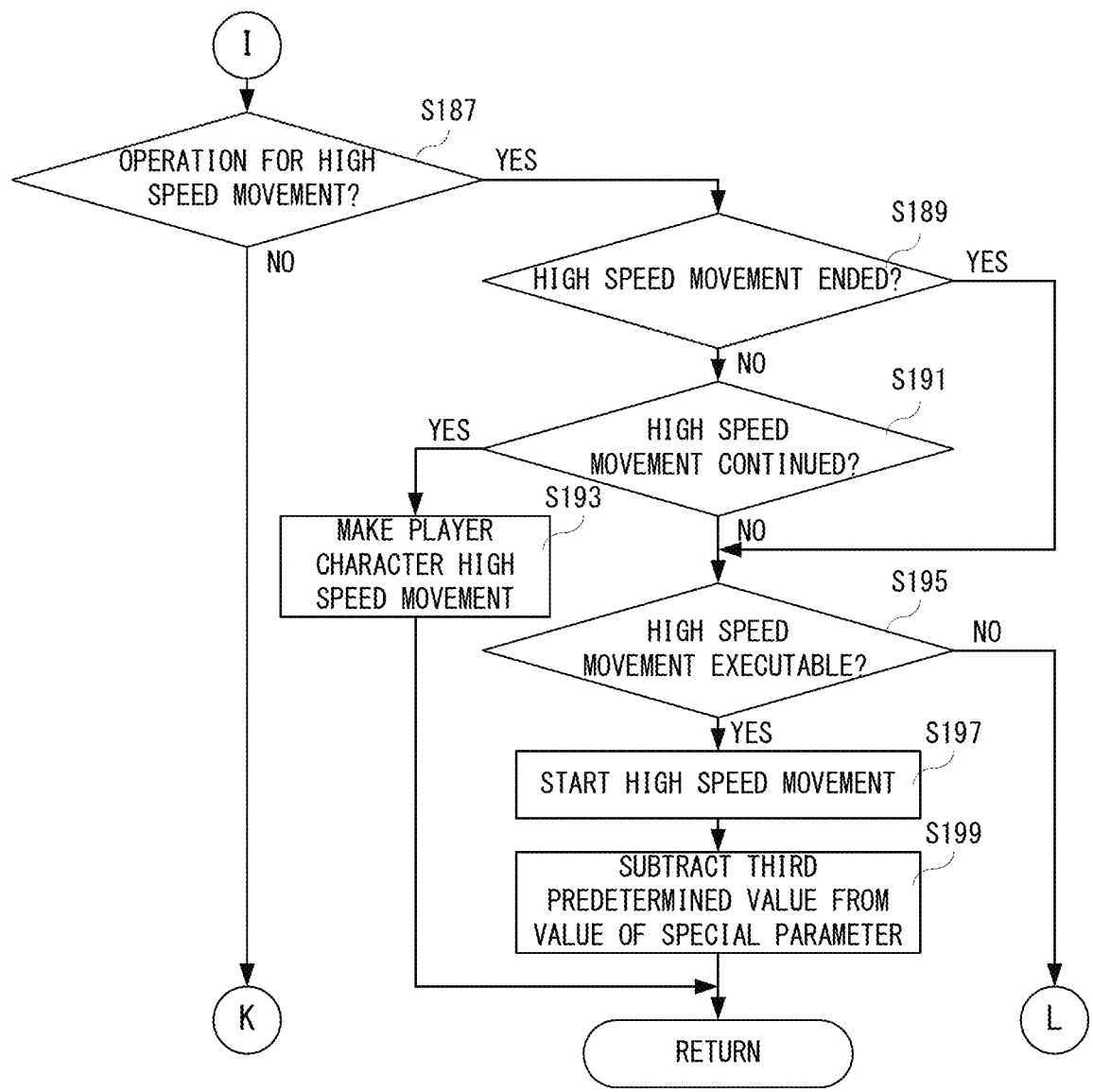
FIG. 31 is a flowchart showing a seventh part of the non-limiting example character processing shown in FIG. 22, following FIG. 29.

If "NO" is determined in the step S167, that is, if the special movement is not ended, the process proceeds to a step S175 shown in FIG. 30. On the other hand, if "YES" is determined in the step S167, that is, if the special movement is ended, it is determined, in a step S169, whether the high-speed movement is executable. Here, the processor 81 determines whether a value of the special parameter is more than the third predetermined quantity with reference to the special parameter data 900*f* concerning on the player character 302. The same applies to a step S195 described later.

If "NO" is determined in the step S169, that is, if the high-speed movement is not executable, the process proceeds to a step S185 shown in FIG. 30. On the other hand, if "YES" is determined in the step S169, that is, if the high-speed movement is executable, the high-speed movement is started in a step S171, and the value of the special parameter is subtracted by the third predetermined quantity in a step S173, and then, the process returns to the game controlling processing. That is, the processor 81 moves, in the step S171, the player character 302 in a direction indicated by the analog stick 32 by 1 (one) frame with a movement speed at the time of high-speed movement. Therefore, in the step S171, the current position data 900*e* of the player character 302 is updated. The same applies to a step S197 described later. Thus, when an operation of the special movement is continued, after ending the special movement, the player character 302 is executable the high-speed movement continuously.

As shown in FIG. 30, in the step S175, it is determined whether it is during the special movement. Here, the processor 81 determines whether the player character 320 starts the special movement and the third predetermined period of time does not elapse after the player character 302 starts the special movement.

If "YES" is determined in the step S175, that is, if it is during continuation of the special movement, the player character 302 is moved with the special movement by 1 (one) frame in a step S177, and the process returns to the game controlling processing. In this embodiment, at the beginning of starting the special movement, in the step S177, the player character 302 is made to execute the high-speed movement and to start an action performing a predetermined attack against the competitive partner character 352. Moreover, also in the step S177, the current position data 900*e* of the player character 302 is updated. The same applies to a step S181 described later.

On the other hand, if "NO" is determined in the step S175, that is, if it is not during the special movement, it is determined, in a step S179, whether the special movement is executable. Here, the processor 81 determines whether the value of the special parameter is more than the first predetermined quantity with reference to the special parameter data 900*f* concerning on the player character 302.

If "YES" is determined in the step S179, that is, if the special movement is executable, the special movement is started in the step S181, and the value of the special parameter is subtracted by the first predetermined quantity in a step S183, and then, the process returns to the game controlling processing. On the other hand, if "NO" is determined in the step S179, that is, if the special movement is not executable, the second predetermined quantity is added to the value of the special parameter in the step S185, and the process returns to the game controlling processing. However, when "NO" is determined in the step S179, a message or sound indicating that the special movement is not executable. Moreover, in the step S185, the value of the special parameter is not increased exceeding the maximum value. The same applies to a step S213 described later. Moreover, as described above, if "NO" is determined in the step S165, it is determined, in the step S187 shown in FIG. 31, whether it is an operation for the high-speed movement. Here, the processor 81 determines whether the operation data 854a concerning on the player character 302 indicates the depression of the Y button 56.

If "YES" is determined in the step S187, that is, if it is an operation for the high-speed movement, it is determined, in a step S189, whether the high-speed movement is ended. Here, the processor 81 determines whether the fourth predetermined period of time (for example, few or several seconds) elapses after the player character 302 starts the high-speed movement. If "YES" is determined in the step S189, that is, if the high-speed movement is ended, the process proceeds to the step S195.

On the other hand, if "NO" is determined in the step S189, it is determine whether, in a step S191, it is during continuation of the high-speed movement. Here, the processor 81 determines whether the player character 302 starts the high-speed movement and the fourth predetermined period of time does not elapse after starting the high-speed movement. If "YES" is determined in the step S191, that is, if it is continuation of the high-speed movement, the player character 302 is moved by the high-speed movement in a step S193, and the process returns to the game controlling processing.

On the other hand, if "NO" is determined in the step S191, that is, if it is not continuation of the high-speed movement, it is determined, in the step S195, whether the high-speed movement is executable. Here, the processor 81 determines whether the value of the special parameter is more than the third predetermined quantity with reference to the special parameter data 900f concerning on the player character 302.

Figure 32:
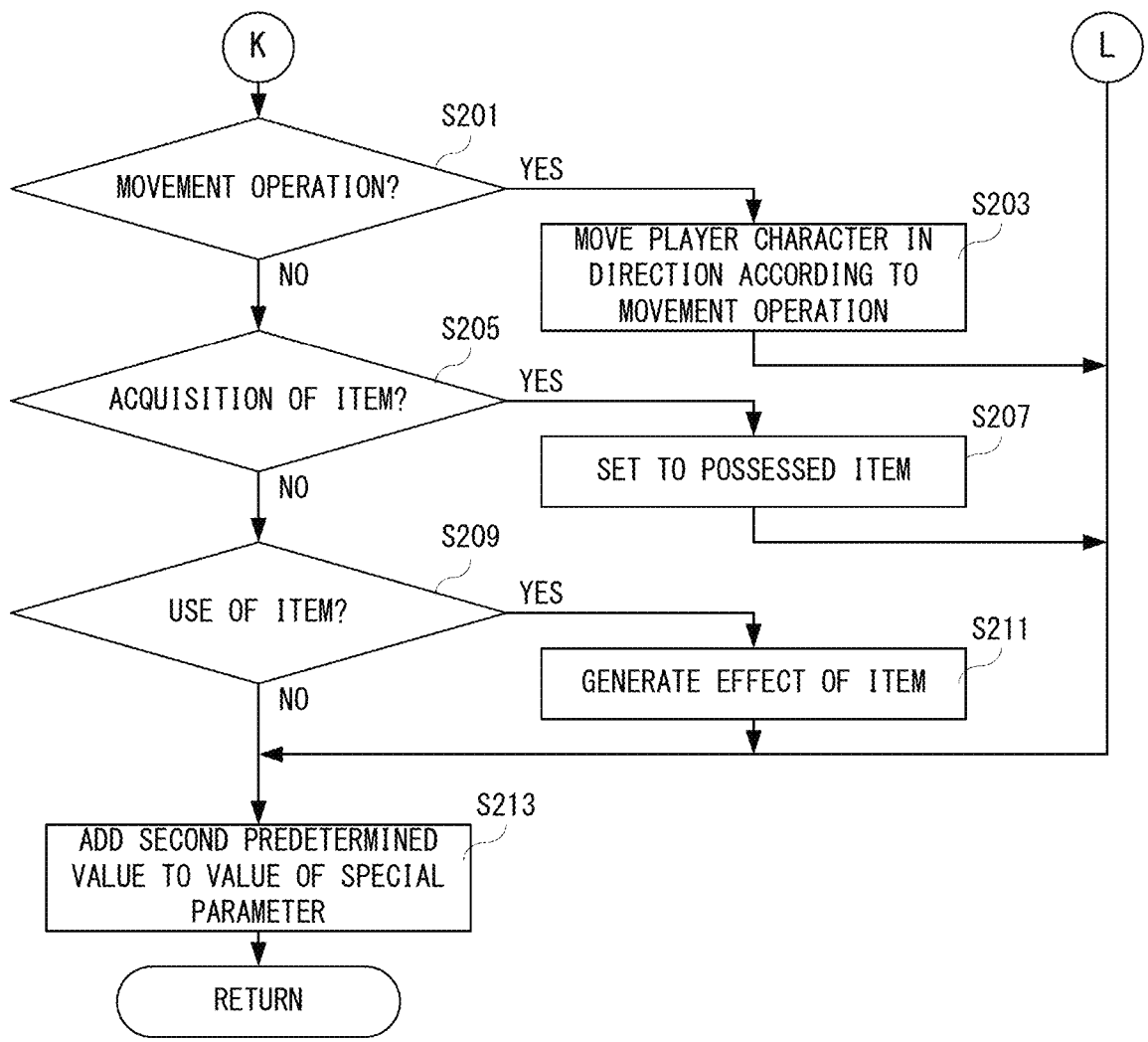
FIG. 32 is a flowchart showing a eighth part of the non-limiting example character processing shown in FIG. 22, following FIG. 31.

If "NO" is determined in the step S195, that is, if the high-speed movement is not executable, the process proceeds to a step S213 shown in FIG. 32. On the other hand, if "YES" is determined in the step S195, that is, if the high-speed movement is executable, the high-speed movement is started in a step S197, and in a step S199, the value of the special parameter is subtracted by the third predetermined quantity, and then, the process returns to the game controlling processing.

Moreover, if "NO" is determined in the step S187, that is, if it is not an operation for the high-speed movement, it is determined, in a step S201 shown in FIG. 32, whether it is a moving operation. Here, the processor 81 determines whether the operation data 854a concerning on the player character 302 indicates a tilt of the analog stick 32.

If "YES" is determined in the step S201, that is, if it is a moving operation, the player character 302 is moved in a direction according to the moving operation by 1 (one) frame in a step S203, and the process proceeds to the step S213. Therefore, in the step S203, the current position data 900e of the player character 302 is updated. However, in the step S203, when not being affected by the shape or the property on the ground or in the air, the player character 302 is moved at the basic speed; however, when being affected by the shape or the property on the ground or in the air, the player character 302 is moved at the basic speed that is made higher or lower. For example, the basic speed is made lower when the player character 302 is moved in an uphill slope or a sand place such as a bunker. The basic speed is made higher when the player character 302 is moved on a downward slope. Moreover, in a case where the player character 302 is moved in the air, the basic speed is made lower if passing through clouds or a headwind blows, but the basic speed is made higher if collided from behind by an airship object or a tailwind blows. On the other hand, if "NO" is determined in the step S201, that is, if it is not a moving operation, it is determined, in a step S205, whether it is acquisition of the item 600-610.

If "YES" is determined in the step S205, that is, if it is acquisition of the item 600-610, the acquired item 600-610 is set as a possessed item in a step S207, and the process proceeds to the step S213. On the other hand, if "NO" is determined in the step S205, that is, if it is not acquisition of the item 600-610, it is determined, in a step S209, whether it is use of the item 600-610. That is, it is determined whether to make the player character 302 use the possessed item or the item 600-610 arranged in the game field. However, using the item 600-610 arranged in the game field includes hitting by the player character 302 the item arranged in the game field.

If "YES" is determined in the step S209, that is, if it is the use of the item 600-610, an effect of the used item 600-610 is generated in a step S211, and the process proceeds to the step S203. On the other hand, if "NO" is determined in the step S209, that is, if it is not the use of the item 600-610, the second predetermined quantity is added to the value of the special parameter of the player character 302 in the step S213, and the process returns to the game controlling processing.

In addition, as described above, as for the item 602 or 604 that generates an effect when acquired, if the player character 302 acquires the item 602 or 604, the same is not set as possessed item, but the effect is generated.

FIG. 33-FIG. 35 are flowcharts showing a part of non-limiting example character processing in the game controlling processing of the above-described competition game B. The game controlling processing of this competition game B is the same or similar to the game controlling processing of the above-described competition game A except not only a stage selected in the competition game B is generated in the game field F in the game controlling processing of the competition game B but also a part of the character processing differs. Therefore, hereinafter, only the contents different from those of the competition game A will be described, and illustration and description of the contents duplicate with the competition game A will be omitted.

In addition, although only the character processing concerning on the player character 302 will be described using FIG. 33-FIG. 35, as similar to the competition game A, also in the completion game B, in parallel to this, the same or similar processing is executed for each of the competitive partner characters 352. However, what operates each of the competitive partner characters 352 is the computer (processor 81).

As shown in FIG. 33, in the competition game B, if "YES" is determined in the step S99, the player character 302 is located, in a step S101a, in a teeing area or in the predetermined position in the predetermined area 702 corresponding to the cup C having been cupped-in. Moreover, in the step S101a, when the ball change data 900h is included in the player character data 900, the shape or the property of the ball 306 is changed according to the ball change data 900h. Although detailed description is omitted, when the ball 306 that the shape or the property is changed is stopped moving (i.e., reaches the arrival position) after being hit, the ball is returned to the shape or the property in origin.

As shown in FIG. 34, in the competition game B, since the time required from a tee shot (or hitting immediately after a cup-in) up to a cup-in is irrelevant to a victory or defeat, the processing of the steps S127 and S129 shown in FIG. 26 are omitted.

As shown in FIG. 35, in the competition game B, if "YES" is determined in the step S139, it is determined, in a step S141a, whether player character 302 cupped-in ahead of all the competitive partner characters 352. If "NO" is determined in the step S141a, that is, if any one of the competitive partner characters 352 cupped-in ahead of others, the process proceeds to a step S143a. On the other hand, if "YES" is determined in the step S141a, that is, if the player character 302 cupped-in ahead of all the competitive partner characters 352, the cup C having been cupped-in is stored as the play data 900g in a step S142. As described above, in the competition game B, the play data 900g is identification information of the cup C having been cupped-in.

Subsequently, in a step S143a, it is determined whether there is a cup C not having been cupped-in. If "NO" is determined in the step S143a, that is, if there is no cup C not having been cupped-in, the process returns to the game controlling processing. On the other hand, if "YES" is determined in the step S143a, that is, if there is a cup C not having been cupped-in, in a step S145a, the player character 302 starts to be moved to the predetermined position within the predetermined area 702 provided corresponding to the cup C having been cupped-in, and the process returns to the game controlling processing.

In addition, in the competition game B, because it is not determined whether the play concerning on the individual character is ended, the processing of the step S147 shown in FIG. 27 is omitted. Moreover, in the competition game B, in order to determine whether the play is to be ended in the step S25, it is determined whether the balls 306 and 356 are cupped-in in all the cups C provided in the game field F. When the balls 306 and 356 are cupped-in in all the cups C provided in the game field F, it is determined that the play is ended. On the other hand, if at least one cup C that is not cupped-in remains among all the cups C provided in the game field F, it is determined that the play is not ended.

Moreover, in the competition game B, the player that the number of cups C having been cupped-in ahead of all the competitive partner characters 352 is larger wins the game in the step S27.

According to this embodiment, a game element is take in between the hitting processing and the hitting processing, and the time required up to a cup-in after executing the hitting of the first shot affects a victory or defeat of the game, and therefore, it is possible to improve the interest of the game.

In addition, in this embodiment, a case where the competition game A or the competition game B is played for each character is described, but it does not need to be limited to this. The game may be competed for each team consist of a plurality of characters. In this case, in addition to selection of characters and selection of equipment, a team is determined prior to a start of the competition game A or the competition game B. Moreover, in the competition game A, in determining a victory or defeat, the numbers of strokes of all the characters in the team are totaled, the required times of all characters in the team are totaled, and the team with the lesser total number of strokes and the shorter total time wins the game. On the other hand, in the competition game B, the numbers of cups C cupped-in ahead of all the competitive partner characters 352 are totaled for all the characters in the team, and the team with the largest total number wins the game.

Moreover, although it is set in this embodiment that an operation for the player character (or a competitive partner character) is not received when being affected by the special shot and the special movement of the competitive partner character (or the player character), it does not need to be limited to this, an operation for the player character (or the competitive partner character) may be received.

Furthermore, in this embodiment, the special parameter is set for the player character and each of the competitive partner characters, and the first predetermined quantity is consumed when executing the special shot or the special movement, but it does not need to be limited to this.

For example, instead of the special parameter, the number of times is set, and the special shot or the special movement may be executed while consuming the number of times. Moreover, if not executing the special shot or the special movement, the number of times is recovered by the predetermined number of times for every predetermined period of time.

Moreover, as for the maximum value of the special parameter, different values may be set for the characters, respectively. In this case, the maximum value of the special parameter of a large (or heavy) character is large, and the basic speed is set lower than that of a character with a small maximum value of the special parameter, but it may be set that high-speed movement is executable for a long time. On the other hand, the maximum value of the special parameter of a small (or light) character is small, and the basic speed is set higher than that of a character with a large maximum value of the special parameter, but it may be set that high-speed movement is executable for a short time.

Furthermore, a recovery of the special parameter of the character with a large maximum value may be set faster than that the character with a small maximum value. That is, the second predetermined quantity to be added may be set larger for the character with a large maximum value of the special parameter than that of the character with a small maximum value of the special parameter. In this case, when comparing with the character with a small maximum value of the special parameter, the special parameter of the character with a large maximum value of the special parameter is more quickly recovered, and therefore, depending on how and when the special parameter is used, a character with a lower basic speed can reverse a character with a higher basic speed. That is, it is possible to reverse the situation.

However, a recovery speed of the special parameter, that is, a magnitude of the second predetermined quantity may be set according to individuality (or attribute) for each character without being dependent on a magnitude of the maximum value of the special parameter.

Moreover, a recovery speed of the special parameter, that is, a magnitude of the second predetermined quantity may be changed dependent on the property of the terrain. For example, the recovery speed may be set quick on the fairway, and the recovery speed may be set late in hazards such as a bunker. However, although the recovery speed of the special parameter of the character moving in the air is not affected with the property of the terrain, may be set so as to be affected with the property in the air. For example, the recovery speed is set quick in case of a tailwind, and the recovery speed is set late in case of a headwind.

Furthermore, in this embodiment, when the special movement is executed, the moving speed is changed to a high speed and a predetermined attack is made to be delivered automatically, but the predetermined attack may be made to be delivered according to an operation by the player.

Moreover, although the required time up to a cup-in after executing a tee shot is measured in the competition game A of this embodiment, it does not need to be limited to this. For example, the required time may be measured prior to executing a tee shot in response to a sign of a tee shot having become possible. Even in such a case, the required time up to a cup-in after executing a tee shot affects a victory or defeat of the game.

Moreover, although a player who uses a character with the largest number of cups that are cupped-in ahead of all other characters serves as a winner in the competition game B of this embodiment, it does not need to be limited to this. A player who uses a character that puts the ball into any one (1) cup first may serve as a winner. A player who uses a character that puts the ball into two or more predetermined number of cups first may serve as a winner. However, the two or more predetermined number of cups are different from each other. Moreover, a player who uses a character that puts the ball into more different cups within the predetermined period of time (or time limit) may serve as a winner. Furthermore, in a case where a former character puts a ball into a cup and a latter character puts a ball into that cup again with satisfying a predetermined condition, this cup may be counted that the latter character cupped-in.

Furthermore, although the number and types of golf clubs are set prior to a start of the competition game in the above-described embodiment, it does not need to be limited to this. It may be possible to change the number or/and types in the middle of the competition game. That is, it is possible to decrease the number of golf clubs, or to change the types of golf clubs to be used, and to increase the number (and types) of the golf clubs. Moreover, a timing of change in the competition game A is a timing for each hole or an arbitrary timing during the play of each hole, and a timing of change in the competition game B is a timing from a cup-in of the ball to a next shot or an arbitrary timing after a tee shot.

Furthermore, in the above-described embodiment, the high-speed movement in a case where an operation for the special movement is continued by depression of the B button may defer in speed from the high-speed movement in a case where the high-speed movement is directed by depression of the Y button. However, in any cases, it is faster than a normal movement. Moreover, the high-speed movement may be enabled only a case where an operation for the special movement is continued, and thus, mere high-speed movement may not be possible. However, increase of the moving speed according to the use of the item etc. is excluded.

Moreover, although the game system 1 is shown as an example of an information processing system in the above-described embodiment, the structure thereof should not be limited, and it is possible to adopt other structure. For example, although the above-described "computer" is a single computer (specifically, processor 81) in the above-described embodiment, the "computer" may be multiple computers in another embodiment. The above-described "computer" may be (multiple) computers provided on multiple devices, and more specifically, the above-described "computer" may be constituted by the processor 81 of the main body apparatus 2 and communication control units (microprocessors) 101 and 111 provided on the controllers.

Furthermore, in other embodiments, a part (S5-S9) of the whole game processing, may be executed by a server on a network such as the internet. That is, the server executes the game controlling processing (FIG. 22-FIG. 35), the processing (FIG. 24-FIG. 35) for each character included in this game controlling processing, the game image generation processing and the game sound generation processing. In such a case, the processor 81 of the main body apparatus 2 transmits the operation data received from the left controller 3 and the right controller 4 to the above-described server via the network communication section 82 and the network, receives a result of execution of the whole game processing by the server (i.e., game image data and the game sound data), thereby displaying the game image on the display 12 and outputting the game sound from the speaker 88. That is, it is possible to constitute an information processing system including the game system 1 shown in the above-described embodiment and the server on the network.

Moreover, although a case where the game image is displayed on the display 12 is described in the above-described embodiment, it does not need to be limited to this. The game image can be displayed also on a stationary monitor (for example, television monitor) by connecting the main body apparatus 2 to the stationary monitor via a cradle. In such a case, it is possible to constitute an information processing system including the game system 1 and the stationary monitor.

Furthermore, although the above-described embodiment is described on a case where the game system 1 having structure that the left controller 3 and the right controller 4 are attachable to or detachable from the main body apparatus 2 is used, it does not need to be limited to this. For example, it is possible to use a game apparatus including the main body apparatus 2 integrally provided with an operation portion having operation buttons and analog sticks similar to those of the left controller 3 and the right controller 4, and an information processing such as further electronic equipment capable of executing a game program. The further electronic equipment corresponds to smartphones, tablet PCs or the like. In such a case, an operation portion may constitute with software keys.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium storing a game program executable by a computer provided with one or more processors to perform operations comprising:
   (a) generating for display, in connection with a virtual golf game, a virtual world including a plurality of player characters controllable by respective players using respective controllers, each of the player characters having a respective predefined moving speed;
   (b) displaying a first player character out of the plurality of player characters hitting a first virtual golf ball in the virtual world in response to a first player providing first input to the first player's controller;
   (c) after displaying the hitting of the first virtual golf ball, moving the first player character to an arrival point of the first golf ball according to further input to the first player's controller by the first player and based on the predetermined moving speed of the first player character;

(d) simultaneously with (b) and (c), enabling each player, other than the first player, to cause the respective player character that the respective player controls to hit a respective virtual ball and move to a respective arrival location of the respective virtual ball based on the predetermined moving speed of the respective player character, wherein:

the predetermined moving speeds of the player characters are independently adjustable based on actions available to and triggered by the players during (b) and (c), and each player character's moving speed is adjustable based on input from the player who controls the respective player character and other players who do not control the respective player character; and (e) repeating (a) through (d) until an ending cup-in event takes place.

2. The storage medium according to the claim 1, wherein the predetermined moving speeds are further independently adjustable according to a shape or a property of a game field of the virtualgolf game.

3. The storage medium according to the claim 1, wherein:
a number of virtual golf clubs to be used by the player characters is settable; and
for each player character, the respective predetermined moving speed is lowered as the number of virtual golf clubs to be used by the respective player character is increased.

4. The storage medium according to the claim 1, wherein:
wearable articles to be worn by the player characters are selectable; and
for each player character, the respective predetermined moving speed is adjusted and a respective movement performance is set based on the wearable article selected for the respective player character such that different wearable articles cause differences in moving speed adjustments and movement performances.

5. The storage medium according to the claim 1, wherein a character selection screen is displayable upon request by the first player, the character selection screen enabling the first player to select the first player character from a plurality of types of characters, the character selection screen displaying the plurality of types of characters and a moving speed for each.

6. The storage medium according to the claim 1, wherein:
a plurality of virtual cups are provided in a game field of a stage that is not divided per each of virtual holes, and
the first player character is made to hit one or more shots towards a desired cup from among the plurality of virtual cups based on input from the first player.

7. The storage medium according to the claim 6, wherein each of the player characters is caused to perform a respective first shot from a common location and at a common time.

8. The storage medium according to the claim 7, wherein the plurality of cups are displayed in the game field within a range reachable with two strokes from either the common location or a shot position immediately after a cup-in excluding the cup having been cupped in.

9. The storage medium according to the claim 6, wherein a number of cups cupped-in by the first player character or a team to which the player character belongs is determined.

10. The storage medium according to the claim 6, wherein a shot subsequent to a cup-in is executed from a shot position corresponding to the cupped-in cup.

11. The storage medium according to the claim 1, wherein:
a special action is executable by the first player character subject to restriction based on a number of execution times or a parameter, a shape or a property of a game field be changeable as a result of the special action being executed; and
moving speeds or shots of one or more of the player characters are affected by the shape or the property of the game field.

12. The storage medium according to the claim 11, wherein:
the special action is executable when the first player character is making a shot and when the first player character is moving; and
performance of another virtual golf ball hittable by another player character different from the first player character is changed if the another virtual golf ball is included in an area determined based on a movement path of the first player character, or in an area determined based on a trajectory or falling point or an arrival point of the golf ball that is hit by the first player character.

13. The storage medium according to the claim 11, wherein:
the special action is executable when the first player character is making a shot and when the first player character is moving; and
the restriction is common regardless of whether the restriction is based on the number of execution times or the reduction of the parameter.

14. The storage medium according to claim 11, wherein:
the special action involves a predetermined technique implemented while moving the first player character at a higher speed than that of normal movement; and
the first player character is made to continue moving at the higher speed according to first player input provided while the first player character is moving and while consuming the number of execution times or the parameter when the first player input is continued after execution of the special action.

15. The storage medium according to claim 11, wherein:
the game field includes the air in the virtual world, and
a shape or a property of a portion in the air in the virtual world is changed in accordance with execution of the special action.

16. The storage medium according to claim 1, wherein:
one or more items is/are arranged in the game field; and
an advantageous or disadvantageous effect is provided to one or more of the player characters in response to one of the one or more items being acquired during player character movement and/or being used after acquisition thereof.

17. The storage medium according to claim 1, wherein:
a hittable object different from the virtual golf balls is arranged in the game field; and
an advantageous or disadvantageous effect is provided to one or more of the player when the hittable object is hit by one of the player characters.

18. A game system comprising:
one or more processors configured to execute a virtual golf game stored to a memory, the virtual golf game being executed by performing operations comprising:
(a) generating for display, in connection with a virtual golf game, a virtual world including a plurality of player characters controllable by respective players using respective controllers, each of the player characters having a respective predefined moving speed;

(b) displaying a first player character out of the plurality of player characters hitting a first virtual golf ball in the virtual world in response to a first player providing first input to the first player's controller;

(c) after displaying the hitting of the first virtual golf ball, moving the first player character to an arrival point of the first golf ball according to further input to the first player's controller by the first player and based on the predetermined moving speed of the first player character;

(d) simultaneously with (b) and (c), enabling each player, other than the first player, to cause the respective player character that the respective player controls to hit a respective virtual ball and move to a respective arrival location of the respective virtual ball based on the predetermined moving speed of the respective player character, wherein:

the predetermined moving speeds of the player characters are independently adjustable based on actions available to and triggered by the players during (b) and (c), and each player character's moving speed is adjustable based on input from the player who controls the respective player character and other players who do not control the respective player character; and (e) repeating (a) through (d) until an ending cup-in event takes place.

19. A method of controlling a virtual golf game executed by a game system, the method comprising:

(a) generating for display, in connection with a virtual golf game, a virtual world including a plurality of player characters controllable by respective players using respective controllers, each of the player characters having a respective predefined moving speed;

(b) displaying a first player character out of the plurality of player characters hitting a first virtual golf ball in the virtual world in response to a first player providing first input to the first player's controller;

(c) after displaying the hitting of the first virtual golf ball, moving the first player character to an arrival point of the first golf ball according to further input to the first player's controller by the first player and based on the predetermined moving speed of the first player character;

(d) simultaneously with (b) and (c), enabling each player, other than the first player, to cause the respective player character that the respective player controls to hit a respective virtual ball and move to a respective arrival location of the respective virtual ball based on the predetermined moving speed of the respective player character, wherein:

the predetermined moving speeds of the player characters are independently adjustable based on actions available to and triggered by the players during (b) and (c), and each player character's moving speed is adjustable based on input from the player who controls the respective player character and other players who do not control the respective player character; and (e) repeating (a) through (d) until an ending cup-in event takes place.

* * * * *